(12) United States Patent
Kato

(10) Patent No.: US 8,427,506 B2
(45) Date of Patent: Apr. 23, 2013

(54) IMAGE PROCESSING SYSTEM, STORAGE MEDIUM STORING IMAGE PROCESSING PROGRAM, IMAGE PROCESSING APPARATUS AND IMAGE PROCESSING METHOD

(75) Inventor: Shunsaku Kato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 354 days.

(21) Appl. No.: 12/870,158

(22) Filed: Aug. 27, 2010

(65) Prior Publication Data

US 2011/0304646 A1 Dec. 15, 2011

(30) Foreign Application Priority Data

Jun. 11, 2010 (JP) ................................ 2010-134062

(51) Int. Cl.
*G09G 5/00* (2006.01)
(52) U.S. Cl.
USPC ...... 345/632; 345/633; 348/169; 348/333.02; 715/716; 715/719; 715/723
(58) Field of Classification Search .................. 345/632, 345/633; 348/169, 333.02; 715/716, 719, 715/723; 725/37
See application file for complete search history.

(56) References Cited

U.S. PATENT DOCUMENTS

| 6,611,242 | B1 * | 8/2003 | Hongo et al. | 345/2.1 |
|---|---|---|---|---|
| 7,263,207 | B2 * | 8/2007 | Lee et al. | 382/103 |
| 7,793,219 | B1 * | 9/2010 | Stratton et al. | 715/723 |
| 8,261,209 | B2 * | 9/2012 | Goto et al. | 715/838 |
| 2002/0103824 | A1 * | 8/2002 | Koppolu et al. | 707/501.1 |
| 2005/0018066 | A1 * | 1/2005 | Hofer | 348/333.02 |
| 2005/0231529 | A1 * | 10/2005 | Skwarek et al. | 345/619 |
| 2005/0289590 | A1 * | 12/2005 | Cheok et al. | 725/37 |
| 2008/0134013 | A1 * | 6/2008 | Audet | 715/201 |
| 2010/0185529 | A1 * | 7/2010 | Chesnut et al. | 705/27 |

FOREIGN PATENT DOCUMENTS

JP 2000-322602 11/2000

* cited by examiner

*Primary Examiner* — Xiao Wu
*Assistant Examiner* — Todd Buttram
(74) *Attorney, Agent, or Firm* — Nixon & Vanderhye P.C.

(57) ABSTRACT

A first image processing apparatus displays markers on a monitor to thereby make a second image processing apparatus perform a display control of a second object on an imaged image of an LCD while the second image processing apparatus transmits a marker recognizing signal when the display control is performed based on the markers to thereby make the first image processing apparatus perform a display control of a first object on the monitor.

29 Claims, 32 Drawing Sheets

FIG. 3
(A)
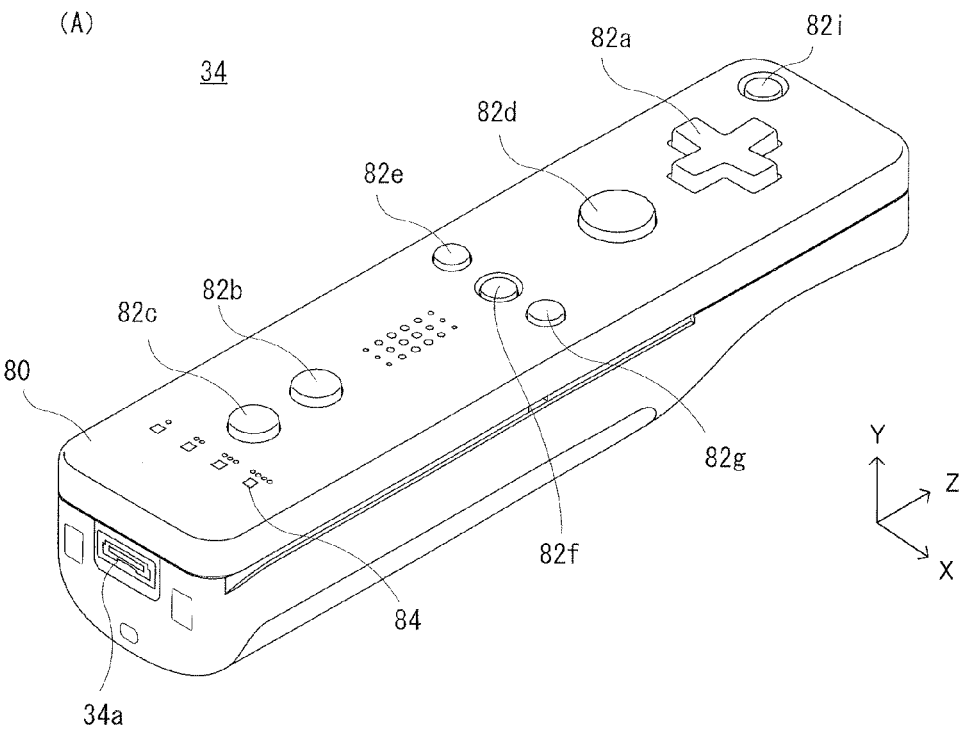
(B)
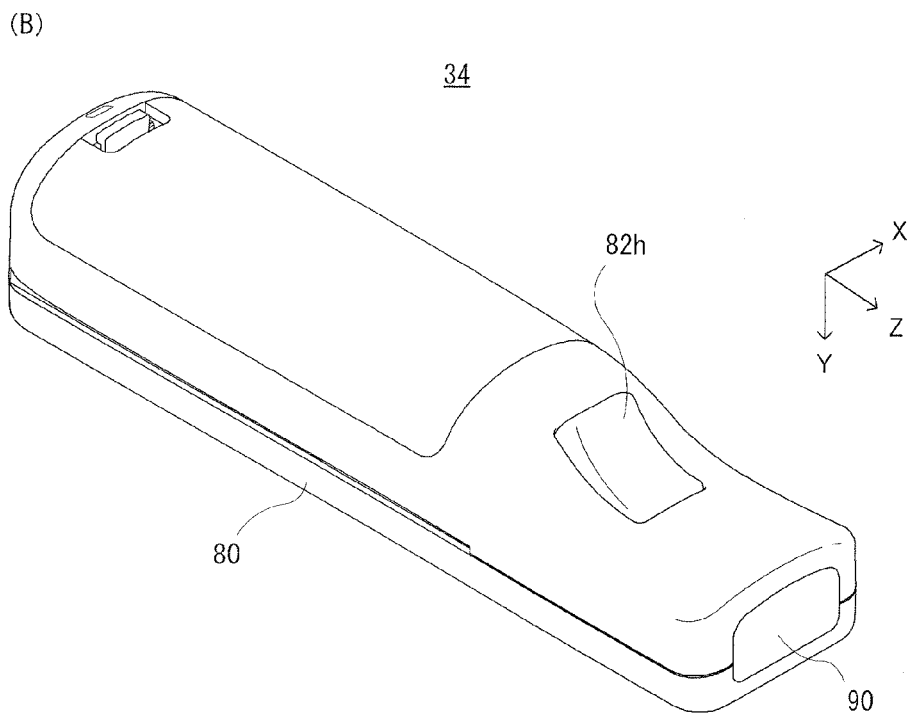

FIG. 4
(A)
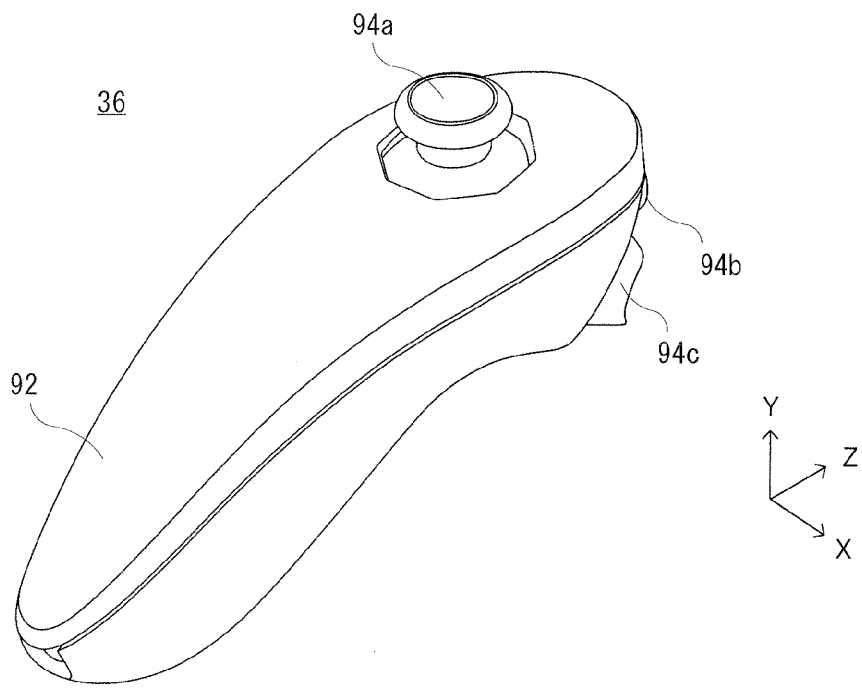
(B)
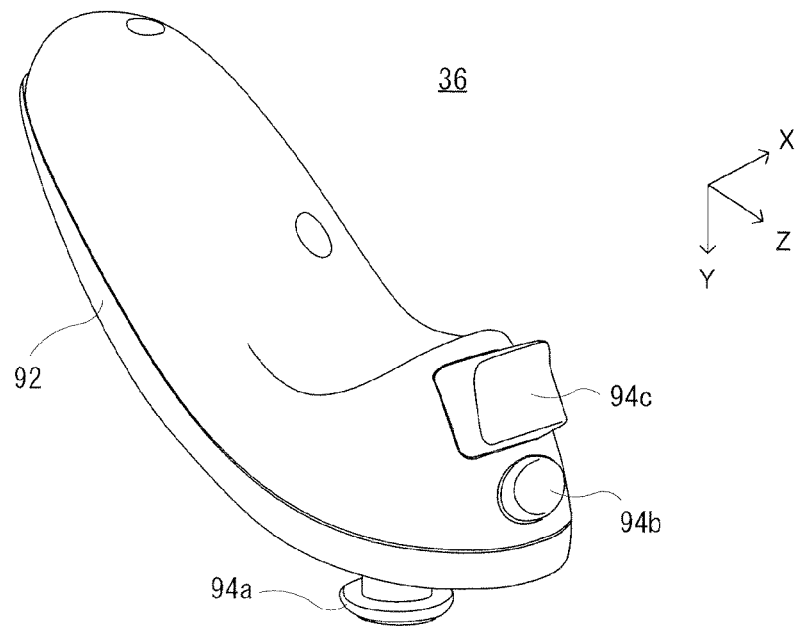

FIG. 15 (A)
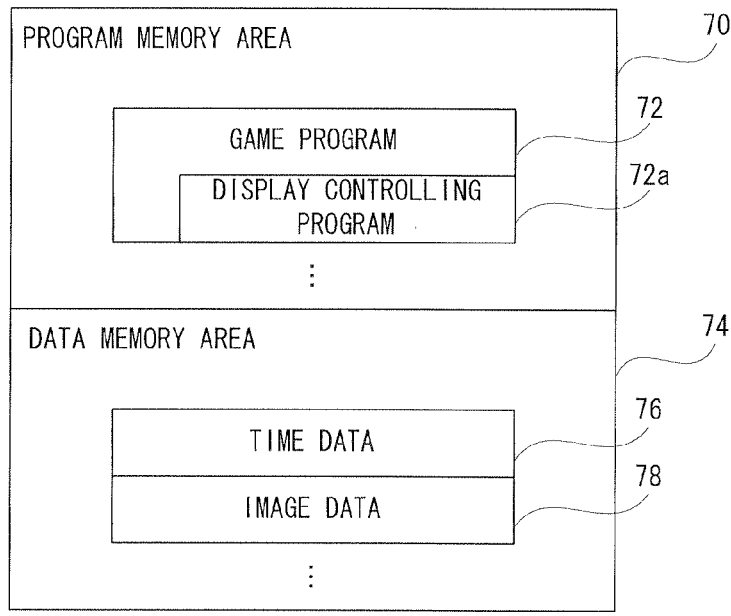
(B)
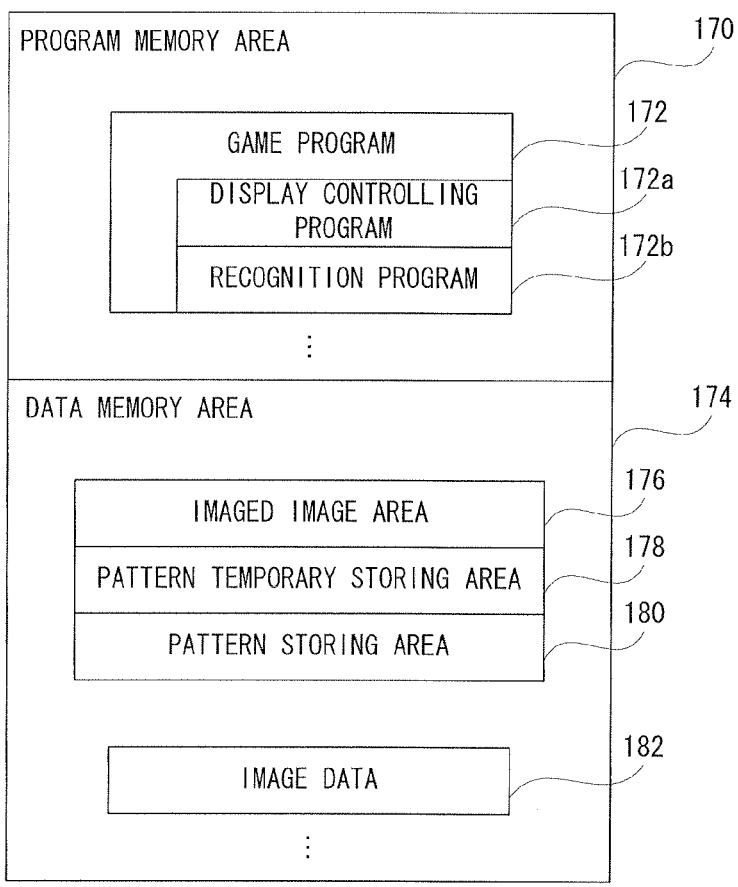

FIG. 16 (A)
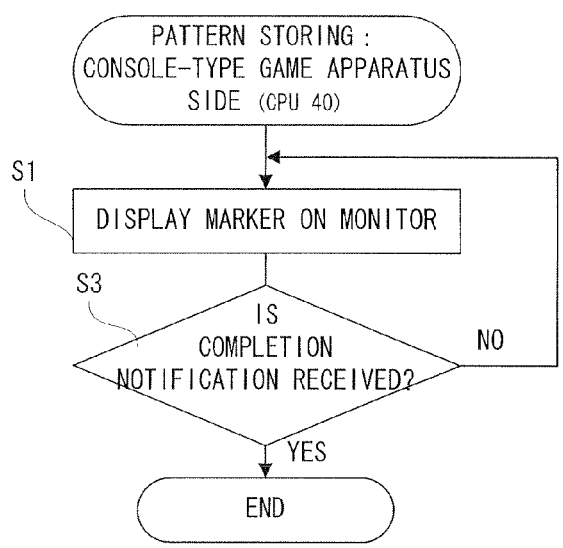
(B)
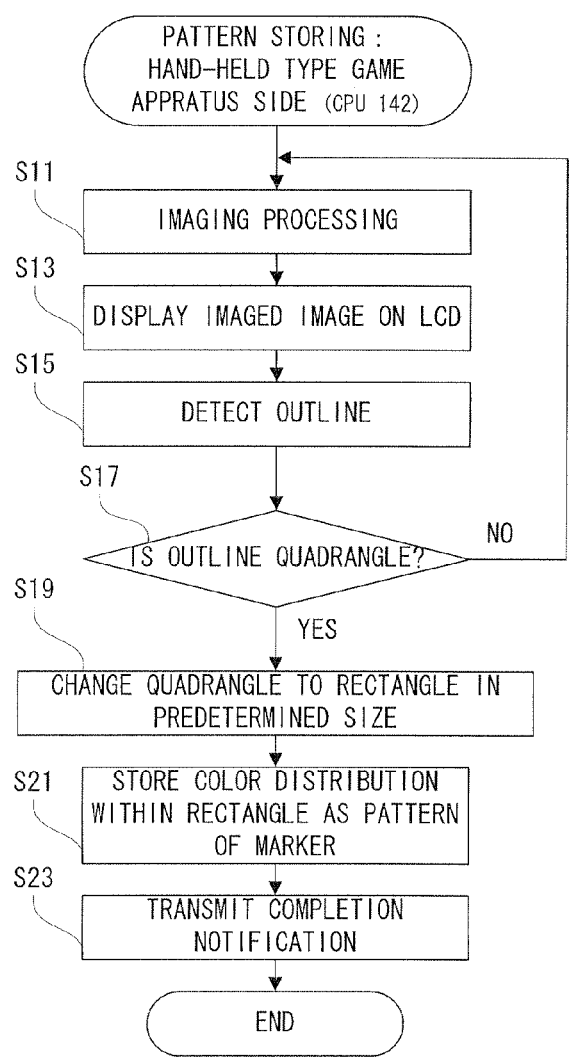

FIG. 20
(A) (STORE PATTERNS OF MARKER)
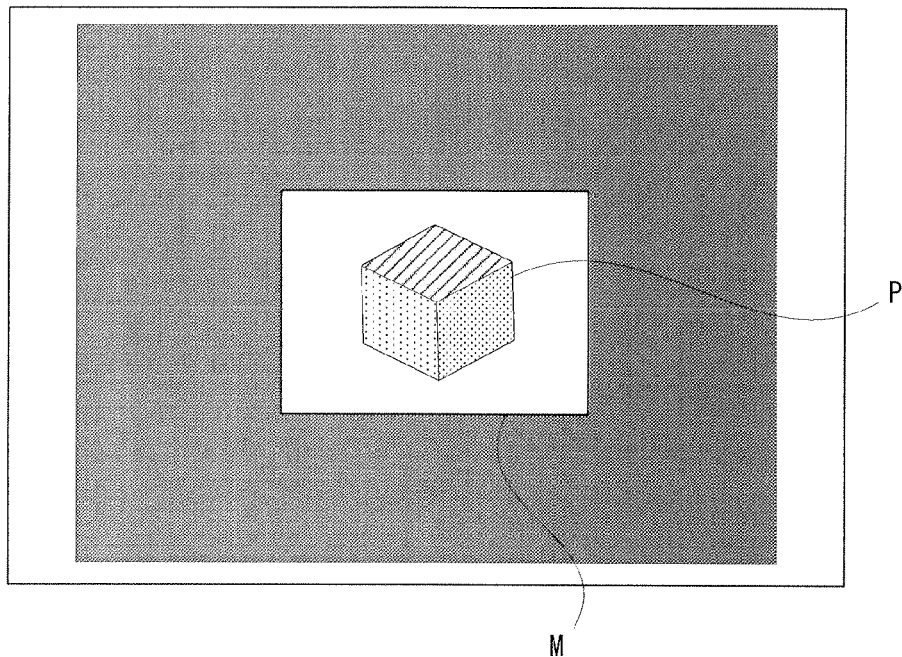
(B)
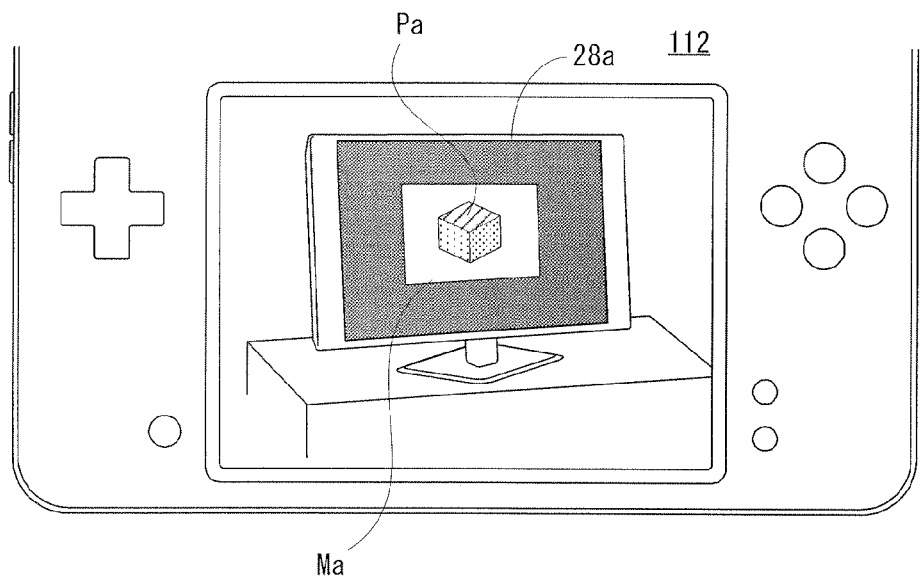

FIG. 22
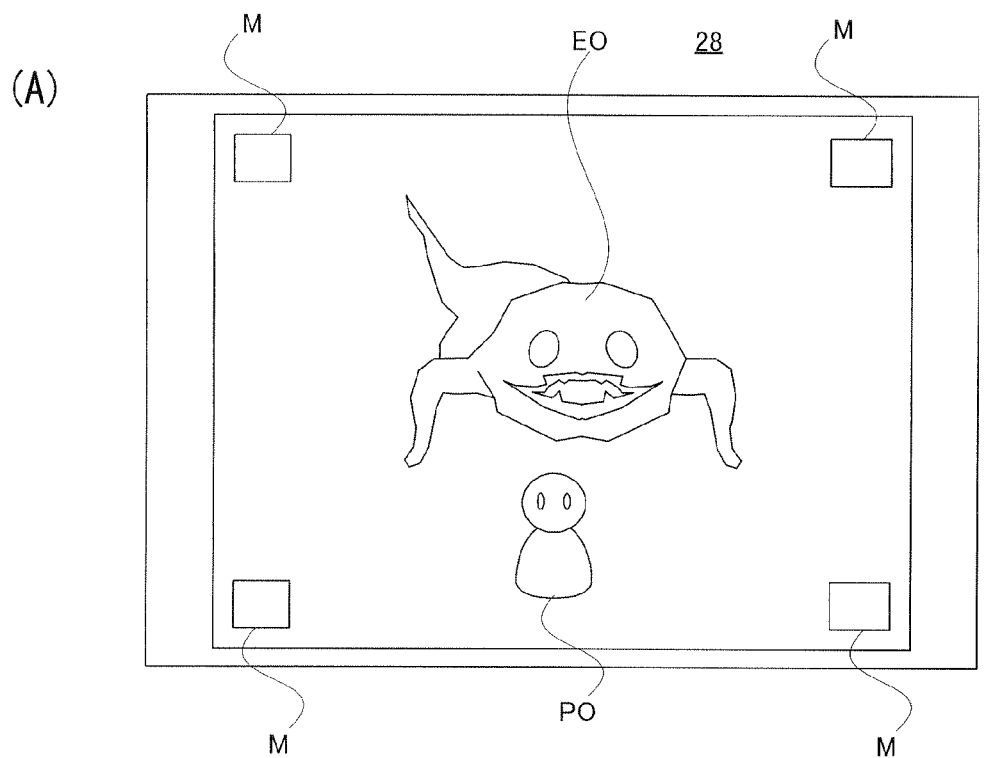
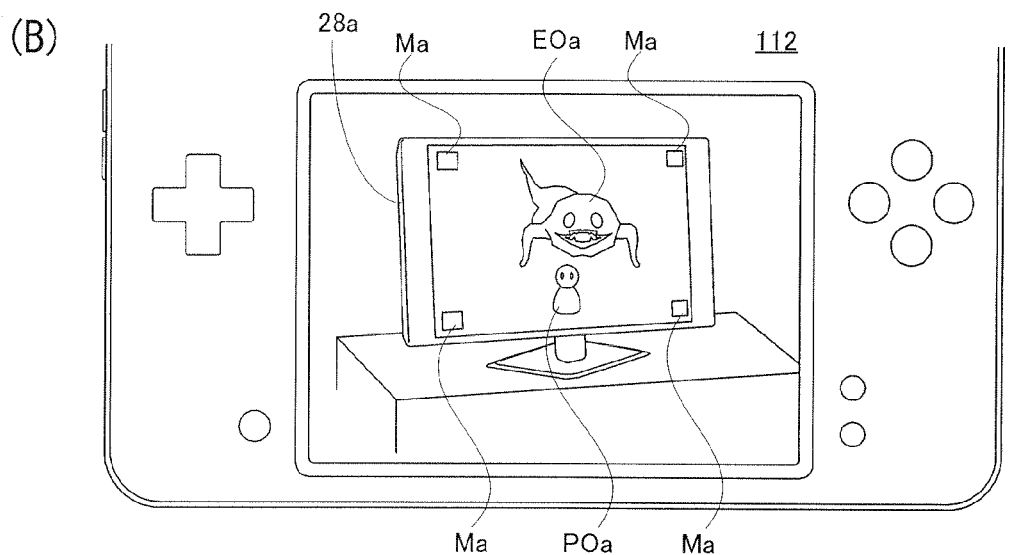

FIG. 23
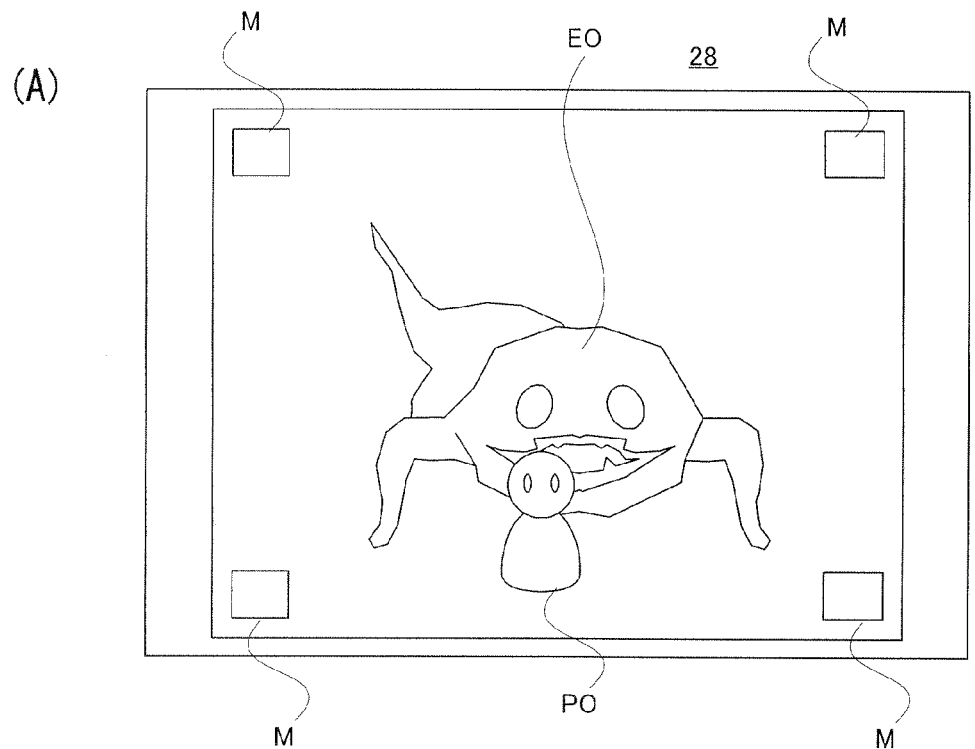
(A)
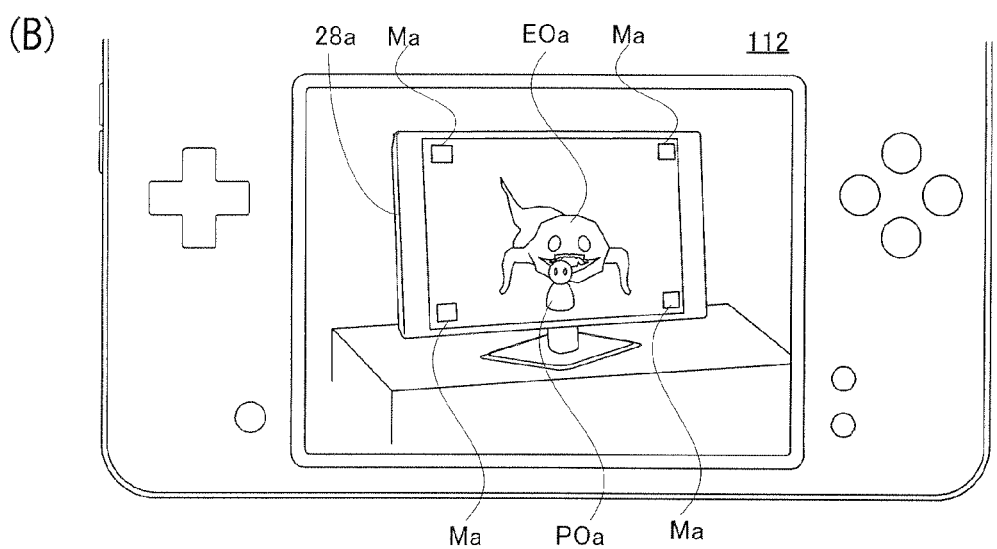
(B)

FIG. 24
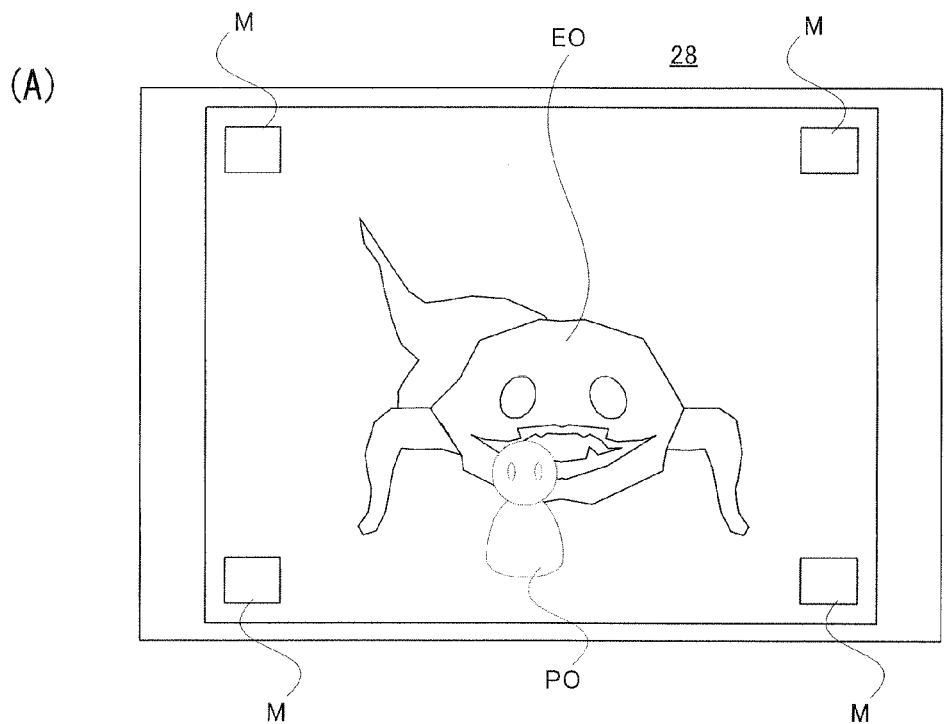
(A)
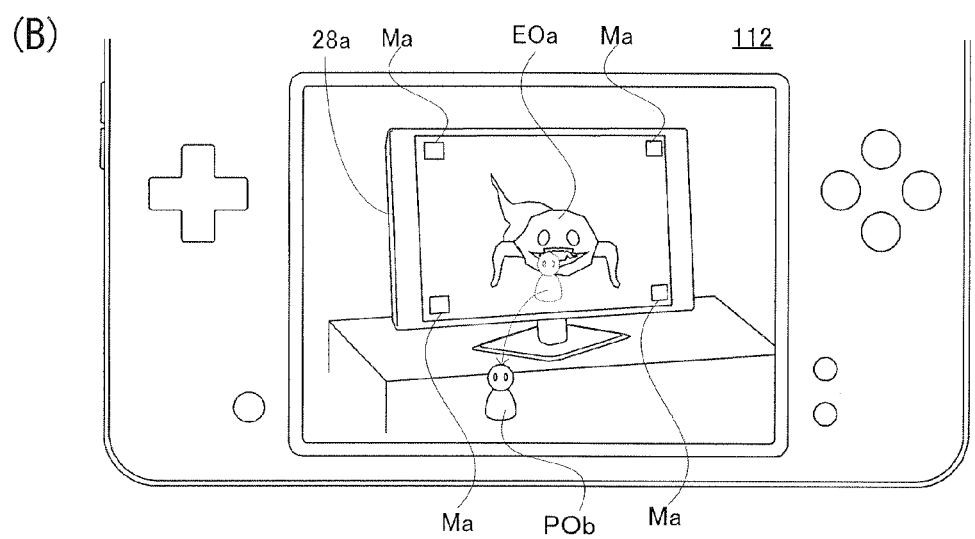
(B)

FIG. 25
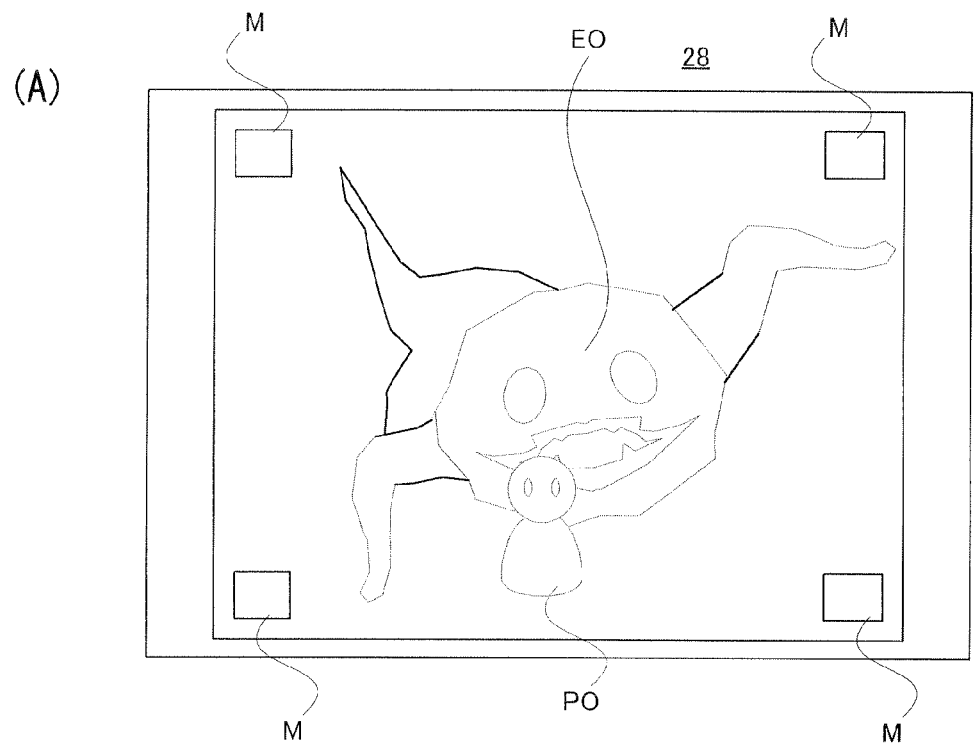
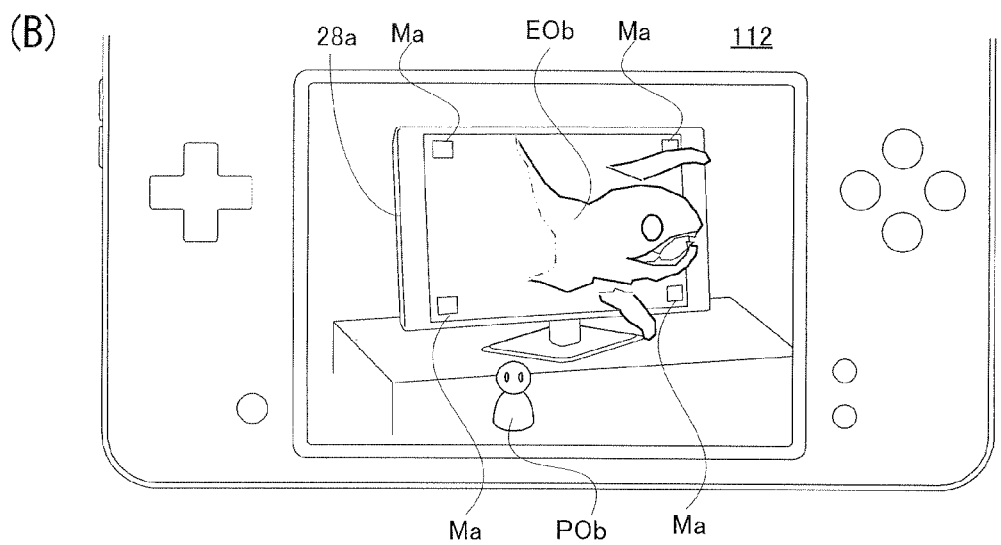

FIG. 26
(A)
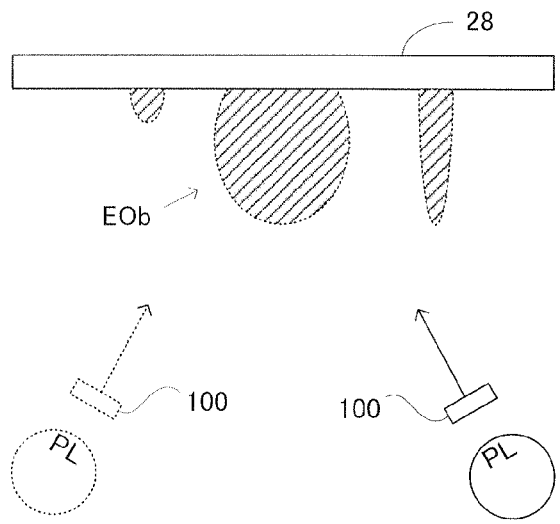
(B)
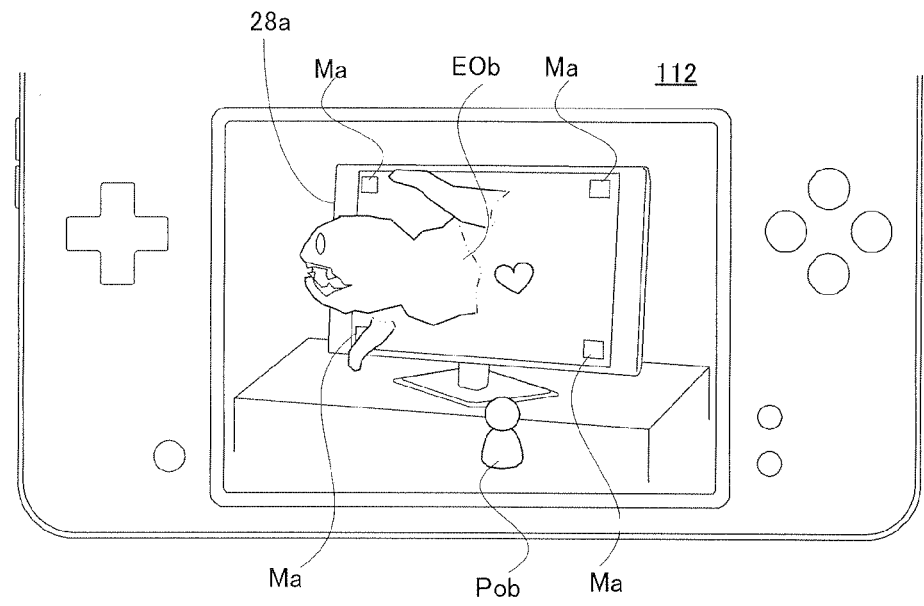

FIG. 29
(A)
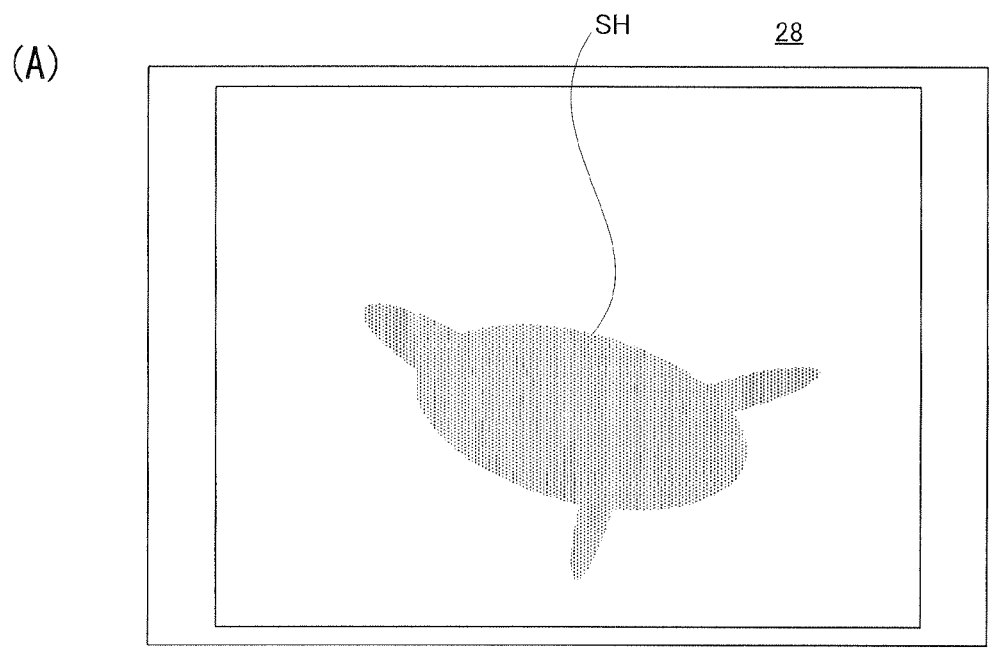
(B)
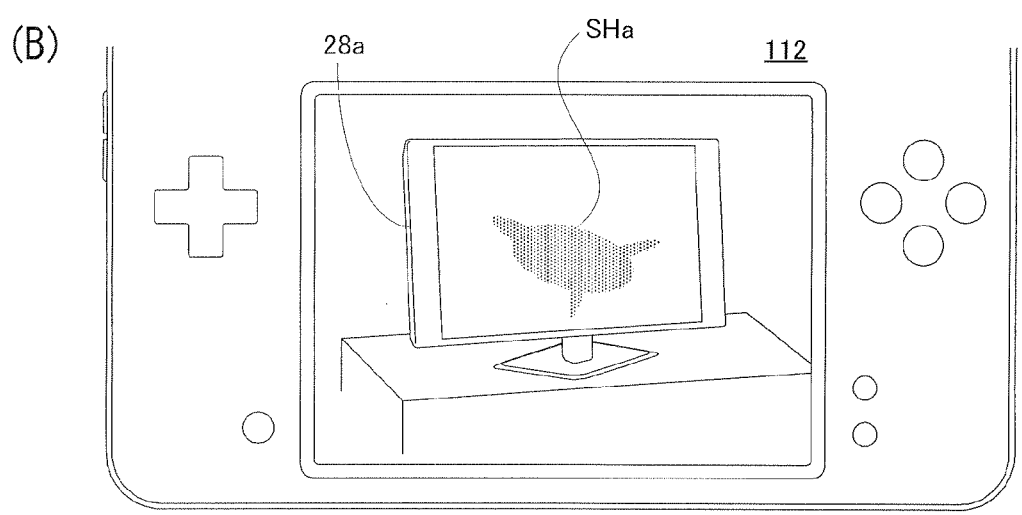

FIG. 30
(A)
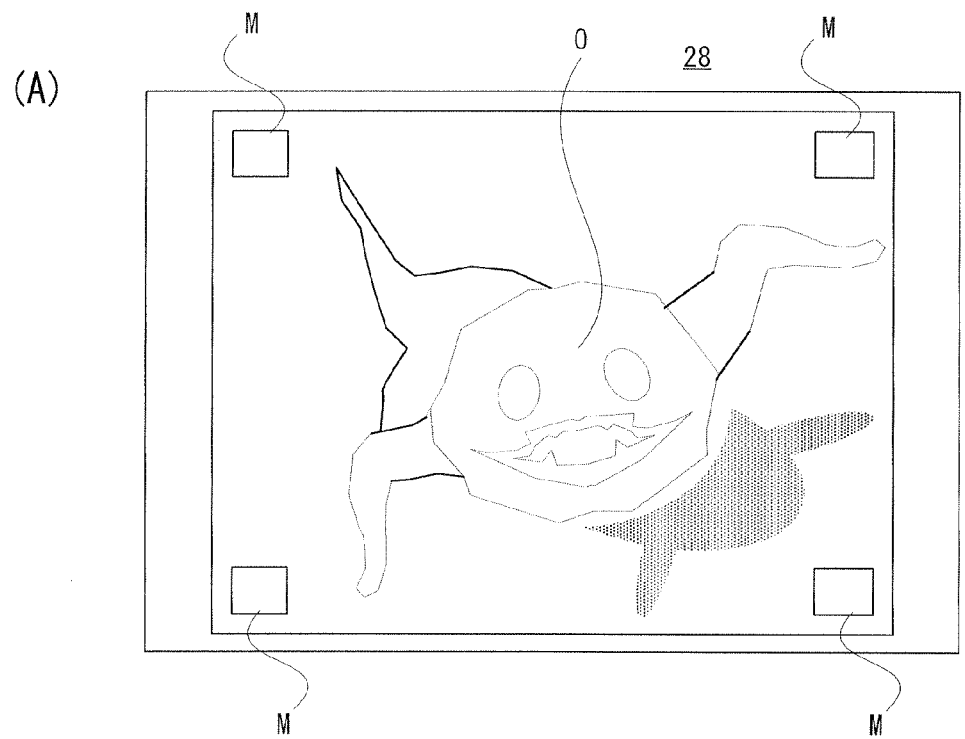
(B)
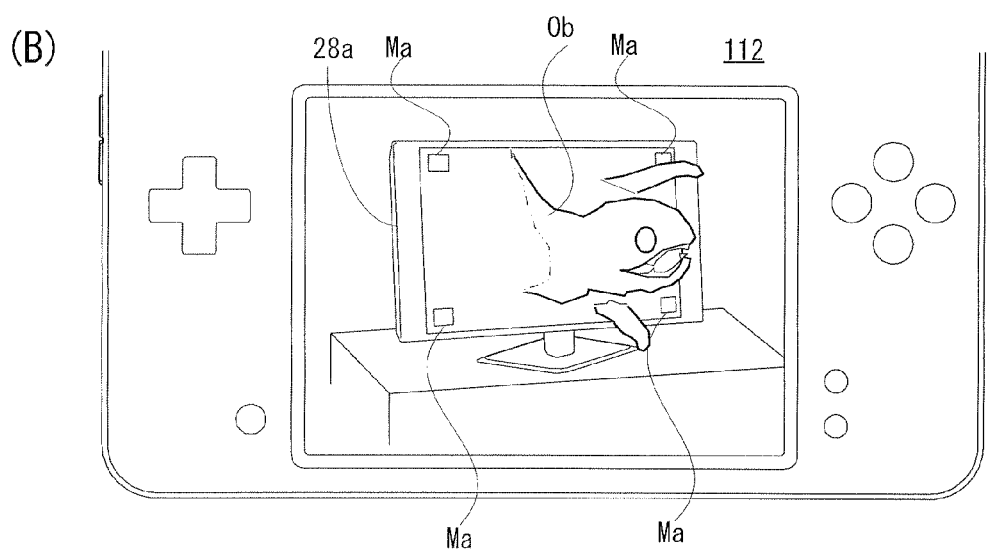

FIG. 31 (IN CASE THAT OBJECT IS MADE TO BE IN OUT ONLY BY MARKER DISPLAY WITHOUT TRANSMITTING AND RECEIVING SIGNAL)
(A) 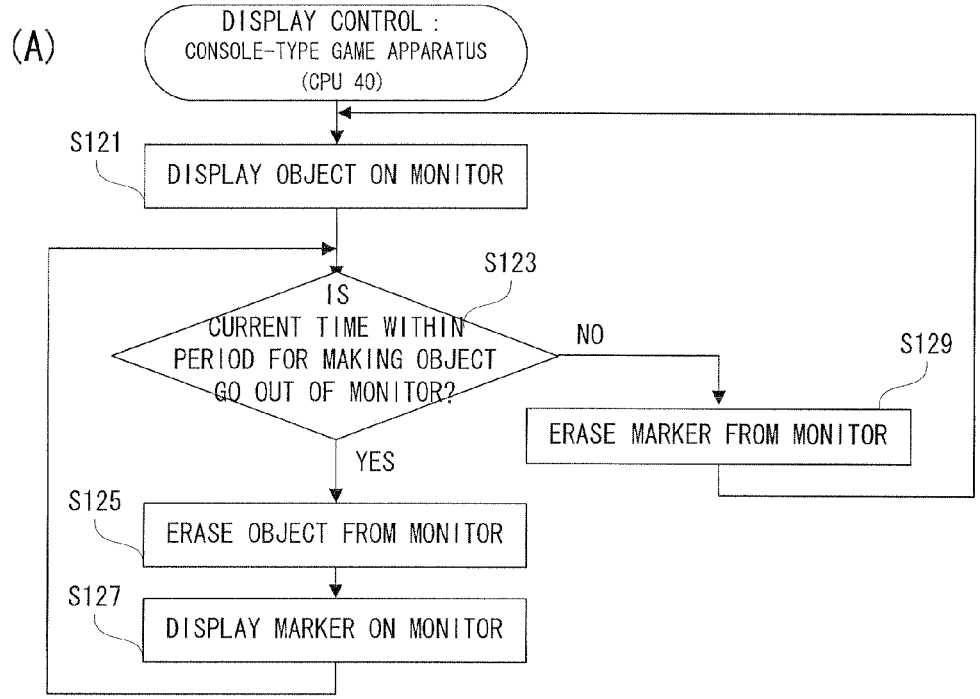
(B) 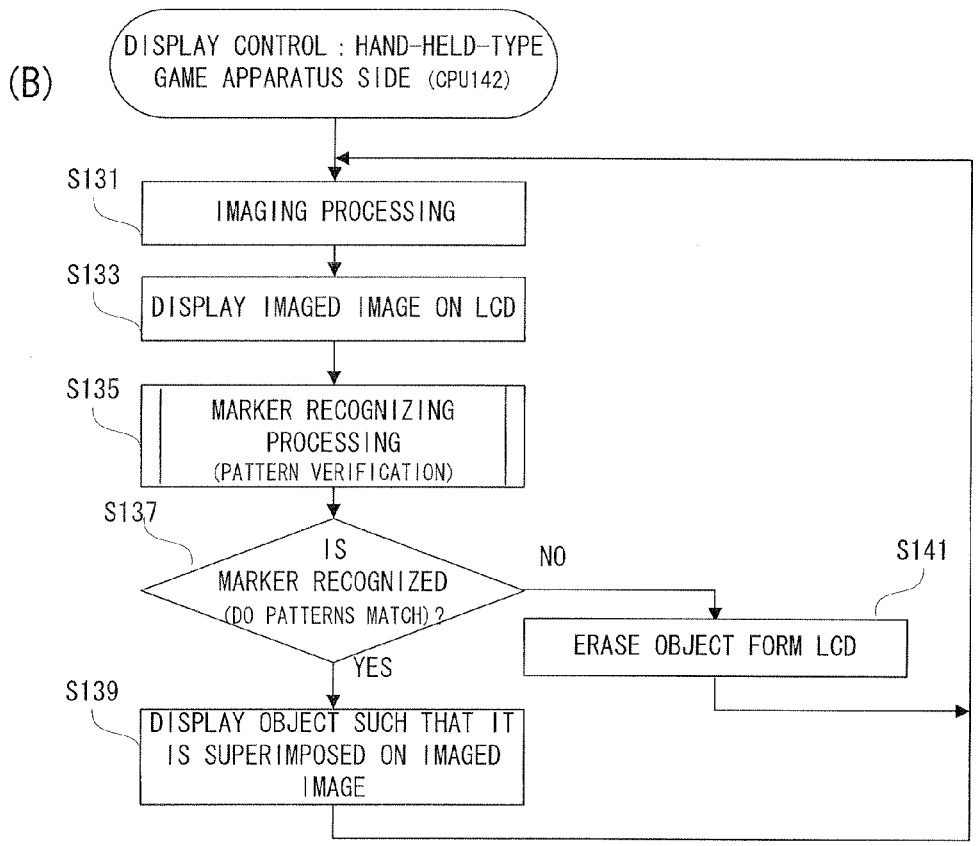

FIG. 32
(A)
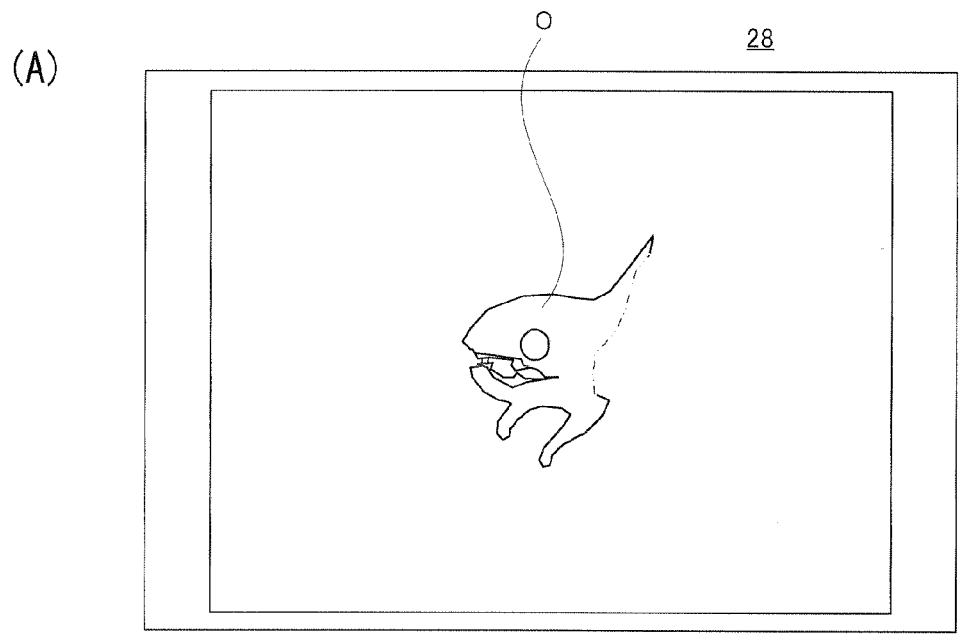
(B)
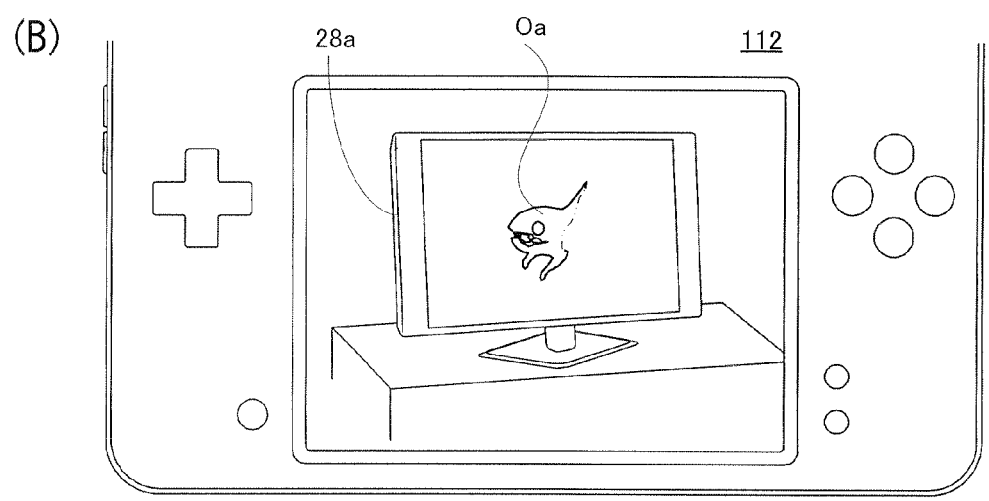

FIG. 33
(A)
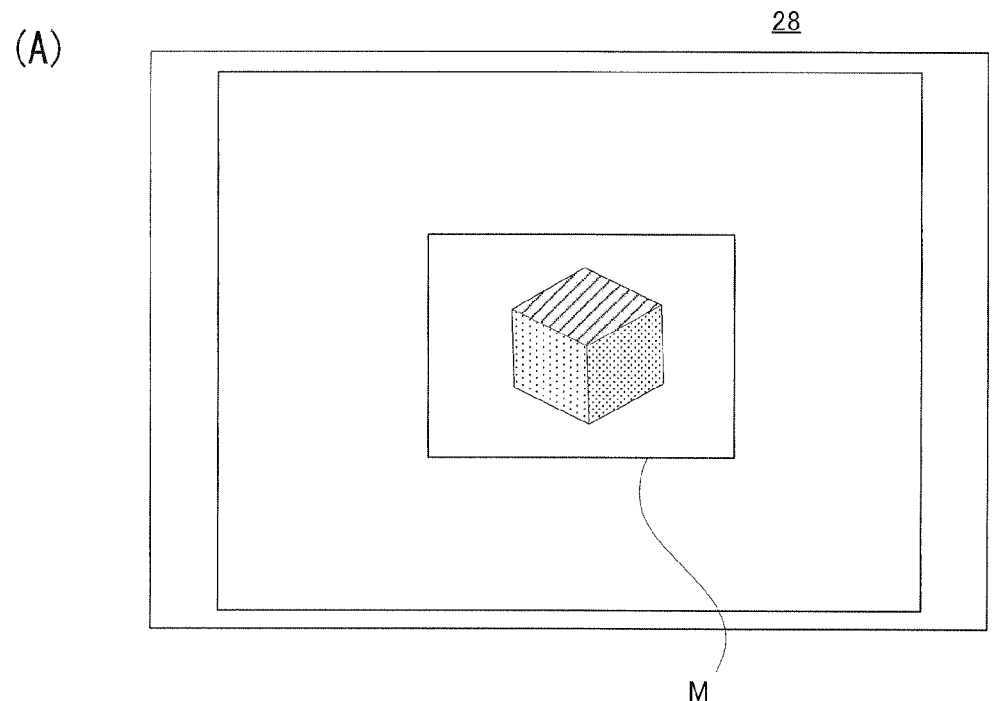
M
(B)
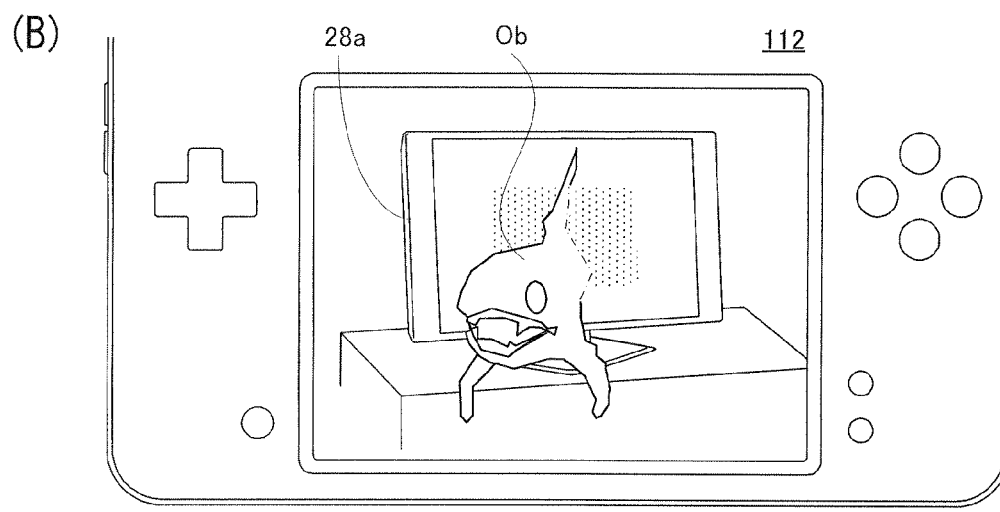

IMAGE PROCESSING SYSTEM, STORAGE MEDIUM STORING IMAGE PROCESSING PROGRAM, IMAGE PROCESSING APPARATUS AND IMAGE PROCESSING METHOD

CROSS REFERENCE OF RELATED APPLICATION

The disclosure of Japanese Patent Application No. 2010-134062 is incorporated herein by reference.

BACKGROUND AND SUMMARY

1. Technical Field

The technology presented herein relates to an image processing system, a storage medium storing an image processing program, an image processing apparatus and an image processing method. More specifically, the present technology relates to an image processing system, a storage medium storing an image processing program, an image processing apparatus and an image processing method which display a composite image obtained by combining a photographed image and a CG image.

2. Description of the Related Art

As an example of this kind of a conventional image processing apparatus, one disclosed in a Japanese Patent Application Laid-Open No. 2000-322602 is known. In the related art, the image processing apparatus images a card attached with a two-dimensional bar code with a CCD camera, searches the two-dimensional bar code from this imaged image, detects a position of the two-dimensional bar code in the imaged image, identifies a pattern of the two-dimensional bar code, and then displays a three-dimensional image according to this pattern so as to be superposed at the position of the two-dimensional bar code within the imaged image.

In the aforementioned related art, the two-dimensional bar code is printed on a card, but it is conceivable that this is displayed on a monitor of another image processing apparatus, such as a monitor of a PC, for example. In this case, by changing the two-dimensional bar code on the monitor via the PC, it becomes possible to make the image processing apparatus combine various three-dimensional images. However, this is merely a one-way display control from the PC to the image processing apparatus, and has a limit to enhancement of savor of the game.

Therefore, it is a primary feature of the present technology to provide a novel image processing system, a novel storage medium storing an image processing program, a novel image processing apparatus and a novel image processing method.

Another feature of the present technology is to provide a image processing system, a storage medium storing an image processing program, an image processing method, a first image processing apparatus, and a second image processing apparatus which can bring the first image processing apparatus and the second image processing apparatus into association with each other to thereby operatively connect a first object and a second object between a first displayer and an imaged image of a second displayer.

The present technology employs following features in order to solve the above-described problems.

The present technology adopts the following construction in order to solve the above-mentioned problems.

A first aspect is an image processing system including a first image processing apparatus utilizing a first displayer and a second image processing apparatus utilizing an imager and a second displayer capable of viewing a real space on a screen, wherein the first image processing apparatus comprising: a first display processor which displays a predetermined marker image on the first displayer; and a first object display controller which performs on the first displayer a display control of at least a part of first object image being a predetermined CG object; and the second image processing apparatus comprising: an imaging processor which performs imaging by the imager; and a second object display controller which performs a composition control of at least a part of second object image being a predetermined CG object on a real space capable of being viewed on the second displayer at a position with reference to the marker image within the imaged image by recognizing the marker image within the imaged image.

In the first aspect, a first image processing apparatus displays a predetermined marker image on the first displayer to thereby perform a display control of at least a part of first object image being a predetermined CG object, and a second image processing apparatus performs imaging by the imager, and recognizes a marker image within the imaged image to thereby perform a display control of at least a part of second object image being a predetermined CG object at a position with reference to the marker image within the imaged image on the real space capable of being viewed on the second displayer.

According to the first aspect, the first image processing apparatus and the second image processing apparatus are brought into association with each other via the marker image to thereby operatively connect the first object and the second object between the first displayer and the imaged image of the second displayer.

Here, the first object and the second object may be a common object (that is, the common object becomes the first object on the first displayer, and becomes the second object on the second displayer), and may be a part of the common object (head and arms, for example) and other parts (body, for example). Thus, the first object and the second object may preferably be objects that are brought into association with each other, but may be objects independent of each other.

For example, in a case that the first object and the second object are the common object (a part thereof and another part thereof), the object can look as if it moves between the first displayer and the second displayer (perform a display control). In one embodiment, the object pops out of the first displayer to the imaged image of the second displayer, or returns to the first displayer therefrom. In another modified example, the objects appear on the first displayer and the imaged image of the second displayer at the same time and disappear therefrom at the same time.

Additionally, it is preferable that the marker image is always displayed, but displayed as required. The marker image is always displayed in one embodiment, but it is displayed as required in a modified example.

Furthermore, the composition is a display in a superimposed manner, but the imaged image itself may be changed.

A second aspect is according to the first aspect, wherein the first image processor and the second image processor are able to communicate with each other, the first object display controller performs a display control of the first object image by being operatively connected through the communication, and the second object display controller performs a composition control of the second object image by being operatively connected through the communication.

According to the second aspect, the first image processing apparatus and the second image processing apparatus are brought into association with each other via the marker image and the communications, capable of enhancing the continuity between the first object and the second object.

A third aspect is according to the second aspect, wherein the second object display controller combines at least a part of the second object image with the imaged image when the marker image is recognized within the imaged image, and the first object display controller performs a control on the first displayer such that the first object image disappears when the marker image is recognized within the imaged image in the second object display controller.

According to the third aspect, in accordance with the first object image disappearing from the first displayer, the second object image can be made to appear within the imaged image of the second displayer.

A fourth aspect is according to the second aspect, wherein the second object display controller combines at least a part of the second object image with the imaged image when the marker image is recognized within the imaged image, and the first object display controller performs a control such that the first object image is displayed on the first displayer when the marker image is recognized within the imaged image in the second object display controller.

According to the fourth aspect, in accordance with the second object image appearing within the imaged image on the second displayer, the first object image can also be made to appear in the first displayer.

A fifth aspect is according to the first aspect, wherein the marker image includes identification information; and the first object image and the second object image are images corresponding to the identification information included in the marker image.

According to the fifth aspect, through the identification information included in the marker image, various first object images and second object images can be displayed.

A sixth aspect is according to the first aspect, wherein the first display processor displays the plurality of marker images on the first displayer.

According to the sixth aspect, by displaying the plurality of marker images, it is possible expand a recognizable range.

A seventh aspect is according to the sixth aspect, wherein the first display processor displays four marker images at four corners of the first displayer.

According to the seventh aspect, it is possible expand the recognizable range with the visibility of the first displayer maintained as high as possible.

An eighth aspect is according to the sixth aspect, wherein the first object display controller performs a control such that the first object image is displayed at a predetermined position surrounded by the plurality of marker images, and by recognizing at least one of the plurality of marker images within the imaged image, the second object display controller performs a control of a composition of the second object image on a position surrounded by the plurality of marker images recognized within the imaged image.

According to the eighth aspect, it is possible to display the object image at a predetermined position surrounded by the markers on each of the first displayer and the second displayer.

A ninth aspect is according to the first aspect, wherein the second object display controller which performs a composition control of the second object at a position and an orientation corresponding to a position and an orientation of the marker image within the imaged image by performing an AR recognition on the marker image within the imaged image.

According to the ninth aspect, it is possible to accurately perform a composition control of the second object through the AR recognition.

A tenth aspect is according to the ninth aspect, wherein the second object display controller includes: a position and orientation calculator which calculates a correlative relation of a position and an orientation between the marker images on the first displayer and the imager by recognizing the marker image within the imaged image; a virtual camera setter which arranges the second object in the virtual space and decides a position and an orientation of the virtual camera such that a correlative relation of a position and an orientation between the second object and the virtual camera match the position and the orientation that are calculated by the position and orientation calculator; and a virtual space imager which images the virtual space including the second object by the virtual camera, wherein a composition control is performed between the imaged image and the virtual space imaged by the virtual space imager.

According to the tenth aspect, a correlative relation of a position and a orientation between the marker image on the first displayer and the imager is calculated to thereby arrange the second object in the virtual space, and the position and orientation of the virtual camera are decided a correlative relation of the position and the orientation between the second object and the virtual camera match the position and orientation calculated by the position and attitude calculator, capable of combining the second object with the imaged image with high accuracy.

An eleventh aspect is according to the first aspect, wherein the second image processing apparatus further comprises a second display processor which displays the imaged image imaged by the imaging processor on the second displayer, and the second object display controller performs a composition control of the second object on the imaged image displayed by the second displayer.

According to the eleventh aspect, it is possible to combine the second object with the imaged image.

A twelfth aspect is according to the first aspect, wherein the second image processing apparatus further comprises: a first signal transmitter which transmits a first signal to the first image processing apparatus on the basis of a recognition result of the marker image, and the first image processing apparatus further comprising: a first signal receiver which receives the first signal transmitted by the first signal transmitter, wherein the first object display controller controls a display of the first object on the basis of the first signal received by the first signal receiver.

According to the twelfth aspect, the first image processing apparatus displays a predetermined marker image on a first displayer to thereby make the second image processing apparatus to perform a display control of the second object on the imaged image of the second displayer while the second image processing apparatus transmits a first signal when the display control is performed on the basis of the markers to thereby make the first image processing apparatus perform a display control of the first object on the first displayer. Thus, the first image processing apparatus and the second image processing apparatus are associated with each other through the marker image and the first signal to thereby operatively connect the first object and the second object between the first displayer and the imaged image of the second displayer.

Here, the first signal is preferably a determination result signal indicating a determination result (YES) that the marker image is included, and it is repeatedly transmitted, but it may be a timing signal indicating that the determination result changes from "NO" to "YES", and it may be transmitted by one.

A thirteenth aspect is according to the twelfth aspect, wherein the first image processing apparatus further comprises: a second signal transmitter which transmits a second signal to the second image processing apparatus in a case that the first signal is received by the first signal receiver, and the second image processing apparatus further comprises: a second signal receiver which receives the second signal, wherein the second object display controller performs a display control on the basis of the second signal received by the second signal receiver.

In the thirteenth aspect, the second image processing apparatus transmits the second signal to the first image processing apparatus when the first signal is received, and the first image processing apparatus performs a display control on the basis of the second signal.

According to the thirteenth aspect, the first image processing apparatus and the second image processing apparatus are associated with each other through the second signal in addition to the marker image and the first signal, capable of enhancing the continuity between the first object and the second objet.

Here, the second signal is preferably a control signal indicating the content and a timing of the display control, but it may merely be a timing signal indicating a timing of the display control, and may be an acknowledgment signal (ACK, for example) confirming reception of the first signal. Furthermore, the second signal may preferably be transmitted repeatedly, but may be transmitted by one.

A fourteenth aspect is according to the thirteenth aspect, wherein the second signal transmitter transmits the second signal to the second image processing apparatus after a lapse of a first predetermined time since the first signal is received by the first signal receiver.

According to the fourteenth aspect, the first controlling device transmits the second signal on the basis of the elapsed time from the reception of the first signal, and therefore, it is possible to perform an active control in relation to the composition of the second object.

Alternatively, the transmission of the second signal by the first image processing apparatus may passively be performed on the basis of a command from the first controlling device.

A fifteenth aspect is according to the thirteenth aspect, wherein the first object display controller performs a display control after the second signal is transmitted by the second signal transmitter.

According to the fifteenth aspect, the first image processing apparatus performs the display control of the first object after transmitting the second signal. In response to the second signal, the second image processing apparatus performs the display control of the second object. Thus, it is possible to synchronize the display control by the first image processing apparatus itself and the display control by the second image processing apparatus. For example, it becomes easy to match a starting timing of the display control between the first image processing apparatus and the second image processing apparatus.

A sixteenth aspect is according to the fourteenth aspect, wherein the first image processing apparatus further comprises a third signal transmitter which transmits a third signal to the second image processing apparatus after a lapse of a second predetermined time since the first object display controller performs a display control, the second image processing apparatus further comprises a third signal receiver which receives the third signal, and the second object display controller erases the second object from the imaged image after the third signal is received by the third signal receiver.

According to the sixteenth aspect, the first controlling device transmits the third signal on the basis of the elapsed time since the display control of the first object is performed, and therefore, it is possible to actively perform a control on the composition and moreover the erasure of the second object.

Alternatively, the transmission of the third signal by the first image processing apparatus may passively be performed on the basis of a command from the first controlling device.

Here, the third signal is preferably a control signal indicating the content and a timing of the display control, but it may merely be a timing signal indicating a timing of the display control. Furthermore, the third signal may preferably be transmitted repeatedly, but may be transmitted by one.

A seventeenth aspect is according to the sixteenth aspect, wherein the first object display controller returns to a state before the display control is performed after the third signal is transmitted by the third signal transmitter.

According to the seventeenth aspect, when the second object is erased on the second displayer, the imaged image on the first displayer can be returned to the original state, that is, the state before the first object is combined.

An eighteenth aspect is according to the twelfth aspect, wherein the first display processor displays at least a part of the first object together with the predetermined identification information, and the first object display controller erases at least a part of the first object on the basis of the first signal.

According to the eighteenth aspect, it becomes possible to make an expression as if the object moves between the first displayer and the second displayer.

A nineteenth aspect is according to the twelfth aspect, wherein the first object display controller displays at least a part of the first object on the basis of the first signal.

According to the nineteenth aspect, it becomes possible to make an expression as if the objects appear and/or disappear between the first displayer and the second displayer at the same time.

A twentieth aspect is according to the first aspect, wherein the first object display controller includes a first object size changer which changes a size of the first object on the basis of a size of the marker image, and the second object display controller includes a second object size changer which changes a size of the second object on the basis of the size of the marker image.

According to the twentieth aspect, it becomes possible to control the size of the object through the size of the marker.

A twenty-first aspect is according to the first aspect, wherein the first object display controller includes a first object direction changer which changes a display direction of the first object on the basis of a shape of the marker image, and the second object display controller includes a second object direction changer which changes a display direction of the second object on the basis of the shape of the marker image.

According to the twenty-first aspect, it becomes possible to control the direction of the object through the shape of the marker.

A twenty-second aspect is according to the twelfth aspect, wherein the first signal includes coordinate information, and the first object display controller performs a display control of at least a part of the first object on the basis of the coordinate information included in the first signal.

According to the twenty-second aspect, the second image processing apparatus transmits the first signal inclusive of the coordinate information, and whereby, the first image processing apparatus can make a display in association with the second image processing apparatus.

A twenty-third aspect is according to the eleventh aspect, wherein the second display processor includes a frame displayer which displays a frame the same in shape as the marker image on the second displayer, and the second object display controller performs recognition in a state that the marker image is displayed along the frame displayed by the frame displayer.

According to the twenty-third aspect, a frame the same in shape as the marker image is displayed on the second displayer, and a recognition is performed with the marker images displayed along the frame, and whereby, it saves the processing of a direction detection based on the position of the marker image and further a coordinate transformation, capable of reducing the processing load.

A twenty-fourth aspect is an image processing program performing image processing between a first image processing apparatus utilizing a first displayer and a second image processing apparatus utilizing an imager and a second displayer capable of viewing a real space on a screen, wherein the image processing program causes a computer to function as: a first display processor which displays a predetermined marker image on the first displayer; and a first object display controller which performs on the first displayer a display control of at least a part of first object image being a predetermined CG object, the image processing program causes the second image processing apparatus to function as: an imaging processor which performs imaging by the imager; and a second object display controller which performs a composition control of at least a part of second object image being a predetermined CG object on a real space capable of being viewed on the second displayer at a position with reference to the marker image within the imaged image by recognizing the marker image within the imaged image.

A twenty-fifth aspect is a first image processing apparatus being brought into association with a second image processing apparatus that utilizes an imager and a second displayer capable of viewing a real space on a screen by utilizing a first displayer, comprising: a first display processor which displays a predetermined marker image on the first displayer; and a first object display controller which performs a display control of at least a part of first object image being a predetermined CG object; wherein the second image processing apparatus comprises an imaging processor which performs imaging by the imager; and a second object display controller which performs a composition control of at least a part of second object image being a predetermined CG object on a real space capable of being viewed on the second displayer at a position with reference to the marker image within the imaged image by recognizing the marker image within the imaged image.

A twenty-sixth aspect is a second image processing apparatus utilizing an imager and a second displayer capable of viewing a real space on a screen in associating with a first image processing apparatus utilizing a first displayer, wherein the first image processing apparatus comprises: a first display processor which displays a predetermined marker image on the first displayer; and a first object display controller which performs on the first displayer a display control of at least a part of first object image being a predetermined CG object, comprising: an imaging processor which performs imaging by the imager; and a second object display controller which performs a composition control of at least a part of second object image being a predetermined CG object on a real space capable of being viewed on the second displayer at a position with reference to the marker image within the imaged image by recognizing the marker image within the imaged image.

A twenty-seventh aspect is an image processing method performed by a first image processing apparatus utilizing a first displayer and a second image processing apparatus utilizing an imager and a second displayer capable of viewing a real space on a screen, including followings steps to be executed by a computer of the first image processing apparatus: a first display processing step for displaying a predetermined marker image on the first displayer; and a first object display controlling step for performing on the first displayer a display control of at least a part of first object image being a predetermined CG object, and including following steps to be executed by a computer of the second image processing apparatus of: an imaging processing step for performing imaging by the imager; and a second object display controlling step for performing a composition control of at least a part of second object image being a predetermined CG object on a real space capable of being viewed on the second displayer at a position with reference to the marker image within the imaged image by recognizing the marker image within the imaged image.

In the twenty-fourth to twenty-seventh aspect as well, similar to the first aspect, the first image processing apparatus and the second image processing apparatus are brought into association via the marker image to thereby operatively connect the first object and the second object between the first displayer and the imaged image of the second displayer.

According to the technology presented herein, it is possible to implement an image processing system, an image processing program and an image processing method, and a first image processing apparatus and a second image processing apparatus therefor capable of operatively connecting the first object and the second object between the first displayer and the imaged image of the second displayer by bringing the first image processing apparatus and the second image processing apparatus into association with each other.

The above described features, aspects and advantages of the present technology will become more apparent from the following detailed description of the present technology when taken in conjunction with the accompanying drawings.

BRIEF DESCRIPTION OF THE DRAWINGS

FIG. 3 is an illustrative view illustrating an appearance of a first controller;

FIG. 4 is an illustrative view illustrating an appearance of a second controller;

FIG. 11(A) shows one side surface thereof in a closed state, FIG. 11(B) shows a top surface thereof in the closed state, FIG. 11(C) shows the other side surface in the close state, and FIG. 11(D) shows a bottom surface thereof in the close state;

FIG. 15 is an illustrative view showing a part of a memory map, FIG. 15(A) shows a memory map of a console-type game apparatus, and FIG. 15(B) shows a memory map of the hand-held type game apparatus;

FIG. 16 is a flowchart showing a part of an operation by CPUs, FIG. 16(A) shows an operation by the CPU of the console-type game apparatus, and FIG. 16(B) is a flowchart showing an operation by the CPU of the hand-held type game apparatus;

FIG. 20 is an illustrative view illustrating a display control when a pattern is stored, FIG. 20(A) shows a monitor screen, and FIG. 20(B) shows an LCD screen;

FIG. 22 is an illustrative view explaining a part of a display control when a game is played, FIG. 22(A) shows the monitor screen, and FIG. 22(B) shows the LCD screen;

FIG. 23 is an illustrative view sequel to FIG. 22, FIG. 23(A) shows the monitor screen, and FIG. 23(B) shows the LCD screen;

FIG. 24 is an illustrative view sequel to FIG. 23, FIG. 24(A) shows the monitor screen, and FIG. 24(B) shows the LCD screen;

FIG. 25 is an illustrative view sequel to FIG. 24, FIG. 25(A) shows the monitor screen, and FIG. 25(B) shows the LCD screen;

FIG. 26 is an illustrative view explaining another part of the display control when a game is played, FIG. 26(A) shows a positional relationship between the monitor screen and the LCD screen, and FIG. 26(B) shows the LCD screen after change;

FIG. 29 is an illustrative view explaining a display control in the first modified example, FIG. 29(A) shows the monitor screen, and FIG. 29(B) shows the LCD screen;

FIG. 30 is an illustrative view sequel to FIG. 29, FIG. 30(A) shows the monitor screen, and FIG. 30(B) shows the LCD screen;

FIG. 31 is a flowchart showing a part of an operation by the CPUs in a second modified example, FIG. 31(A) shows an operation by the CPU of the console-type game apparatus, and FIG. 31(B) shows an operation by the CPU of the hand-held type game apparatus;

FIG. 32 is an illustrative view explaining a display control in the second modified example, FIG. 32(A) shows the monitor screen, and FIG. 32(B) shows the LCD screen; and FIG. 33 is an illustrative view sequel to FIG. 32, FIG. 33(A) shows the monitor screen, and FIG. 33(B) shows the LCD screen.

DETAILED DESCRIPTION OF THE PREFERRED EMBODIMENTS

Figure 1:
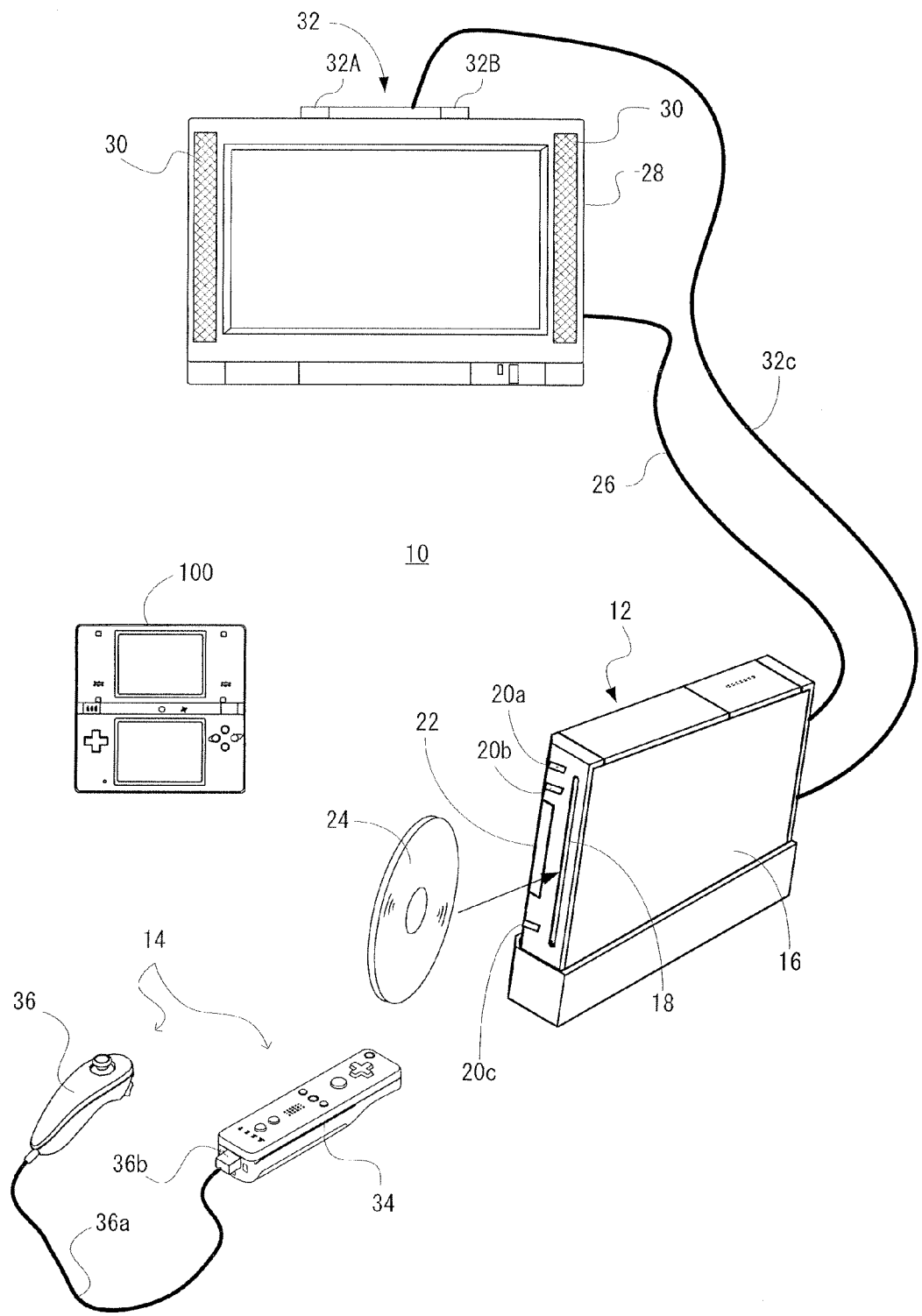
FIG. 1 is an illustrative view showing one embodiment of a game system.

Referring to FIG. 1, a game system 10 of one embodiment includes a game apparatus 12 (console-type game apparatus) and a controller 14. Although illustration is omitted, the game apparatus 12 of this embodiment is designed such that it can be connected to four controllers 14 at the maximum. Furthermore, the game apparatus 12 and each of the controllers 14 are wirelessly connected. For example, the wireless communication is executed according to an MP (Multilink Protocol) or Bluetooth (registered trademark) standard, but may be executed by other standards such as infrared rays, a wireless LAN, etc. Alternatively, they may be connected by wire.

The game apparatus 12 includes a roughly rectangular parallelepiped housing 16, and the housing 16 is furnished with a disk slot 18 on a front surface. An optical disk 24 as one example of an information storage medium storing a game program, etc. is inserted from the disk slot 18 to be loaded into a disk drive 54 (see FIG. 2) within the housing 16. Although omitted in the illustration, around the disk slot 18, an LED and a light guide plate are arranged so as to make the disk slot 18 light up and off or flash in response to various processing.

Furthermore, on a front surface of the housing 16 of the game apparatus 12, a power button 20a and a reset button 20b are provided at the upper part thereof, and an eject button 20c is provided below them. In addition, a connector cover for external memory card 22 is provided between the reset button 20b and the eject button 20c, and in the vicinity of the disk slot 18. Inside the connector cover for external memory card 22, a connector for external memory card 62 (see FIG. 2) is provided, through which an external memory card 38 (hereinafter simply referred to as a "memory card 38") not shown is inserted. The memory card is employed for loading the game program, etc. read from the optical disk 24 to temporarily store it, storing (saving) game data (result data, proceeding data of the game, or replay data described later) of the game played by means of the game system 10, and so forth. Here, storing the game data described above may be performed on an internal memory, such as a flash memory 44 (see FIG. 2) provided inside the game apparatus 12 in place of the memory card 38. Also, the memory card 38 may be utilized as a backup memory of the internal memory. In addition, in the game apparatus 12, an application other than the game can be executed, and in such a case, data of the other application can be saved in the memory card 38.

It should be noted that a general-purpose SD card can be employed as a memory card 38, but other general-purpose memory cards, such as memory sticks, multimedia cards (registered trademark) can be employed. The memory card 38 can be utilized in another game apparatuses 12A having a construction similar to the game apparatus 12, and thus, it is possible to offer the game data to other players via the memory card 38.

Although omitted in FIG. 1, the game apparatus 12 has an AV cable connector 58 (see FIG. 2) on the rear surface of the housing 16, and by utilizing the AV cable connector 58, a monitor 28 and a speaker 30 are connected to the game apparatus 12 through an AV cable 26. The monitor 28 and the speaker 30 are typically a color television receiver, and through the AV cable 26, a video signal from the game apparatus 12 is input to a video input terminal of the color television, and a sound signal from the game apparatus 12 is input to a sound input terminal thereof. Accordingly, a virtual three-dimensional game image of a three-dimensional (3D) video game, for example, is displayed on the screen of the color television (monitor) 28, and stereo game sound, such as a game music, a sound effect, etc. is output from right and left speakers 30. Around the monitor 28 (on the top side of the monitor 28, in this embodiment), a marker unit 32 including two infrared ray LEDs (markers) 32A and 32B is provided. The marker unit 32 is connected to the game apparatus 12 through a power source cable 32c. Accordingly, the marker unit 32 is supplied with power from the game apparatus 12. Thus, the markers 32A and 32B emit lights so as to output infrared rays ahead of the monitor 28.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

The controller 14, which is described in detail later, includes a first controller 34 and a second controller 36 each capable of being held with one hand as a first operation unit and a second operation unit, respectively. A cable 36a has one end extending from the rear end of the second controller 36 and the other end provided with a connector 36b. The connector 36b is connected to a connector 34a (FIG. 3, FIG. 5) provided on a rear end surface of the first controller 34. Input data obtained by the second controller 36 is applied to the first controller 34 through the cable 36a. The first controller 34 transmits controller data including the input data of the first controller 34 itself and the input data of the second controller 36.

In the game system 10, a user or a player turns the power of the game apparatus 12 on for playing the game (or applications other than the game) by a power switch 20a. Then, the user selects an appropriate optical disk 24 recording a program of a video game (or other applications the player wants to play), and loads the optical disk 24 into the disk drive 54 of the game apparatus 12. In response thereto, the game apparatus 12 starts to execute a video game or other applications on the basis of the program recorded in the optical disk 24. The user operates the controller 14 in order to apply an input to the game apparatus 12. For example, by operating any one of the operating buttons of the operating portion 82, a game or other application is started. Besides the operation performed on operating portion 82, by moving the controller 14 itself, it is possible to move a moving image object (player object) in different directions or change the perspective of the user (camera position of the virtual game) in a three-dimensional game world.

It should be noted that the video game and other application programs are stored (installed) in an internal memory (flash memory 44 (see FIG. 2)) of the game apparatus 12, and may be executed in the internal memory. In such a case, a program stored in a storage medium like an optical disk 24 may be installed in the internal memory, and the downloaded program may be installed in the internal memory.

Figure 2:
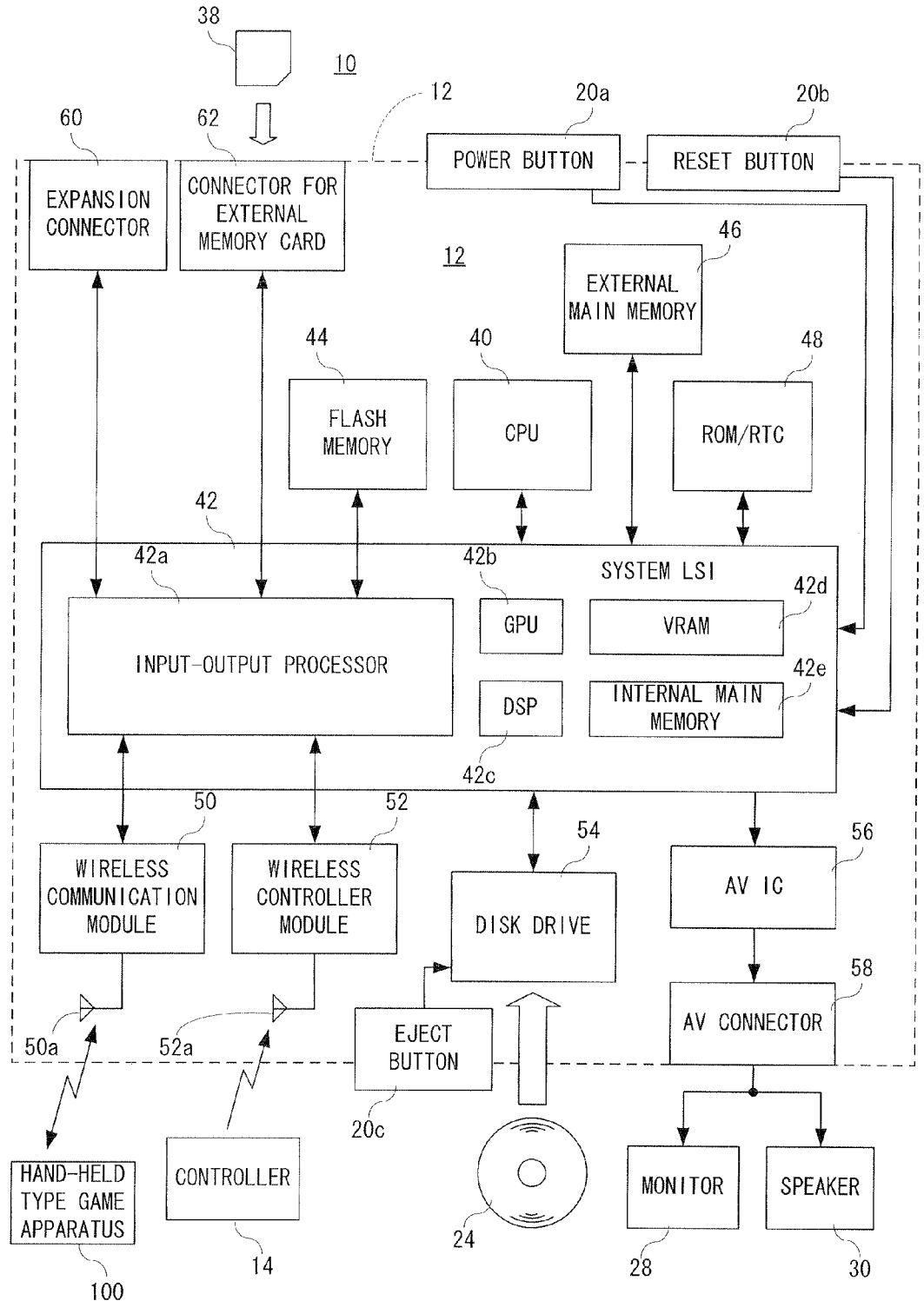
FIG. 2 is a block diagram showing an electric configuration of the game system.

FIG. 2 is a block diagram showing an electric configuration of the game system 10 shown in FIG. 1 embodiment. Although illustration is omitted, respective components within the housing 16 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, the disk drive 54, and an AV IC 56.

The external main memory 46 is utilized as a work area and a buffer area of the CPU 40 by storing programs like a game program, etc. and various data. The ROM/RTC 48, which is a so-called boot ROM, is incorporated with a program for activating the game apparatus 12, and is provided with a time circuit for counting a time. The disk drive 54 reads program, texture data etc. from the optical disk 24, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with one another by internal buses although illustration is omitted. The input-output processor (I/O processor) 42a executes transmission and reception of data and executes download of the data. The GPU 42b is made up of a part of a depicting means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire data (image data: data such as polygon data, texture data, etc.) required to execute the construction command. Here, the CPU 40 writes image data required for depicting to the VRAM 42d via the GPU 42b. The GPU 42b accesses the VRAM 42d to create game image data for depicting.

In this embodiment, a case that the GPU 42b generates game image data is explained, but in a case that an arbitrary application except for the game application is executed, the GPU 42b generates image data as to the arbitrary application.

Furthermore, the DSP 42c functions as an audio processor, and generates audio data corresponding to a sound, a voice, music, or the like to be output from the speaker 30 by means of the sound data and the sound wave (tone) data stored in the internal main memory 42e and the external main memory 46.

The game image data and audio data generated as described above are read by the AV IC 56, and output to the monitor 28 and the speaker 30 via the AV connector 58. Accordingly, a game screen is displayed on the monitor 28, and a sound (music) necessary for the game is output from the speaker 30.

Furthermore, the input-output processor 42a is connected with a flash memory 44, a wireless communication module 50 and a wireless controller module 52, and is also connected with an expansion connector 60 and a connector for external memory card 62. The wireless communication module 50 is connected with an antenna 50a, and the wireless controller module 52 is connected with an antenna 52a.

The input-output processor 42a can communicate with other game apparatuses and various servers (both of them are not shown) to be connected to a network via a wireless communication module 50. The input-output processor 42a periodically accesses the flash memory 44 to detect the presence or absence of data (referred to as data to be transmitted) being required to be transmitted to a network, and transmits it to the network via the wireless communication module 50 and the antenna 50a in a case that data to be transmitted is present. Furthermore, the input-output processor 42a receives data (referred to as received data) transmitted from another game apparatuses via the network, the antenna 50a and the wireless communication module 50, and stores the received data in the flash memory 44. In a case that the received data does not satisfy a predetermined condition, the reception data is abandoned as it is. In addition, the input-output processor 42a receives data (download data) downloaded from the server connected to the network via the network the antenna 50a and the wireless communication module 50, and stores the download data in the flash memory 44.

Furthermore, the input-output processor 42a receives input data transmitted from the controller 14 via the antenna 52a and the wireless controller module 52, and (temporarily) stores it in the buffer area of the internal main memory 42e or the external main memory 46. The input data is erased from the buffer area after being utilized in processing (game processing, for example) by the CPU 40.

Here, the input-output processor 42a can communicate with the same kind of another game apparatus and a hand-held-type game apparatus 100 (described later) directly without passing through the network via the wireless communication module 50.

In addition, the input-output processor 42a is connected with the expansion connector 60 and the connector for external memory card 62. The expansion connector 60 is a connector for interfaces, such as USB, SCSI, etc., and can be connected with medium such as an external storage and peripheral devices such as another controller different from the controller 14. Furthermore, the expansion connector 60 is connected with a cable LAN adaptor, and can utilize the cable LAN in place of the wireless communication module 50. The connector for external memory card 62 can be connected with an external storage like a memory card 38. Thus, the input-output processor 42a, for example, accesses the external storage via the expansion connector 60 and the connector for external memory card 62 to store and read the data.

Although a detailed description is omitted, as shown in FIG. 1 as well, the game apparatus 12 (housing 16) is furnished with the power button 20a, the reset button 20b, and the eject button 20c. The power button 20a is connected to the system LSI 42. When the power button 20a is turned on, the system LSI 42 is set to a mode of a normal energized state (referred to as "normal mode") in which the respective components of the game apparatus 12 are supplied with power through an AC adapter not shown. On the other hand, when the power button 20a is turned off, the system LSI 42 is set to a mode (hereinafter referred to as "standby mode") in which a part of the components of the game apparatus 12 is supplied with power, and the power consumption is reduced to minimum.

In this embodiment, in a case that the standby mode is set, the system LSI 42 issues an instruction to stop supplying the power to the components except for the input-output processor 42a, the flash memory 44, the external main memory 46, the ROM/RTC 48 and the wireless communication module 50, and the wireless controller module 52. Accordingly, in this embodiment, in the standby mode, the CPU 40 never executes an application.

The reset button 20b is also connected to the system LSI 42. When the reset button 20b is pushed, the system LSI 42 restarts a start-up program of the game apparatus 12. The eject button 20c is connected to the disk drive 54. When the eject button 20c is pushed, the optical disk 24 is ejected from the disk drive 54.

FIG. 3 shows one example of an external appearance of the first controller 34. FIG. 3 (A) is a perspective view of the first controller 34 as seeing it from above rear, and FIG. 3 (B) is a perspective view of the first controller 34 as seeing it from below front. The first controller 34 has a housing 80 formed by plastic molding, for example. The housing 80 is formed into an approximately rectangular parallelepiped shape regarding a back and forth direction (Z-axis direction shown in FIG. 3) as a longitudinal direction, and has a size small enough to be held by one hand of a child and an adult. As one example, the housing 80 has a length or a width approximately the same as that of the palm of the person. A player can perform a game operation by means of the first controller 34, that is, by pushing buttons provided on it and by changing a position and a direction of the first controller 34 itself.

The housing 80 is provided with a plurality of operation buttons (operation key). That is, on the top surface of the housing 80, a cross key 82a, a 1 button 82b, a 2 button 82c, an A button 82d, a − button 82e, a menu button 82f, and a + button 82g are provided. Meanwhile, on the bottom surface of the housing 80, a concave portion is formed, and on the reward inclined surface of the concave portion, a B button 82h is provided. Each of the buttons (switches) 82a-82h is assigned an appropriate function according to a game program to be executed by the game apparatus 12. Furthermore, the housing 80 has a power switch 82i for turning on/off the power of the main body of the game apparatus 12 from a remote place on a top surface. The respective buttons (switches) provided on the first controller 34 may inclusively be indicated with the use of the reference numeral 82.

At the back surface of the housing 80, the above-described connector 34a is provided. The connector 34a is a 32 pin edge connector, for example, and utilized for connecting other devices to the first controller 34. In this embodiment, the connector 34a is connected with the connector 36b of the second controller 36. At the back end of the top surface of the housing 80, a plurality of LEDs 84 are provided, and the plurality of LEDs 84 show a controller number (identification number of the controller) of the controller 14. The game apparatus 12 can be connected with a maximum four controllers 14, for example. If a plurality of controllers 14 are connected to the game apparatus 12, a controller number is applied to the respective controllers 14 in the connecting order, for example. Each LED 84 corresponds to the controller number, and the LED 84 corresponding to the controller number lights up.

Furthermore, inside the housing 80 of the first controller 34, an acceleration sensor 86 (FIG. 5) is provided. As an acceleration sensor 86, acceleration sensors of an electrostatic capacity type can typically be utilized. The acceleration sensor 86 detects accelerations of a linear component for each sensing axis and gravitational acceleration out of the accelerations applied to a detection portion of the acceleration sensor. More specifically, in this embodiment, a three-axis acceleration sensor is applied to detect the respective accelerations in directions of three axes of a up and down direction (Y-axial direction shown in FIG. 3), a right and left direction (X-axial direction shown in FIG. 3), and a forward and rearward direction (Z-axial direction shown in FIG. 3) of the first controller 34.

It should be noted that as an acceleration sensor 86, two-axis acceleration sensors may be utilized for detecting any two of the directions of the accelerations out of the up and down direction, the right and left direction and the back and forth direction according to the shape of the housing 80, the limitation on how to hold the first controller 34, or the like. Under certain circumstances, a one-axis acceleration sensor may be used.

Figure 5:
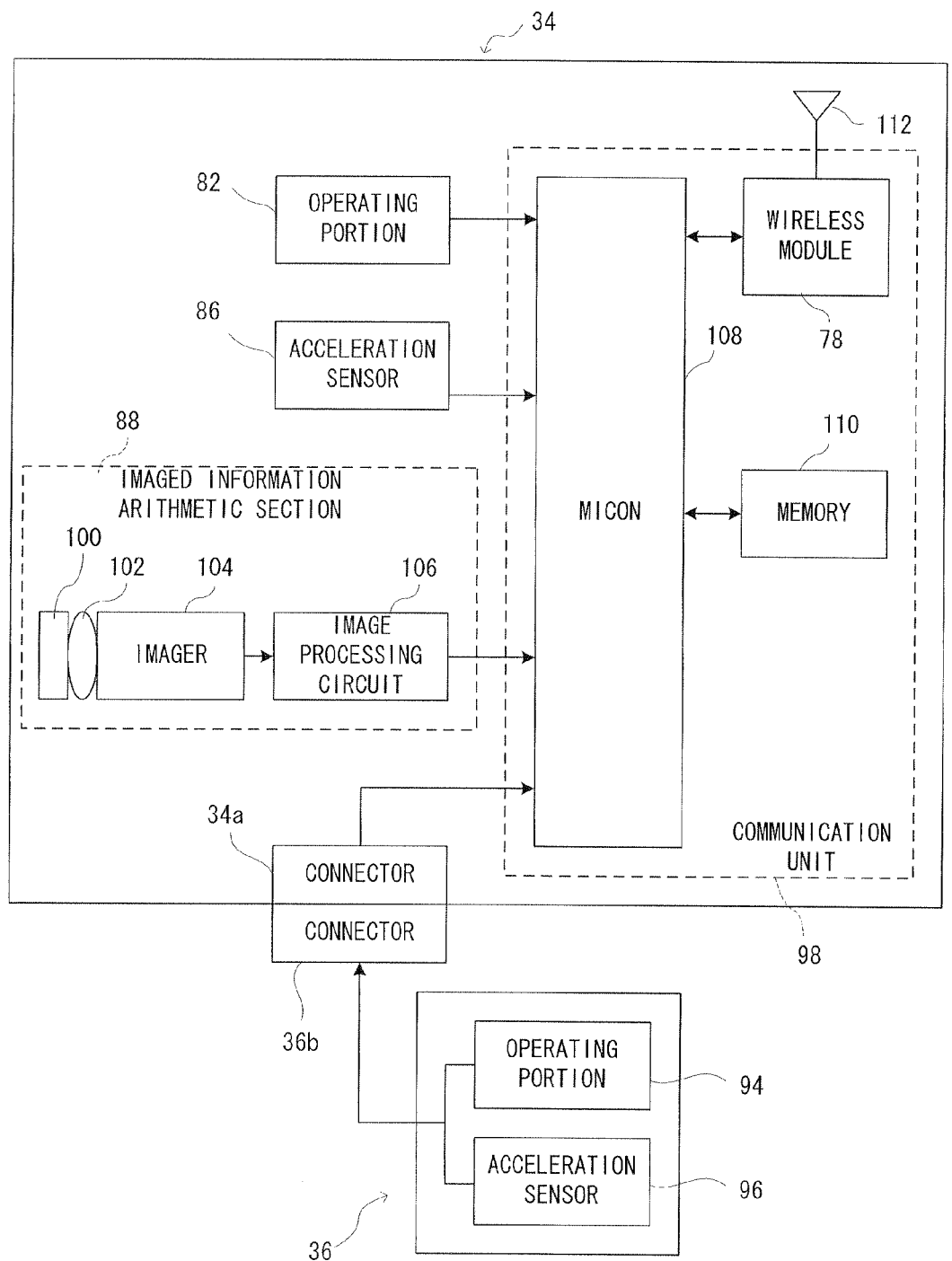
FIG. 5 is a block diagram showing an electric configuration of controllers (the first controller and the second controller are connected with each other)

In addition, the first controller 34 has an imaged information arithmetic section 88 (see FIG. 5). As shown in FIG. 3 (B), on the front end surface of the housing 80, a light incident opening 90 of the imaged information arithmetic section 88 is provided, and from the light incident opening 90, infrared rays emitted by the markers 44m and 44n of the sensor bar 44 are captured.

FIG. 4 shows one example of an appearance of the second controller 36. FIG. 4 (A) is a perspective view of the second controller 36 as seeing it from above rear, and FIG. 4 (B) is a perspective view of the second controller 36 as seeing it from below front. Additionally, in FIG. 4, the cable 36a of the second controller 36 is omitted.

The second controller 36 has a housing 92 formed by plastic molding, for example. The housing 92 is formed into an approximately thin long elliptical shape in the forward and backward directions (Z-axis direction in FIG. 4) when viewed from plan, and the width of the right and left direction (X-axis direction in FIG. 4) at the back end is narrower than that of the front end. Furthermore, the housing 92 has a curved shape as a whole when viewed from a side, and downwardly curved from a horizontal portion at the front end to the back end. The housing 92 has a size small enough to be held by one hand of a child and an adult similar to the first controller 34 as a whole, and has a longitudinal length (in the Z-axis direction) slightly shorter than that of the housing 80 of the first controller 34. Even with the second controller 36, the player can perform a game operation by operating buttons and a stick, and by changing a position and a direction of the controller by moving itself.

At the end of the top surface of the housing 92, an analog joystick 94a is provided. At the end of the housing 92, a front edge slightly inclined backward is provided, and on the front edge are provided a C button 94b and a Z button 94c vertically arranged (Y-axis direction in FIG. 4). The analog joystick 94a and the respective buttons 94b and 94c are assigned appropriate functions according to a game program to be executed by the game apparatus 12. The analog joystick 94a and the respective buttons 94b and 94c provided to the second controller 36 may be inclusively denoted by means of the reference numeral 94.

Inside the housing 92 of the second controller 36, an acceleration sensor 96 (FIG. 5) is provided. As the acceleration sensor 96, an acceleration sensor similar to the acceleration sensor 86 in the first controller 34 is applied. More specifically, the three-axis acceleration sensor is applied in this embodiment, and detects accelerations in the respective three axis directions like an up and down direction (Y-axial direction shown in FIG. 4), a right and left direction (X-axial direction shown in FIG. 4), and a forward and backward direction (Z-axial direction shown in FIG. 4) of the second controller 36.

Additionally, the shapes of the first controller 34 shown in FIG. 3 and the second controller 36 shown in FIG. 4 and the shape, the number and the setting position of the buttons (switches, stick, or the like), etc. are merely one example, and can be changed to other shapes, numbers and setting positions, etc. as needed.

Furthermore, the controller 14 is powered by a battery (not illustrated) detachably housed in the first controller 34. The second controller 36 is supplied with the power through the connector 34a, the connector 40, and the cable 36a.

FIG. 5 shows one example of an electric configuration of the controller 14 when the first controller 34 and the second controller 36 are connected with each other. The first controller 34 has a communication unit 98, and the communication unit 98 is connected with the operating portion 82, the acceleration sensor 86, the imaged information arithmetic section 88 and the connector 34a. The operating portion 82 indicates the above-described operation buttons or operating switches 82a-82i. When the operating portion 82 is operated, an operation signal (key information) is applied to the communication unit 98. The data indicative of acceleration detected by the acceleration sensor 86 is output to the communication unit 98. The acceleration sensor 86 has in the order of a maximum sampling period of 200 frames per second.

The data taken in by the imaged information arithmetic section 88 is also output to the communication unit 98. The imaged information arithmetic section 88 is constituted by an infrared filter 100, a lens 102, an imager 104 and an image processing circuit 106. The infrared filter 100 passes only infrared rays from the light incident from the light incident opening 90 at the front of the first controller 34. As described above, the markers 44m and 44n of the sensor bar 44 placed near (around) the display screen of the monitor 30 are infrared LEDs for outputting infrared lights forward the monitor 30. Accordingly, by providing the infrared filter 100, it is possible to image the image of the markers 44m and 44n more accurately. The lens 102 condenses the infrared rays passing thorough the infrared filter 100 to emit them to the imager 104. The imager 104 is a solid imager, such as a CMOS sensor and a CCD, for example, and images the infrared rays condensed by the lens 102. Accordingly, the imager 104 images only the infrared rays passing through the infrared filter 100 to generate image data. Hereafter, the image imaged by the imager 104 is called an "imaged image". The image data generated by the imager 104 is processed by the image processing circuit 106. The image processing circuit 106 calculates positions of objects to be imaged (markers 44m and 44n) within the imaged image, and outputs marker coordinates data including each coordinate value indicative of the position to the communication unit 98 for each predetermined time (one frame, for example). It should be noted that a description of the image processing circuit 106 is made later.

The connector 34a is connected with the connector 36b of the cable 36a extending from the second controller 36. The connector 36b is connected with the operating portion 94 and the acceleration sensor 96 of the second controller 36. The operating portion 94 denotes the above-described analog joystick 94a and operation buttons 94b and 94c. When the operating portion 94 is operated, an operation signal is applied to the communication unit 98 via the cable 36a, the connector 36b, the connector 34a, etc. The acceleration sensor 96 also has a sampling period similar to that of the acceleration sensor 86, and applies the data indicative of the detected acceleration to the communication unit 98.

The communication unit 98 includes a microcomputer (micon) 108, a memory 110, a wireless module 78 and an antenna 112. The micon 108 transmits the obtained data to the game apparatus 12 and receives data from the game apparatus 12 by controlling the wireless module 78 while using the memory 110 as a memory area (working area and buffer area) in processing.

The data output from the operating portion 82, the acceleration sensor 86 and the imaged information arithmetic section 88 of the first controller 34, and the operating portion 94 and acceleration sensor 96 of the second controller 36 to the micon 108 is temporarily stored in the memory 110. The wireless transmission from the communication unit 98 to the Bluetooth communication unit 76 of the game apparatus 12 is performed every predetermined cycle. The game processing is generally performed by regarding 1/60 seconds as a unit, and therefore, it is necessary to perform the transmission from the first controller 34 at a cycle equal to or shorter than it. The micon 108 outputs data including the operation data of the operating portions 82 and 94 and the acceleration data of the acceleration sensors 86 and 96, and marker coordinates data from the imaged information arithmetic section 88 stored in the memory 110 to the wireless module 78 as controller data when transmission timing to the game apparatus 12 has come. The wireless module 78 modulates a carrier of a predetermined frequency by the controller data, and emits its weak radio wave signal from the antenna 112 by using a short-range wireless communication technique, such as Bluetooth. Namely, the controller data is modulated to the weak radio wave signal by the wireless module 78 and transmitted from the first controller 34. The weak radio wave signal is received by the Bluetooth communication unit 76 of the game apparatus 12. The weak radio wave thus received is subjected to demodulating and decoding processing, thus making it possible for the game apparatus 12 to obtain the controller data. The CPU 46 of the game apparatus 12 performs the game processing on the basis of the controller data obtained from the controller 14.

It will be appreciated by those skilled in the art from the description of this specification that a computer, such as a processor (CPU 46, for example) of the game apparatus 12 or the processor (micon 108, for example) of the controller 14 executes processing on the basis of an acceleration signal output from the acceleration sensors 86 and 96, and whereby, more information relating to the controller 14 can be estimated or calculated (determined). In a case that processing is executed on the side of the computer assuming that the first controller 34 and second controller 36 respectively incorporated with the acceleration sensors 86 and 96 are in a static state (that is, processing is executed considering that accelerations detected by the acceleration sensors 86 and 96 are only gravitational accelerations), if the first controller 34 and the second controller 36 are actually in a static state, it is possible to know whether or not the orientations of the first controller 34 and the second controller 36 are inclined with respect to the direction of gravity or to what extent they are inclined on the basis of the detected acceleration. More specifically, when a state in which the detection axes of the acceleration sensors 86 and 96 are directed to a vertically downward direction is taken as a reference, merely whether or not 1G (gravitational acceleration) is imposed on can show whether or not each of the first controller 34 and the second controller 36 is inclined, and the size can show to what extent each of them is inclined. Furthermore, if a multi-axes acceleration sensor is applied, by further performing processing on an acceleration signal of each axis, it is possible to more precisely know to what extent the first controller 34 and the second controller 36 are inclined with respect to the direction of gravity. In this case, on the basis of outputs from the acceleration sensors 86 and 96, the computer may perform processing of calculating data of inclined angles of the first controller 34 and second controller 36, but perform processing of estimating an approximate inclination on the basis of the outputs from the acceleration sensors 86 and 96 without performing the processing of calculating the data of the inclined angle. Thus, by using the acceleration sensors 86 and 96 in conjunction with the computer, it is possible to determine an inclination, an orientation or a position of each of the first controller 34 and second controller 36.

On the other hand, assuming that the acceleration sensors 86 and 96 are in a dynamic state, accelerations according to the movement of the acceleration sensors 86 and 96 are detected in addition to the gravitational acceleration component, and therefore, if the gravitational acceleration component is removed by predetermined processing, it is possible to know a moving direction, etc. More specifically, in a case that the first controller 34 and the second controller 36 respectively being furnished with the acceleration sensors 86 and 96 are accelerated and moved by the hands of the user, acceleration signals generated by the acceleration sensors 86 and 96 are processed by the above-described computer, and whereby, it is possible to calculate various movements and/or positions of the first controller 34 and the second controller 36. Additionally, even when assuming that the acceleration sensors 86 and 96 are in a dynamic state, if an acceleration in correspondence with the movement of each of the acceleration sensors 86 and 96 is removed by the predetermined processing, it is possible to know the inclination with respect to the direction of gravity. In another embodiment, each of the acceleration sensors 86 and 96 may contain a built-in signal processing apparatus or other kinds of dedicated processing apparatuses for performing desired processing on the acceleration signal output from the incorporated acceleration detecting means before outputting the signal to the micon 108. For example, in a case that the acceleration sensors 86 and 96 are ones for detecting a static acceleration (gravitational acceleration, for example), the built-in or dedicated processing apparatuses may be ones for transforming the detected acceleration signal into the inclined angle (or other preferable parameters) corresponding thereto.

Figure 6:
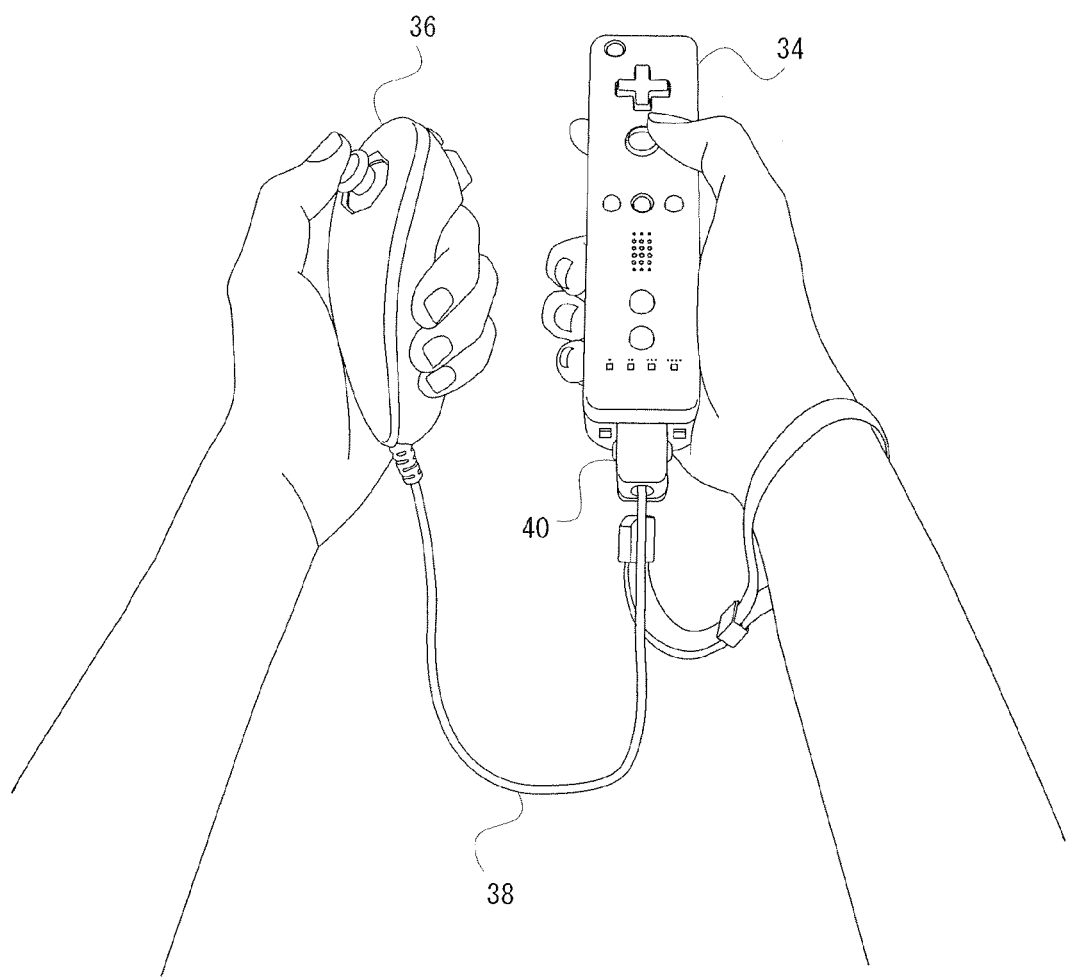
FIG. 6 is an illustrative view summarizing a situation that a virtual game is played by utilizing the controllers.

In this game system 10, a user can make an operation or input to the game by moving the controller 14. In playing the game, the user holds the first controller 34 with the right hand and the second controller 36 with the left hand as shown in FIG. 6. As described above, in this embodiment, the first controller 34 contains the acceleration sensor 86 for detecting accelerations in the three-axis directions, and the second controller 36 also contains the same acceleration sensor 96. When the first controller 34 and the second controller 36 are moved by the user, acceleration values respectively indicating the movements of the controllers are detected by the acceleration sensor 86 and the acceleration sensor 96. In the game apparatus 12, game processing can be executed according to the detected acceleration values.

Furthermore, the first controller 34 is provided with the imaged information arithmetic section 88, and this makes it possible for the user to utilize the first controller 34 as a pointing device. In this case, the user holds the first controller 34 with the edge surface (light incident opening 90) of the first controller 34 directed to the markers 44m and 44n. It should be noted that as understood from FIG. 1, the markers 44m and 44n are placed around a predetermined side (top or bottom) of the monitor 30 in parallel with a predetermined side. In this state, the user can perform a game operation by changing a position on the screen designated by the first controller 34 by moving the first controller 34 itself, and by changing distances between the first controller 34 and each of the markers 44m and 44n.

Figure 7:
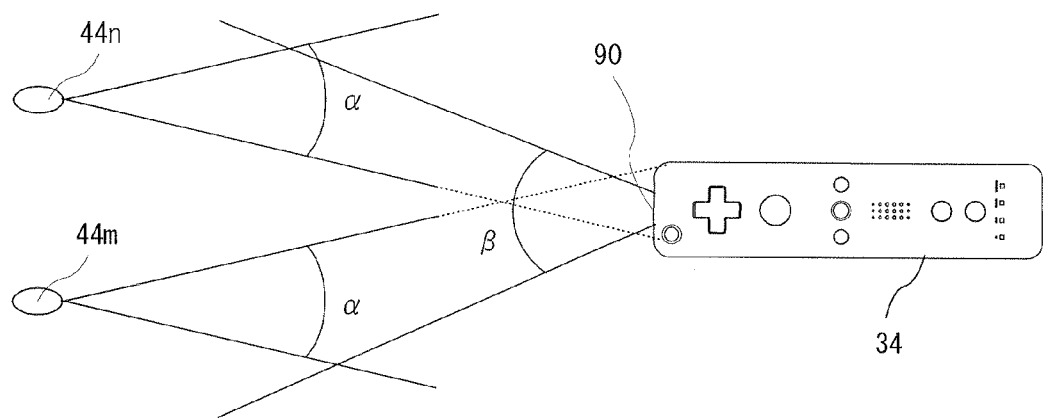
FIG. 7 is an illustrative view showing viewing angles of a marker and the controller.

FIG. 7 is a view explaining viewing angles between the respective markers 44m and 44n, and the first controller 34. As shown in FIG. 7, each of the markers 44m and 44n emits infrared ray within a range of a viewing angle $\alpha$. Also, the imager 104 of the imaged information arithmetic section 88 can receive incident light within the range of the viewing angle $\beta$ taking the line of sight of the first controller 34 (Z axis direction in FIG. 3) as a center. For example, the viewing angle $\alpha$ of each of the markers 44m and 44n is 34° (half-value angle) while the viewing angle $\beta$ of the imager 104 is 42°. The user holds the first controller 34 such that the imager 104 is directed and positioned so as to receive the infrared rays from the markers 44m and 44n. More specifically, the user holds the first controller 34 such that at least one of the markers 44m and 44n exists in the viewing angle $\beta$ of the imager 104, and the first controller 34 exists in at least one of the viewing angles $\alpha$ of the marker 44m or 44n. In this state, the first controller 34 can detect at least one of the markers 44m and 44n. The user can perform a game operation by changing the position and the orientation of the first controller 34 in the range satisfying the state. Also, in a case that any one of the makers 44m and 44n is only detected, by setting temporary marker coordinates in place of the other marker which is not detected by means of data detecting the previous two makers 44m and 44n, a designated position by the first controller 34 can be calculated.

If the position and the orientation of the first controller 34 are out of the range, the game operation based on the position and the orientation of the first controller 34 cannot be performed. Hereafter, the above-described range is called an "operable range."

Figure 8:
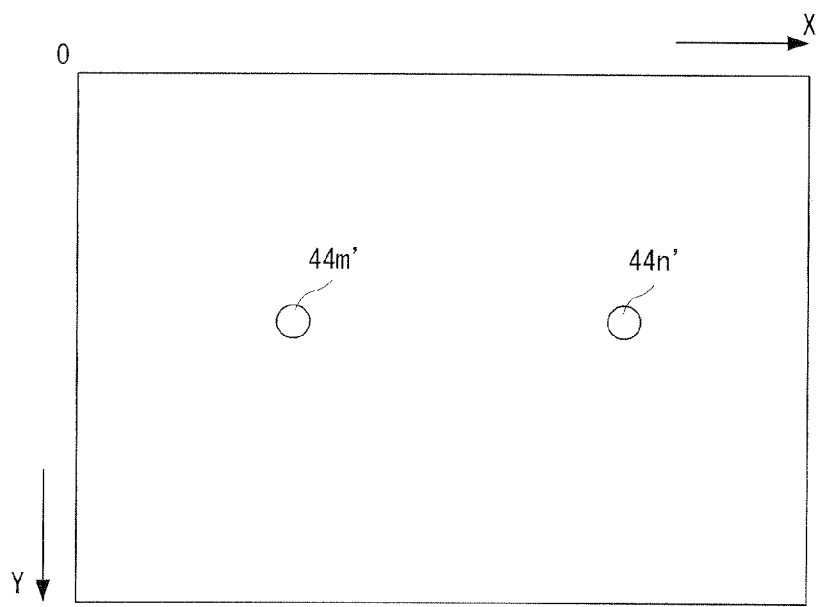
FIG. 8 is an illustrative view showing one example of an imaged image by the controller.

If the first controller 34 is held within the operable range, an image of each of the markers 44m and 44n is imaged by the imaged information arithmetic section 88. That is, the imaged image obtained by the imager 104 includes an image (object image) of each of the markers 44m and 44n as an object to be imaged. FIG. 8 is an illustrative view showing one example of the imaged image including object images. The image processing circuit 106 calculates coordinates (marker coordinates) indicative of the position of each of the markers 44m and 44n in the imaged image by utilizing the image data of the imaged image including the object images 44m' and 44n'.

Since the object images 44m' and 44n' appear as high-intensity parts in the image data of the imaged image, the image processing circuit 106 first detects the high-intensity parts as a candidate of the object images. Next, the image processing circuit 106 determines whether or not each of the high-intensity parts is an object image on the basis of the size of the detected high-intensity part. The imaged image may include images other than the object image due to sunlight through a window and light of a fluorescent lamp in the room as well as the two object images 44m' and 44n' (marker images). The determination processing whether or not the high-intensity part is an object image is executed for discriminating the images 44m' and 44n' of the two markers 44m and 44n as object images from the images other than them, and accurately detecting the object images. In order to discriminate the object images 44m' and 44n' in the imaged image from other images, the imaging objects 44m and 44n are necessary to be known, and in this embodiment, the size is decided in advance, and therefore, it is possible to estimate the size of the marker images 44m' and 44n'. Thus, on the basis of the size of the high-intensity part, it is possible to make a determination of the marker images 44m' and 44n'. More specifically, in the determination process, it is determined whether or not each of the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 106 calculates the position of the high-intensity part. More specifically, the barycenter position of the high-intensity part is calculated. Here, the coordinates of the barycenter position is called a "marker coordinates". Also, the barycenter position can be calculated with more detailed scale than the resolution of the imager 104. Now, the resolution of the imaged image imaged by the imager 104 shall be 126×96, and the barycenter position shall be calculated with the scale of 1024×768. That is, the marker coordinates is represented by the integer from (0, 0) to (1024, 768).

Additionally, as shown in FIG. 8, the position in the imaged image is represented in a coordinate system (X-Y coordinate system of the imaged image) by taking the upper left of the imaged image as an original point O, the downward direction as the Y-axis positive direction, and the right direction as the X-axis positive direction.

Furthermore, in a case that the object images 44m' and 44n' are accurately detected, two high-intensity parts are determined as object images by the determination processing, and therefore, it is possible to calculate two marker coordinates. The image processing circuit 106 outputs data indicative of the calculated two marker coordinates, that is, imaging object data indicative of positions of the imaging objects to the communication unit 98. The output imaging object data (marker coordinate data) is included in the controller data by the micon 108 as described above, and transmitted to the game apparatus 12.

When taking in the marker coordinate data from the received controller data, the game apparatus 12 (CPU 46) can calculate a designated position (designated coordinates) of the first controller 34 on the screen of the monitor 30 and the distance from the first controller 34 to each of the markers 44m and 44n on the basis of the marker coordinate data. For example, when the first controller 34 designates the left end of the monitor 30, the object images 44m' and 44n' are detected at the right of the imaged image, and when the first controller 34 designates the lower end of the screen, the object images 44m' and 44n' are detected at the upper portion of the imaged image. In other words, the marker coordinates on the imaged image are detected at positions reverse to the designated position of the first controller 34 on the screen. Accordingly, when the coordinates of the designated position of the first controller 34 are calculated from the marker coordinates, the coordinate system is appropriately transformed from the coordinate system of the imaged image in FIG. 8 to a coordinate system for representing positions on the screen.

Additionally, in this embodiment, the first controller 34 performs predetermined arithmetic processing on the imaged data to detect the marker coordinates, and transmit the marker coordinate data to the game apparatus 12. However, in another embodiment, imaged data is transmitted as controller data from the first controller 34 to the game apparatus 12, and the CPU 46 of the game apparatus 12 performs predetermined arithmetic processing on the imaged data to detect the marker coordinates and the coordinates of the designated position.

Furthermore, the distance between the object images in the imaged image is changed depending on the distance between the first controller 34 and each of the markers 44m and 44n. Since the distance between the markers 44m and 44n, the width of the imaged image, and the viewing angle β of the imager 104 are decided in advance, by calculating the distance between the two marker coordinates, the game apparatus 12 can calculate the current distance between the first controller 34, and each of the markers 44m and 44n.

As described above, in the game system 10, the player generally operates the controller 14, and the game apparatus 12 executes game processing based on controller data from the controller 14. Here, the game apparatus 12 can perform wireless communications with the game apparatus 100 as described before, there are some games utilizing the game apparatus 100 as a controller ("pop-up" game, for example, described later). In a case that such kind of game is played, the game system 10 further includes a game apparatus 100 (handheld type game apparatus).

Figure 9:
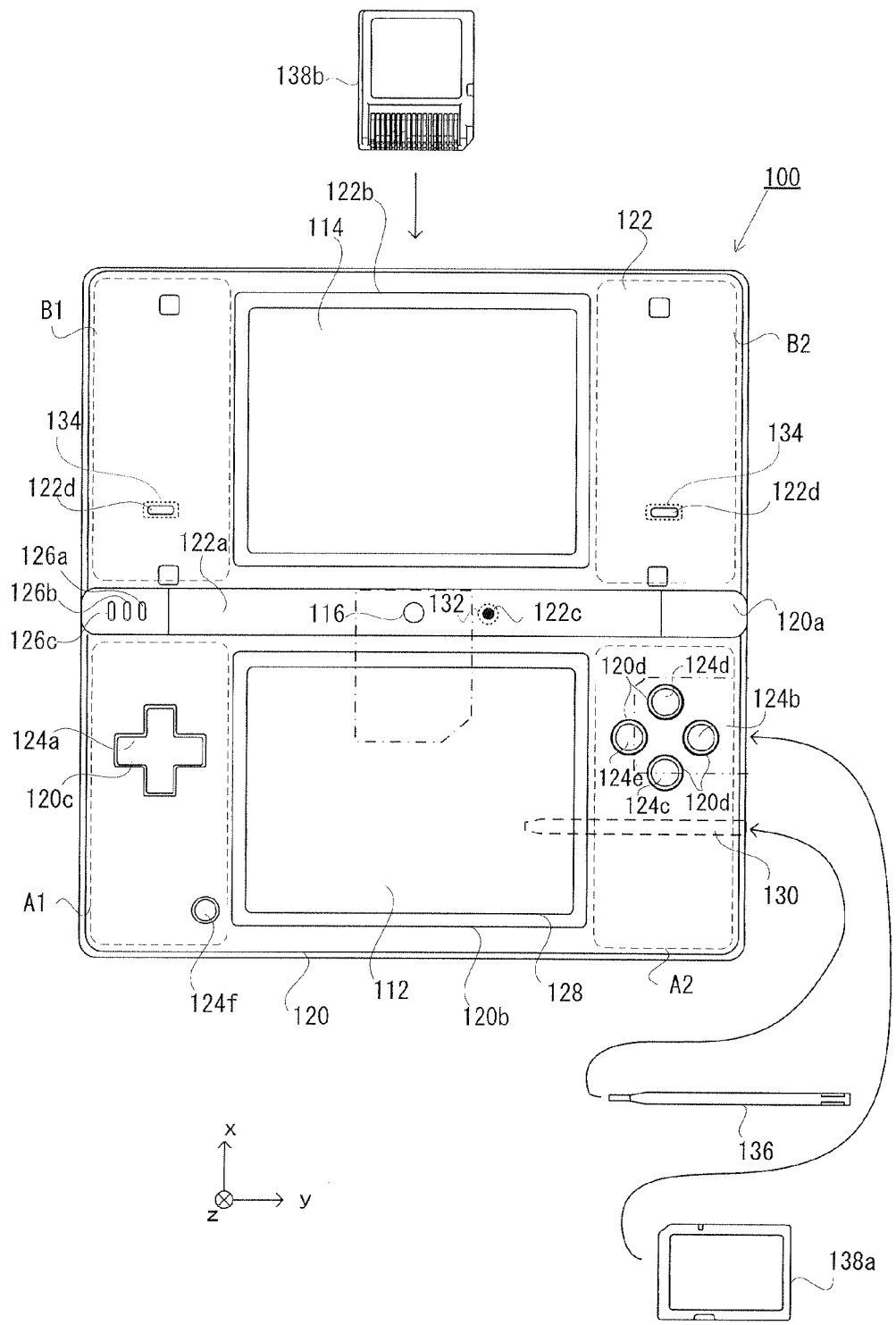
FIG. 9 is an external view of a hand-held-type game apparatus, and shows a top surface in an open state.
Figure 10:
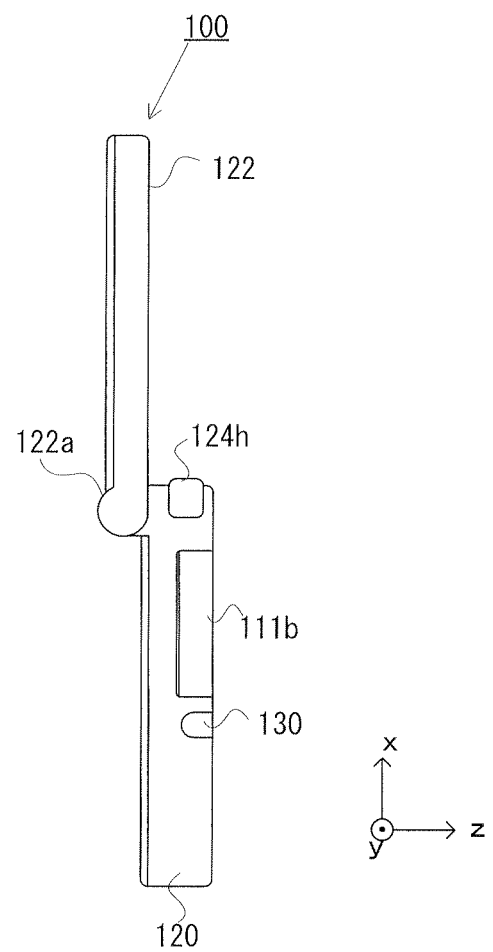
FIG. 10 is an external view of the hand-held-type game apparatus, and shows a side surface in the open state.
Figure 11:
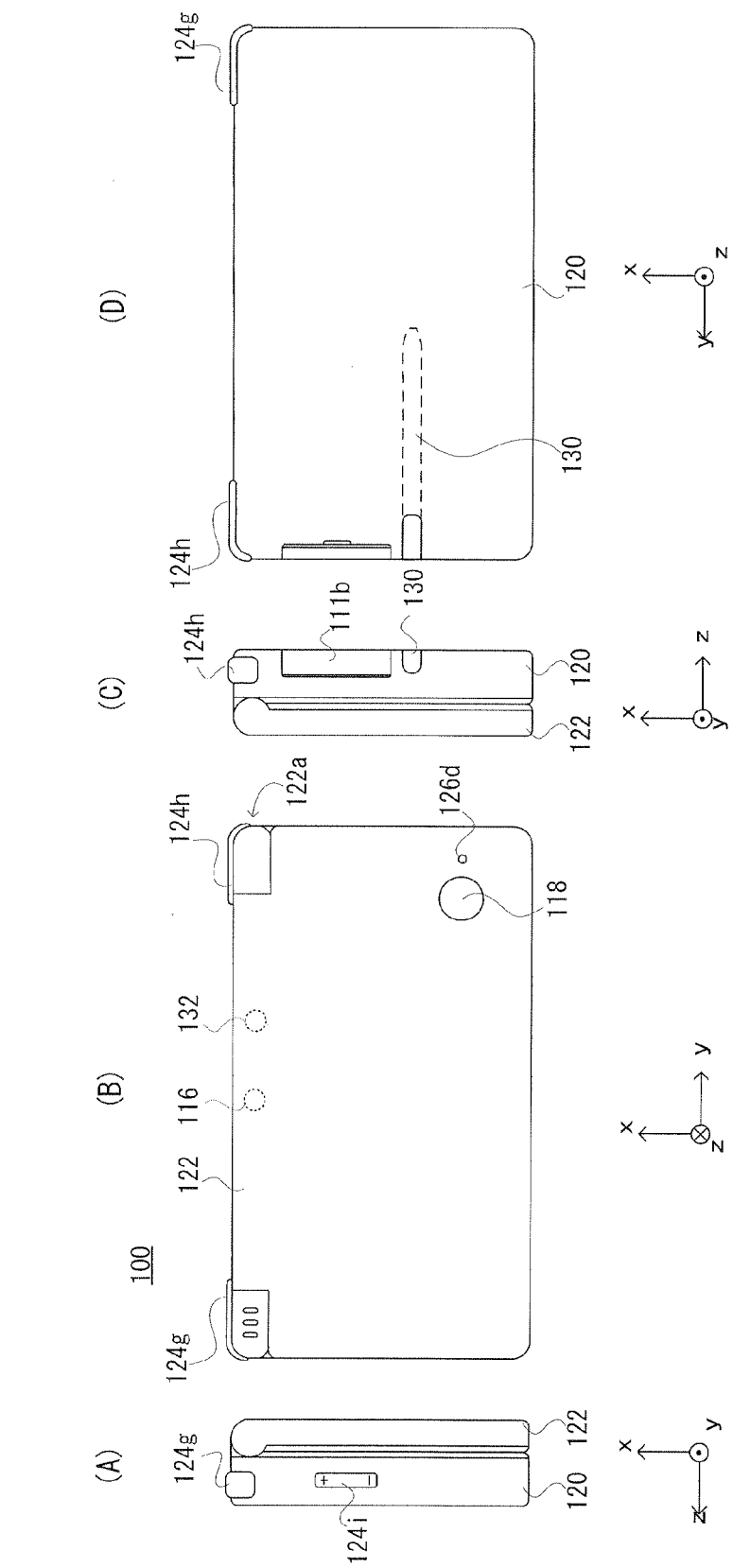
FIG. 11 is an external view of the hand-held-type game apparatus.

In FIG. 9 to FIG. 11, an external view of a game apparatus 100 is shown. The game apparatus 100 is a foldable game apparatus, and each of FIG. 9 and FIG. 10 shows the game apparatus 100 in a opened state (open state), and FIG. 11 shows the game apparatus 100 in a closed state (close state). Furthermore, FIG. 9 is a front view of the game apparatus 100 in the open state, and FIG. 10 is a side view of the game apparatus in the open state. The game apparatus 100 has two displays (LCDs 112 and 114) and two cameras (cameras 116 and 118), can image an image with the camera, display the imaged image and store the data of the imaged image.

The game apparatus 100 is constructed small enough to be held by the user with both of the hands or one hand even in the open state.

The game apparatus 100 has two housings of a lower housing 120 and an upper housing 122. The lower housing 120 and the upper housing 122 are connected with each other so as to be opened or closed (foldable). In this embodiment, the respective housings 120 and 122 are formed in the form of plate of a horizontally long rectangular, and are rotatably connected with each other at the long sides of both of the housings.

The upper housing 122 is supported pivotally at a part of the upper side of the lower housing 120. This makes the game apparatus 100 to take a close state (the angle formed by the lower housing 120 and the upper housing 122 is about 0° (see FIG. 11)) and an open state (the angle formed by the lower housing 120 and the upper housing 122 is about 180° (see FIG. 10)). The user generally uses the game apparatus 100 in the open state, and keeps the game apparatus 100 in the close state when not using the game apparatus 100. Furthermore, the game apparatus 100 can maintain the angle formed by the lower housing 120 and the upper housing 122 at an arbitrary angle between the close state and the open state by friction, etc. exerted on the hinge as well as the close state and the open state as described above. That is, the upper housing 112 can be fixed with respect to the lower housing 114 at an arbitrary angle.

First, the configuration of the lower housing 120 is first explained. As shown in FIG. 9, the game apparatus 100 has the lower LCD (liquid crystal display) 112. The lower LCD 112 takes a horizontally-long shape, and is arranged such that the direction of the long side is coincident with the long side of the lower housing 120. The lower LCD 112 is provided on an inner surface of the lower housing 120. Accordingly, if the game apparatus 100 is not to be used, the game apparatus 100 is in the close state to thereby prevent the screen of the lower LCD 112 from being soiled, damaged, and so forth. Additionally, in this embodiment, an LCD is used as a display, but other arbitrary displays, such as a display utilizing EL (Electro Luminescence), for example, may be used. Furthermore, the game apparatus 100 can employ a display of an arbitrary resolution. Additionally, in a case that the game apparatus 100 is used as an imaging device, the lower LCD 112 is used for displaying, in real time, images (through image) imaged by the camera 116 or 118.

The inner surface of the lower housing 120 is formed to be approximately planar. At the center of the inner surface, an opening 120b for exposing the lower LCD 112 is formed. At the left of the opening 120b (in the negative direction of the y axis in the drawing), an opening 120c is formed, and at the right of the opening 120b, an opening 120d is formed. The openings 120b and 120c are for exposing the respective keytops (the top surfaces of the respective buttons 124a to 124e). Then, the screen of the lower LCD 112 provided inside the lower housing 120 is exposed from the opening 120b, and the respective keytops are exposed from the openings 120e and 120d. Thus, on the inner surface of the lower housing 120, on both sides of the opening 120b for the lower LCD 112 set at the center, non-screen areas (dotted line areas A1 and A2 shown in FIG. 9. More specifically, areas for arranging the respective buttons 124a to 124e; button arranging area) are provided.

On the lower housing 120, the respective buttons 124a to 124i and a touch panel 128 are provided as input devices. As shown in FIG. 9, the direction input button 124a, the button 124b, the button 124c, the button 124d, the button 124e, and the power button 124f out of the respective buttons 124a to 124i are provided on the inner surface of the lower housing 120. The direction input button 124a is utilized for a selecting operation, for example, and the respective buttons 124b to 124e are utilized for a decision operation and a cancel operation, for example. The power button 124f is utilized for turning on/off the power of the game apparatus 100. Here, the direction input button 124a and the power button 124f are provided on one side (left side in FIG. 9) of the lower LCD 112 provided at substantially the center of the lower housing 120, and the buttons 124b to 124e are provided at the other side (right side in FIG. 9) of the lower LCD 112. The direction input button 124a and the buttons 124b to 124e are utilized for performing various operations to the game apparatus 100.

FIG. 11(A) is a left side view of the game apparatus 100 in the close state, FIG. 11(B) is a front view of the game apparatus 100, FIG. 11(C) is a right side view of the game apparatus 100, and FIG. 11(D) is a rear view of the game apparatus 100. As shown in FIG. 11(A), the volume button 124i is provided on the left side surface of the lower housing 120. The volume button 124i is utilized for adjusting a volume of a speaker 134 furnished in the game apparatus 100. Furthermore, as shown in FIG. 11(B), the button 124h is provided at the right corner of the upper side surface of the lower housing 120. The button 124g is provided at the left corner of the upper side surface of the lower housing 120. The both of the buttons 124g and 124h are utilized for performing an imaging instructing operation (shutter operation) on the game apparatus 100, for example. Alternatively, both of the buttons 124g and 124h may be made to work as shutter buttons. In this case, a right-handed user can use the button 124h, and a left-handed user can use the button 124g, capable of improving usability for both of the users. Additionally, the game apparatus 100 can constantly make both of the buttons 124g and 124h valid as shutter buttons, or the game apparatus 100 is set to be a right-handed use or a left-handed use (the setting is input by the user according to a menu program, etc. and the set data is stored), and when the right-handed use is set, only the button 124h is made valid, and when the left-handed use is set, only the button 124g may be made valid.

As shown in FIG. 9, the game apparatus 100 is further provided with the touch panel 128 as an input device other than the respective operation buttons 124a to 124i. The touch panel 128 is set on the screen of the lower LCD 112. In this embodiment, the touch panel 128 is a touch panel of a resistance film system. Here, the touch panel can employ arbitrary push type touch panels over the resistance film system. In this embodiment, as the touch panel 128, a touch panel having the same resolution (detection accuracy) as that of the lower LCD 112 is utilized. The resolution of the touch panel 128 and the resolution of the lower LCD 112 are not necessarily coincident with each other. Furthermore, at the right side surface of the lower housing 120, an inserting portion 130 (shown by a dotted line in FIG. 9 and FIG. 11(D)) is provided. The inserting portion 130 can accommodate a touch pen 136 utilized for performing an operation on the touch panel 128. It should be noted that an input to the touch panel 128 is generally performed by means of the touch pen 136, but can be performed on the touch panel 128 with fingers of the user besides the touch pen 136.

As shown in FIG. 10 and FIG. 11 (C), on the right side surface of the lower housing 120, an openable and closeable cover portion 11b is provided. Inside the cover portion 11b, a loading slot (dashed line) for loading a memory card 138a and a connector (not illustrated) for electrically connecting the game apparatus 100 and the memory card 138a are provided. The memory card 138a is detachably attached to a connector.

The memory card 138a is used for storing (saving) image data imaged by the game apparatus 100, for example.

Furthermore, on the top surface of the lower housing 120, a loading slot (chain double-dashed line) 138b for loading a memory card and a connector (not shown) for electrically connecting the game apparatus 100 and the memory card 138b are provided. The memory card 138b is utilized for storing a program operated in the game apparatus 100, for example.

As shown in FIG. 9, at the left of the shaft portion 120a of the lower housing 120, three LEDs 126a to 126c are attached. Here, the game apparatus 100 can perform a wireless communication with the same kind of another game apparatus and the aforementioned game apparatus 12, and the first LED 126a lights up when a wireless communication is established. The second LED 126b lights up while the game apparatus 100 is recharged. The third LED 126c lights up when the main power supply of the game apparatus 100 is turned on. Accordingly, by the three LEDs 126a to 126c, it is possible to inform the user of a communication-established state, a charge state, and a main power supply on/off state of the game apparatus 100.

Figure 12:
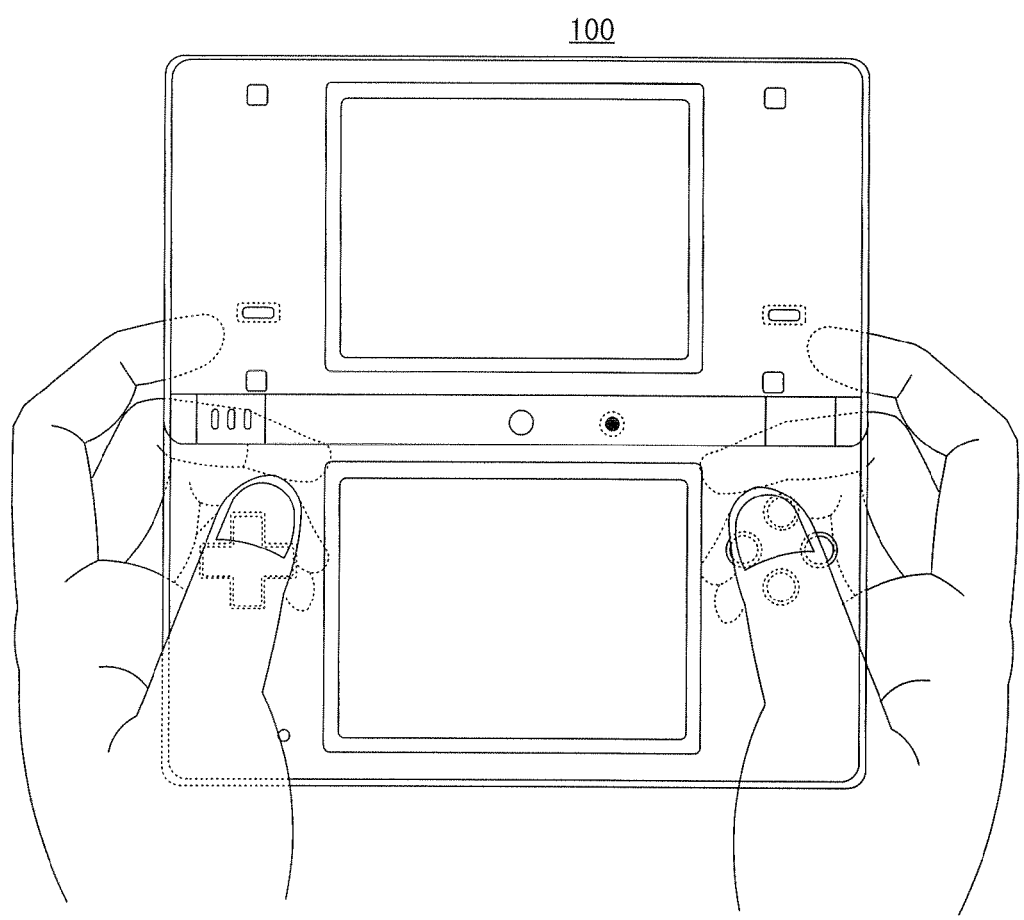
FIG. 12 is an illustrative view showing a situation in which the hand-held-type game apparatus is held by the user.

As described above, the lower housing 120 is provided with the input device (touch panel 128 and respective buttons 124a to 124i) for performing an operation input to the game apparatus 100. Accordingly, when utilizing the game apparatus 100, the user can perform an operation on the game apparatus 100 while holding the lower housing 120. FIG. 12 shows a situation in which the user holds the game apparatus 100 with both hands. As shown in FIG. 12, the user holds the side surface and the outer surface (surface opposite to the inner surface) of the lower housing 120 with the palms, the middle fingers, the ring fingers and the little fingers of both of the hands in a state that the respective LCDs 112 and 114 are directed to the user. By holding the game apparatus 100 in such a manner, the user can perform operations as to the respective buttons 124a to 124e with the thumbs, and perform operations as to the buttons 124g and 124h with the index fingers while holding the lower housing 120.

On the other hand, the upper housing 122 has a configuration for imaging an image (camera), and a configuration for displaying the imaged image (display). The configuration of the upper housing 122 is explained below.

As shown in FIG. 9, the game apparatus 100 has the upper LCD 114. The upper LCD 114 is set to the upper housing 122. The upper LCD 114 takes a horizontally-long shape, and is arranged such that the direction of the long side is coincident with the long side of the upper housing 122. The upper LCD 114 is provided on the inner surface of the upper housing 122 (the inner surface when the game apparatus 100 is in the close state). Accordingly, if the game apparatus 100 is not to be used, the game apparatus 100 is set to the close state to thereby prevent the screen of the upper LCD 114 from being soiled, damaged, and so forth. Here, similar to the lower LCD 112, in place of the upper LCD 114, a display with an arbitrary form and an arbitrary resolution may be utilized. It should be noted that in another embodiment, a touch panel may be provided on the upper LCD 114 as well.

Furthermore, the game apparatus 100 has the two cameras 116 and 118. The respective cameras 116 and 118 are housed in the upper housing 122. As shown in FIG. 9, the inward camera 116 is attached to the inner surface of the upper housing 122. On the other hand, as shown in FIG. 11(B), the outward camera 118 is attached to the surface being opposed to the surface to which the inward camera 116 is provided, that is, the outer surface of the upper housing 122 (outer surface when the game apparatus 100 is in the close state).

Thus, the inward camera 116 can image a direction to which the inner surface of the upper housing 122 is turned, and the outward camera 118 can image a direction opposite to the imaging direction of the inward camera 116, that is, a direction to which the outer surface of the upper housing 122 is turned. As described above, in this embodiment, the two cameras 116 and 118 are provided so as to make the imaging directions opposite to each other. Accordingly, the user can image the two different directions without shifting the game apparatus 100 inside out. For example, the user can image a landscape as the user is seen from the game apparatus 100 with the inward camera 116, and can image a landscape as the direction opposite to the user is seen from the game apparatus 100 with the outward camera 118.

Furthermore, the inward camera 116 is attached to the center of the shaft portion 122a formed at the center of the bottom of the upper housing 122. That is, the inward camera 116 is attached at the center of the part where the two housings 120 and 122 are connected. Accordingly, in a case that the game apparatus 100 is in the open state, the inward camera 116 is arranged between the two LCDs 112 and 114 (see FIG. 9). In other words, the inward camera 116 is positioned in the vicinity of the center of the game apparatus 100. Here, "the center of the game apparatus 100" means the center of the operation surface of the game apparatus 100 (surface being made up of the inner surfaces of the respective housings 120 and 122 in the open state). Here, it may be the that the inward camera 116 is arranged in the vicinity of the center in the horizontal direction of the LCDs 112 and 114. In this embodiment, when the game apparatus 100 is set to the open state, the inward camera 116 is arranged in the vicinity of the center of the game apparatus 100, and therefore, in a case that the user images the user himself or herself by the inward camera 116, the user may hold the game apparatus 100 at a position directly opposite to the game apparatus 100. That is, if the user holds the game apparatus at a normal holding position, the user is positioned at approximately the center of an imaging range, and the user himself or herself can easily be within the imaging range.

Furthermore, as shown in FIG. 11(B), the outward camera 118 is arranged at the upper end of the upper housing 122 (portion far away from the lower housing 120) in a case that the game apparatus 100 is set to the open state. Here, since the outward camera 118 is not for imaging the user holding the game apparatus 100, there is less need for being provided at the center of the game apparatus 100.

Furthermore, as shown in FIG. 9 or FIG. 11(B), a microphone 132 is housed in the upper housing 122. More specifically, the microphone 132 is attached to the shaft portion 122a of the upper housing 122. In this embodiment, the microphone 132 is attached around the inward camera 116 (next to the inward camera 116 along the y axis), and specifically attached next to the inward camera 116 in the positive direction of the y axis. Furthermore, a through hole for microphone 122c is mounted to the shaft portion 122a at a position corresponding to the microphone 132 (next to the inward camera 116) such that the microphone 132 can detect a sound outside the game apparatus 100. Alternatively, the microphone 132 may be housed in the lower housing 120. For example, the through hole for microphone 122c is provided on the inner surface of the lower housing 120, specifically, at the lower left (button arranging area A1) of the inner surface of the lower housing 120, and the microphone 132 may be arranged in the vicinity of the through hole for microphone 122c within the lower housing 120. In addition, the microphone 132 is attached in such a direction that its sound collecting direction (direction in which the sensitivity becomes maximum) is approximately in parallel with the imaging direction (optical axis) of the inward camera 116 (in other words, the sound collecting direction and the imaging direction are approximately in parallel with the z axis). Thus, a sound generated within the imaging range of the inward camera 116 is suitably acquired by the microphone 132. That is, detection of a sound input through the microphone 132 and detection of the user by the imaged image by the inward camera 116 can be simultaneously performed, and accuracy of the detections can be improved, at the same time.

As shown in FIG. 11(B), on the outer surface of the upper housing 122, a fourth LED 126d is attached. The fourth LED 126d is attached around the outward camera 118 (at the right side of the outward camera 118 in this embodiment). The fourth LED 126d lights up at a time when an imaging is made with the inward camera 116 or the outward camera 118 (shutter button is pushed). Furthermore, the fourth LED 138 continues to light up while a motion image is imaged by the inward camera 116 or the outward camera 118. By making the fourth LED 126d light up, it is possible to inform an object to be imaged that an imaging with the game apparatus 100 is made (is being made).

Furthermore, the inner surface of the lower housing 122 is formed to be approximately planar. As shown in FIG. 9, at the center of the inner surface, an opening 122b for exposing the upper LCD 114 is formed. The screen of the upper LCD 114 housed inside the upper housing 122 is exposed from the opening 122b. Furthermore, on both side of the aforementioned opening 122b, a sound release hole 122d is formed one by one. Inside the sound release hole 122d of the upper housing 122, a speaker 134 is hosed. The sound release hole 122d is a through hole for releasing a sound from the speaker 134.

Thus, on the inner surface of the upper housing 122, non-display areas (areas B1 and B2 represented by a dotted lines in FIG. 9. More specifically, areas for arranging the speaker 134; speaker arranging areas) are provided on both sides of the opening 122b set at the center of the upper LCD 114. The two sound release holes 122d are arranged at approximately the center of the horizontal direction of each speaker arranging area with respect to the horizontal direction, and at the lower portion of each speaker arranging area with respect to the vertical direction (area close to the lower housing 120).

Here, as described above, by providing the non-display areas on the lower housing 120 and the upper housing 122 at the same positions in the horizontal direction, the game apparatus 100 is configured to help user's holding not only when it is held horizontally as shown in FIG. 12, but also when it is held vertically (a state rotated to left or right by 90° from the state shown in FIG. 12).

As described above, the upper housing 122 is provided with the cameras 116 and 118 which are configured to image an image and the upper LCD 114 as a display means for displaying the imaged image. On the other hand, the lower housing 120 is provided with the input device (touch panel 128 and respective buttons 124a to 124i) for performing an operation input to the game apparatus 100. Accordingly, when utilizing the game apparatus 100 as an imaging device, the user can perform an input to the input device with the lower housing 120 holding while viewing the imaged image (image imaged by the camera) displayed on the upper LCD 114.

Furthermore, in the vicinity of the camera 116 of the upper housing 122, the microphone 132 configured to input a sound is provided, and the game apparatus 100 can also be used as a recording device. In addition, the user performs a sound input over the microphone 132, and the game apparatus 100 can execute the game processing and application processing other than the game on the basis of the microphone input information as well.

Figure 13:
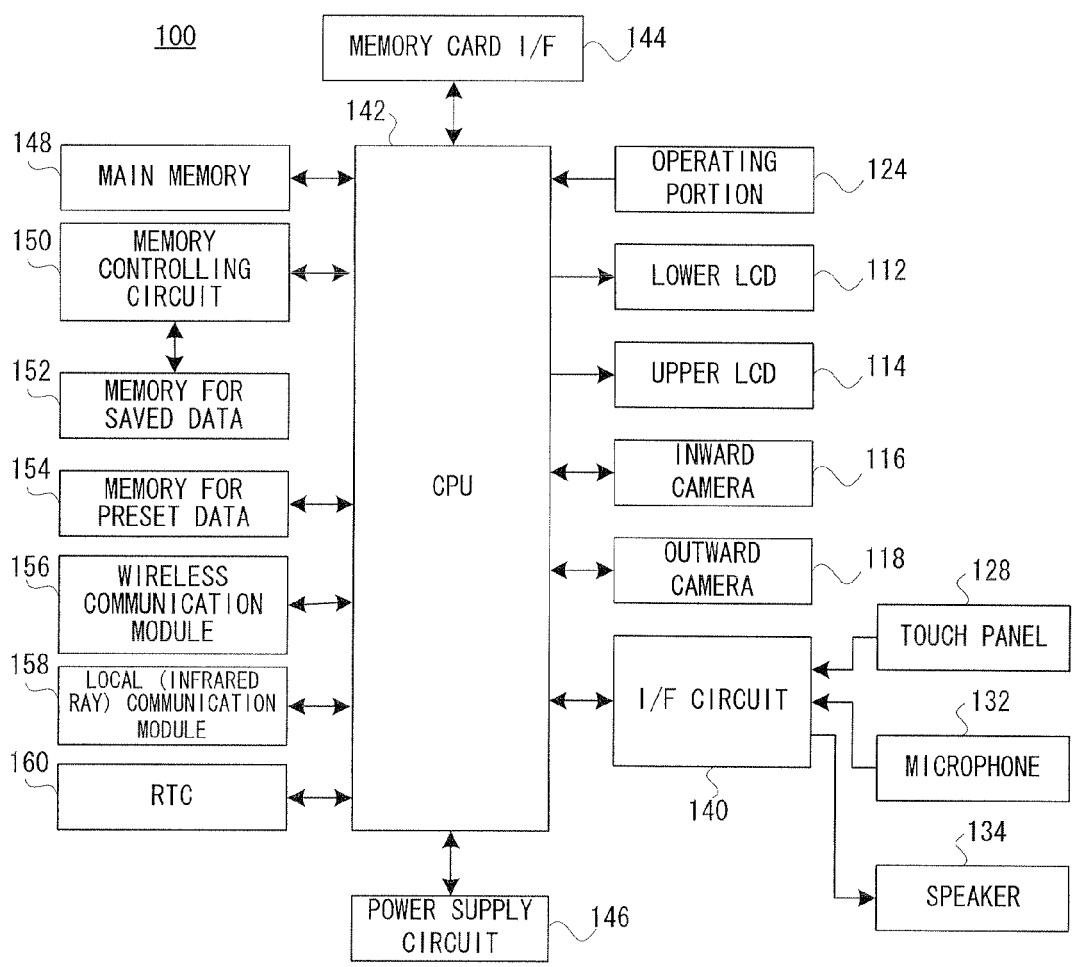
FIG. 13 is a block diagram showing one example of an electric configuration of the hand-held-type game apparatus.

FIG. 13 is a block diagram showing an internal configuration (electronic configuration) of the game apparatus 100. As shown in FIG. 13, the game apparatus 100 includes electronic components, such as a CPU 142, a main memory 148, a memory controlling circuit 150, a memory for saved data 152, a memory for preset data 154, a memory card interface (memory card I/F) 144, a wireless communication module 156, a local communication module 158, a real-time clock (RTC) 160, a power supply circuit 146, and an interface circuit (I/F circuit) 140, etc. Theses electronic components are mounted on an electronic circuit board, and housed in the lower housing 120 (or the upper housing 122 may also be appropriate).

The CPU 142 is an information processor to execute various programs. In a case that the game apparatus 100 is utilized as an imaging device, the program for it is stored in the memory (memory for saved data 152, for example) within the game apparatus 100. The CPU 142 executes the program to allow the game apparatus 100 to function as an imaging device. Here, the programs to be executed by the CPU 142 may previously be stored in the memory within the game apparatus 100, may be acquired from the memory card 138b, and may be acquired from another appliance, for example, the game apparatus 12 through communications.

The CPU 142 is connected with the main memory 148, the memory controlling circuit 150, and the memory for preset data 154. Furthermore, the memory controlling circuit 150 is connected with the memory for saved data 152. The main memory 148 is a memory means to be utilized as a work area and a buffer area of the CPU 142. That is, the main memory 148 stores various data to be utilized in the game processing and the application processing, and stores a program obtained from the outside (memory cards 138b, the game apparatus 12, etc.) In this embodiment, a PSRAM (Pseudo-SRAM) is used, for example, as a main memory 148. The memory for saved data 152 is a memory means for storing (saving) a program to be executed by the CPU 142, data of an image imaged by the respective cameras 116 and 118, etc. The memory for saved data 152 is configured by a NAND type flash memory, for example. The memory controlling circuit 150 is a circuit for controlling reading and writing from and to the memory for saved data 152 according to an instruction from the CPU 142. The memory for preset data 154 is a memory means for storing data (preset data), such as various parameters, etc. which are previously set in the game apparatus 100. As a memory for preset data 154, a flash memory to be connected to the CPU 142 through an SPI (Serial Peripheral Interface) bus can be used.

The memory card I/F 144 is connected to the CPU 142. The memory card I/F 144 performs reading and writing data from and to the memory cards 138a and 138b attached to the connector according to an instruction from the CPU 142. In this embodiment, the image data imaged by the respective cameras 116 and 118 is written to the memory card 138a, and the image data stored in the memory card 138a is read from the memory card 138a and stored in the memory for saved data 152. Furthermore, the program and the data stored in the memory card 138 are read to and transferred to the main memory 148.

The wireless communication module 156 has a function of connecting to a wireless LAN compliant with IEEE802.11b/g standards, for example. Furthermore, the local communication module 158 has a function of performing a wireless communication with the same types of the game apparatuses by a predetermined communication system, such as an infrared communication system. The wireless communication module 156 and local communication module 158 are connected to the CPU 142. The CPU 142 can send and receive data by means of the wireless communication module 156, over the Internet or directly without passing through the Internet with the same kind of other game apparatuses and the game apparatus 12, and can send and receive data with the same kind of other game apparatuses by means of the local communication module 158.

It should be noted that the local communication module 158 is contained in the game apparatus 100 in this embodiment, but may be provided to the memory card 138*b* for example. In this case, the CPU 142 performs a control of communications via the memory card I/F 144.

Additionally, the CPU 142 is connected with the RTC 160 and the power supply circuit 146. The RTC 160 counts a time to output the same to the CPU 142. The CPU 142 can calculate a current time (date) on the basis of the time counted by the RTC 160, and detects an operation timing as to when an image is to be acquired, etc. The power supply circuit 146 controls power supplied from the power supply (a battery accommodated in the lower housing) included in the game apparatus 100, and supplies the power to the respective circuit components within the game apparatus 100.

Moreover, the game apparatus 100 is provided with the microphone 132 and the speaker 134. The microphone 132 and the speaker 134 are connected to the I/F circuit 140. The microphone 132 detects a sound of the user to output a sound signal to the I/F circuit 140. The speaker 134 outputs a sound corresponding to the sound signal from the I/F circuit 140. The I/F circuit 140 is connected to the CPU 142. Furthermore, the touch panel 128 is connected to the I/F circuit 140. The I/F circuit 140 includes a sound controlling circuit for controlling the microphone 132 and the speaker 134, and a touch panel controlling circuit for controlling the touch panel 128. The sound controlling circuit performs an A/D conversion and a D/A conversion on a sound signal, or converts a sound signal into sound data in a predetermined format. The converted audio data is written to a sound area (not shown) of the main memory 148. If the game apparatus 100 is utilized as a recording device, the audio data stored in the sound area is written to the memory for saved data 152 via the memory controlling circuit 150 thereafter (recorded in the memory card 138*a* via the memory card I/F 144 as required). Furthermore, the sound data (microphone input information) stored in the sound area is also utilized for various game processing. The touch panel controlling circuit generates touch position data in a predetermined format on the basis of the signal from the touch panel 128 and outputs the same to the CPU 142. The touch position data indicates coordinates of a position where an input is performed on an input surface of the touch panel 128. Also, the touch panel controlling circuit performs reading of a signal from the touch panel 128 and generation of the touch position data per each predetermined time. The CPU 142 acquires the touch position data to thereby know the position where the input is made on the touch panel 128.

The operating portion 124 is made up of the aforementioned respective buttons 124*a* to 124*i*, and connected to the CPU 142. The operation data indicating an input state (whether or not to be pushed) with respect to each of the operation buttons 124*a* to 124*k* is output from the operation button 124 to the CPU 142. The CPU 142 executes processing according to an input to the operating portion 124 by acquiring the operation data from the operating portion 124.

The respective cameras 116 and 118 are connected to the CPU 142. The respective cameras 116 and 118 image images according to an instruction from the CPU 142, and output imaged image data to the CPU 142. The CPU 142 writes the image data from each of the cameras 116 and 118 to an image area (not shown) of the main memory 148. In a case that the game apparatus 100 is utilized as an imaging device, the image data stored in the image area is written to the memory for saved data 152 via the memory controlling circuit 150 (and moreover recorded in the memory card 138*a* via the memory card I/F 144 as required). Furthermore, the image data sorted in the image area can also be utilized for various game processing.

In addition, each of the LCDs 112 and 114 is connected to the CPU 142. Each of the LCDs 112 and 114 displays an image according to an instruction from the CPU 142. In a case that the game apparatus 100 is utilized as an imaging device, the CPU 142 displays an image acquired from any one of the cameras 116 and 118 on the upper LCD 114, and displays an operation screen generated according to predetermined processing on the lower LCD 112. If a game is played with the game apparatus 100, a game image is displayed on one or both of the LCDs 112 and 114.

Figure 14:
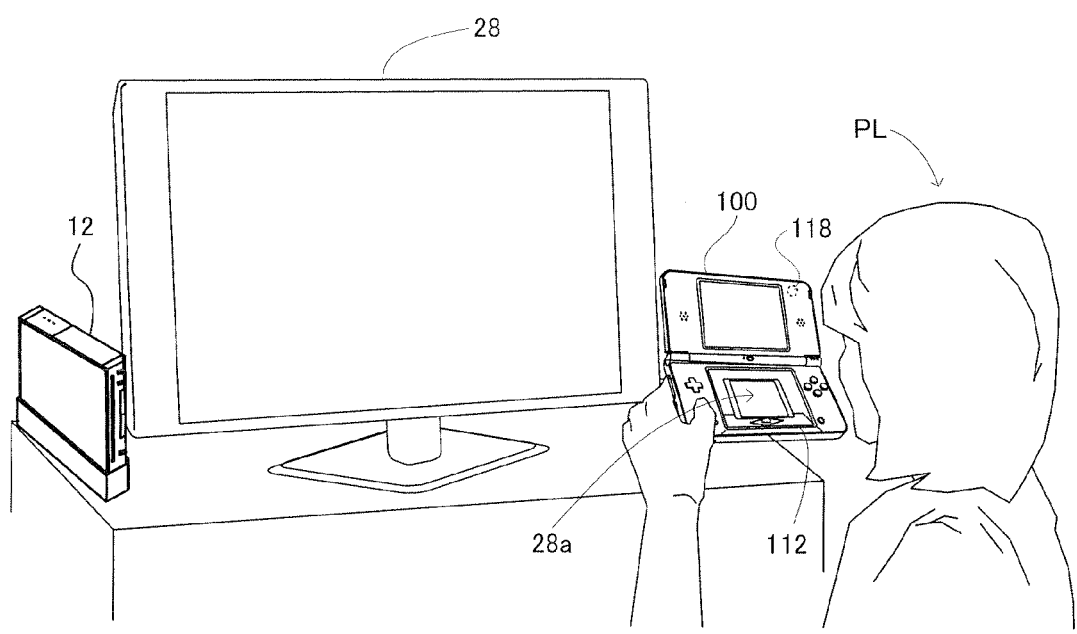
FIG. 14 is an illustrative view explaining a situation when a "pop-up" virtual game is played.

When the "pop-up" game is played in the game system 10 including the game apparatus 100 configured as described above, the player images the monitor 28 with the outward camera (hereinafter referred to as camera) 118 of the game apparatus 100 while standing in front of the monitor 28 connected to the game apparatus 12 as shown in FIG. 14. On the lower LCD (hereinafter, simply referred to as LCD) 112 of the game apparatus 100, an imaged image including the monitor screen 28*a* is displayed.

In the main memory 42*e* and/or 46 of the game apparatus 12, as shown in FIG. 15(A), a program memory area 70 and a data memory area 74 are formed, and in the program memory area 70, a game program 72, etc. is stored. The game program 72 is software for implementing the "pop-up" game by controlling the entire hardware (see FIG. 2) of the game apparatus 12 via the CPU 40, and includes a display controlling program 72*a* corresponding to flowcharts in FIG. 16(A) and FIG. 17. It should be noted that the display controlling program 72*a* in the first and second modified examples described later respectively correspond to flowcharts in FIG. 27 and FIG. 31(A).

Although illustration is omitted, in the program memory area 70, various programs necessary for the "pop-up" game, such as, an output and communication controlling program (not illustrated) are stored other than the game program 72. The output and communication controlling program mainly controls an output to the monitor 28 via the input-output processor 42*a*, and mainly controls wireless communications with the game apparatus 100 via the wireless communication module 50.

In the data memory area 74, time data 76, image data 78, etc. are stored. The time data 76 is data indicating a time when an object (see PO, EO: FIG. 22(A), etc.) is made to go out of the monitor 28 and return within the virtual space, and the image data 78 is data for displaying the object and a marker (M: see FIG. 20(A), FIG. 22(A), etc.) on the monitor 28.

On the other hand, in the main memory 148 of the game apparatus 100, a program memory area 170 and a data memory area 174 are formed, and in the program memory area 170, a game program 172, etc. are stored as shown in FIG. 15(B). The game program 172 is software for implementing the "pop-up" game by controlling the entire hardware (see FIG. 13) of the game apparatus 100 via the CPU 142, and includes a display controlling program 172*a* corresponding to flowcharts in FIG. 16(B), FIG. 18, and FIG. 19, and a recognition program 172*b* for recognizing (pattern verification) markers (Ma: see FIG. 20(B), and X FIG. 22(B), etc.) included in the imaged image. It should be noted that the display controlling program 172a in the first and second modified examples described later respectively correspond to flowcharts in FIG. 28 and FIG. 31(B).

Although illustration is omitted, in the program memory area 170, various programs necessary for the "pop-up" game, such as, input-output and communication controlling program (not illustrated) are stored other than the game program 172a. The input-output and communication controlling program mainly controls an input from the camera 118 and an output to the LCD 112, and controls a wireless communication with the game apparatus 12 mainly via the wireless communication module 156.

The data memory area 174 includes an imaged image area 176, a pattern temporary storing area 178, a pattern storing area 180, etc. In the imaged image area 176, an imaged image input from the camera 118 at a predetermined frame rate (for example 60 fps) is written through the CPU 142. The imaged image thus stored in the imaged image area 176 is read at a predetermined frame rate (rate the same as that in writing, for example) by the LCD 112 under the control of the CPU 142. Due to this, the imaged image from the camera 118 is displayed on the LCD 112.

On the imaged image stored in the imaged image area 176, recognition processing (see FIG. 19) of recognizing a predetermined marker is performed. The pattern temporary storing area 178 is an area for temporarily saving a pattern of a marker detected in real time from the imaged image. In the pattern storing area 180, through the previous pattern storing processing (see FIG. 16), a pattern of a predetermined marker (see FIG. 20) is stored. The pattern temporarily stored in the pattern temporary storing area 178 is successively compared with the pattern stored in the pattern storing area 180, and if the temporary stored pattern matches the stored pattern, a marker recognizing signal indicating recognition of the predetermined marker is transmitted to the game apparatus 12.

Here, the marker to be recognized is one kind in this embodiment, but a plurality of kinds may be appropriate. In this case, a plurality of patterns are stored in the pattern storing area 180, and the temporary stored pattern is compared with each of the stored patterns. In the marker recognizing signal, information indicating which marker is recognized is added.

Furthermore, in the data memory area 174, image data 182, etc. are stored. The image data 182 is data for displaying the object (POb, EOb: see FIG. 24(B), FIG. 25(B), etc.) going out of the monitor 28 within the virtual space such that it is superimposed on the imaged image of the LCD 112.

When the pattern is stored in advance, the CPU 40 of the game apparatus 12 (console-type game apparatus side) and the CPU 142 of the game apparatus 100 (hand-held-type game apparatus side) respectively execute pattern storing processing shown in FIG. 16(A) and FIG. 16(B). First, in relation to the console-type game apparatus side, with first reference to FIG. 16(A), the CPU 40 instructs the GPU 42b to display a marker on the monitor 28 in a step S1. In response thereto, the GPU 42b displays a rectangular marker M on the monitor 28 as shown in FIG. 20(A), for example. It should be noted that on the side of the hand-held-type game apparatus, at this time, an imaged image as shown in FIG. 20(B) is displayed on the LCD 112.

The marker M has a rectangular outline having each face depicted with a predetermined pattern (rectangular parallelepiped having each face different in colors, here) on a white. The background of the marker M is painted with black in order to extremely heighten a luminance difference with the white marker (makes it easy to detect the outline). Here, the shape of the marker M may be a quadrangle other than a rectangle, such as a square, a rhombus, a trapezoid, for example. Alternatively, a polygon, such as a triangle, a hexagon, etc., a circle, or a complex shape combined them may be appropriate. Furthermore, the white of the marker M may be colored, and the background may be painted with an arbitrary color if they are easy to detect the outline. The marker (pattern) may be displayed in color or in monochrome.

Then, the CPU 40 determines whether or not a completion notification (described later) is received by the wireless communication module 50 in a step S3. If "NO" here, the process returns to the step S1 to repeat the similar processing for each frame (1/60 seconds cycle, for example). If "YES" in the step S3, the process is ended.

Next, in relation to the hand-held-type game apparatus side, with reference to FIG. 16(B), the CPU 142 executes imaging processing with the camera 118 in a step S11 and repetitively writes the acquired imaged image in the imaged image area 176. Then, the CPU 142 instructs the LCD 112 to display the imaged image on the LCD 112 in a step S13, and in response thereto, the LCD 112 reads the imaged image stored in the imaged image area 176 in order and displays the same. Accordingly, on the LCD 112, an imaged image as shown in FIG. 20(B) is displayed. This imaged image includes the monitor image 28a. The monitor image 28a is an imaged image of the monitor 28 shown in FIG. 20(A), and includes a marker image Ma in which a pattern Pa is depicted in each face of a white rectangle and a black background.

Next, the CPU 142 performs outline detection based on the luminance difference on the imaged image stored in the imaged image area 176 in a step S15. From the imaged image of FIG. 20(B), based on the luminance difference between the white of the marker Ma and the background, the outline of the white is detected. Then, in a step S17, it is determined whether or not the detected outline has a predetermined shape (quadrangle, here), and if "NO" here, the process returns to the step S11 to repeat the similar processing for each frame.

Figure 21:
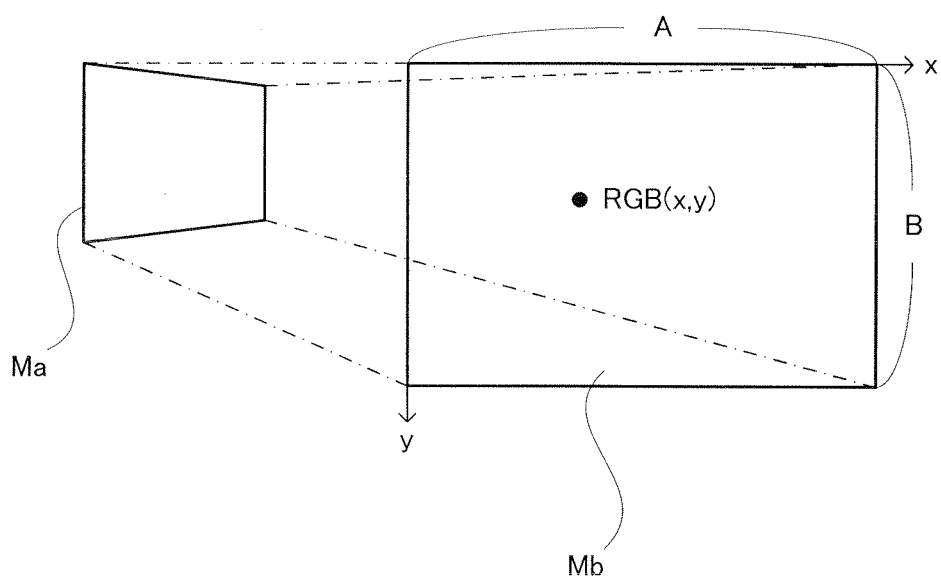
FIG. 21 is an illustrative view illustrating a change in size when a pattern is stored.

Then, the CPU 142 changes the quadrangle to a rectangle in predetermined size in a step S19. That is, depending on the positional relationship between the monitor 28 and the game apparatus 100, the marker Ma becomes a quadrangle different from the rectangle, such as trapezoid, for example, and varies in size, and thus, such a quadrangle is changed to a rectangle of A×B as shown in FIG. 21.

Here, if the marker Ma is a rectangle in predetermined size from the first, such a deformation is not required. For example, the CPU 142 displays a frame image (not illustrated) corresponding to the rectangle in predetermined size such that it is superimposed on the imaged image on the LCD 112, and the player may make a position adjustment such that the marker Ma is fit into the frame image.

Next, the CPU 142 stores a color distribution within the rectangle as a pattern of the marker in the pattern storing area 180 in a step S21. The color distribution within the rectangle is represented by RGB (x, y) as a RGB value at an arbitrary point (x, y) within the rectangle as shown in FIG. 21, for example. In this case, as to each of all the pixels within the rectangle or a part of pixels appropriately sampled from them, the RGB (x, y) is stored.

It should be noted that the pattern to be stored may be a binarized one (gray scale, for example). At a time of recognition, the pattern extracted from the imaged marker is compared with the binarized pattern.

Furthermore, in a case of specifications of less precise recognition, the pattern may be reduced to be stored. This makes it possible to save the capacity and reduce the possibility of making an erroneous recognition.

After completion of storing the pattern, the CPU 142 transmits a completion notification to the game apparatus 12 via the wireless module 156 in a step S23. Then, the processing is ended.

Figure 17:
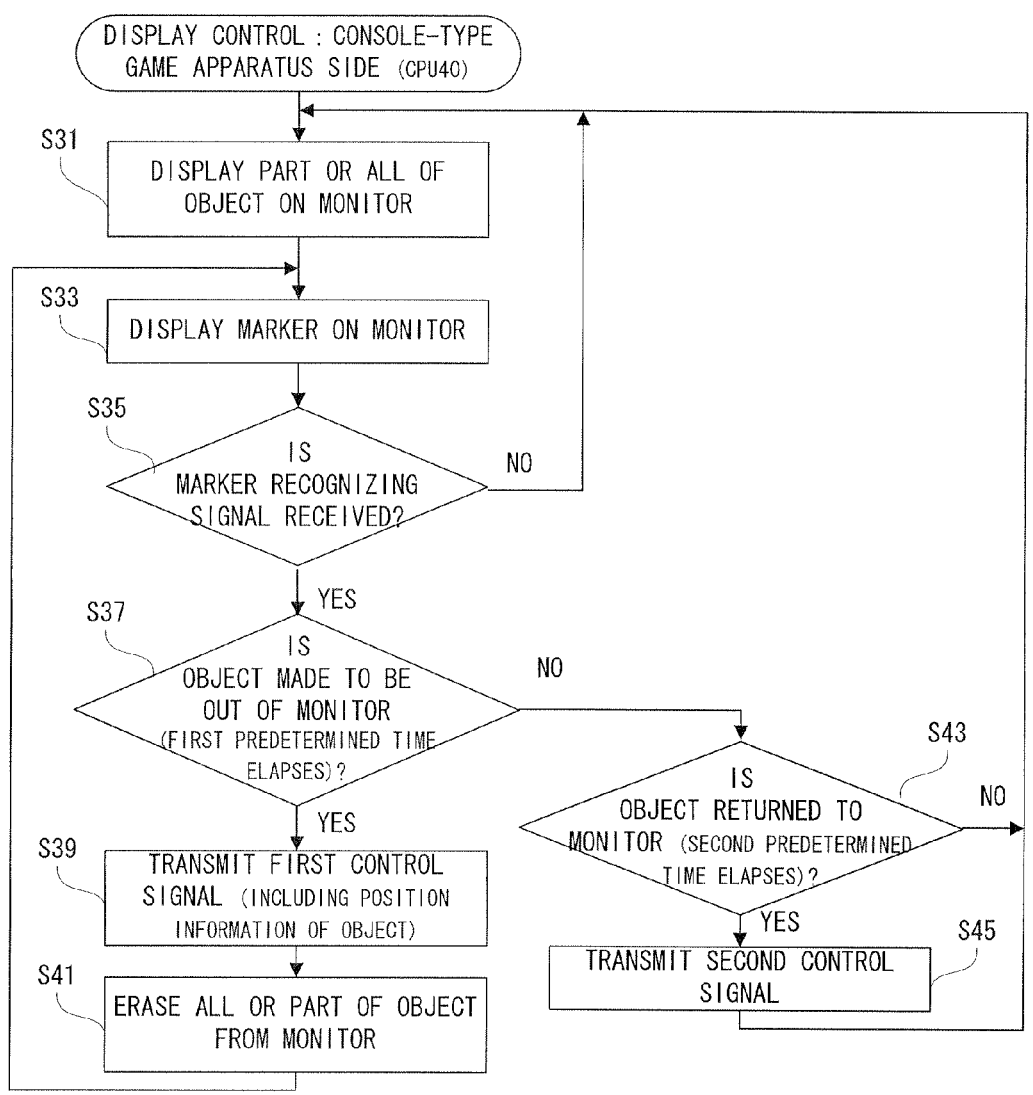
FIG. 17 is a flowchart showing another part of the operation by the CPU of the console-type game apparatus.
Figure 18:
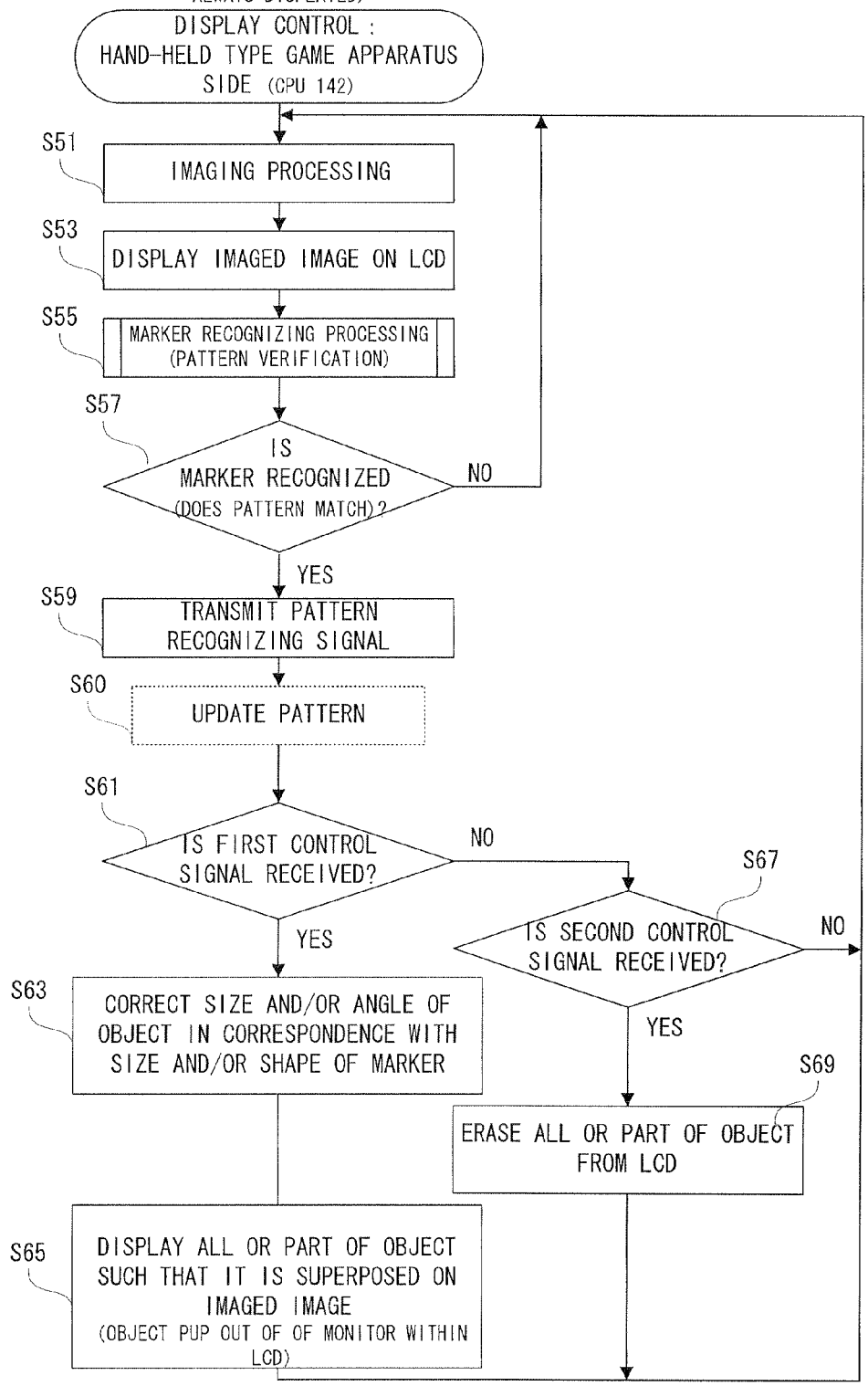
FIG. 18 is a flowchart showing another part of the operation by the CPU of the hand-held type game apparatus.

When the "pop-up" game is played thereafter, the CPU 40 of the game apparatus 12 (console-type game apparatus side) and the CPU 142 of the game apparatus 100 (hand-held-type game apparatus side) respectively execute display control processing shown in FIG. 17 and FIG. 18. First, in relation to the console-type game apparatus side, with reference to FIG. 17, the CPU 40 instructs the GPU 42b to display all or a part of the object on the monitor 28 in a step S31. In response thereto, the GPU 42b displays a player object PO and an enemy object EO on the monitor 28 as shown in FIG. 22(A), for example. The background is colored by gray, for example, other than white (the colored illustration is omitted here).

Then, the CPU 40 instructs the GPU 42b to display markers on the monitor 28 in a step S33. In response thereto, the GPU 42b displays markers M at the four corners of the monitor 28 as shown in FIG. 22(A), for example. Each marker M is equal to but only different in display size from the marker M shown in FIG. 20(A). Here, at this time, on the side of the hand-held type game apparatus, an imaged image as shown in FIG. 22(B) is displayed on the LCD 112.

Next, the CPU 40 determines whether or not a marker recognizing signal (described later) is received by the wireless communication module 50 in a step S35. If "NO" here, the process returns to the step S31 to repeat the similar processing for each frame. Through the loop processing of the steps S31 to S35, the display of the monitor 28 change from FIG. 22(A) to FIG. 23(A). Here, during this time, on the side of hand-held-type game apparatus as well, the display of the LCD 112 changes from FIG. 22(B) to FIG. 23(B).

It should be noted that in the flowchart, only the screen display (display controlling program 172a) is described, but the position and the movement of object (PO, EO) within the screen are controlled by the game program 72, and by the control, the display of the monitor 28 first changes from FIG. 22(A) to FIG. 23(A), and the display of the LCD 112 acquired by imaging the monitor 28 also change from FIG. 22(B) to FIG. 23(B).

If "YES" in the step S35, that is, a marker recognizing signal is received, the process proceeds to a step S37 to determine whether or not the object (PO, EO) is made to be out of the monitor 28 on the basis of the time data 76 (see FIG. 15(A)).

The time data 76 describes a timing (first predetermined time) when the object (PO, EO) is made to be out of the monitor 28 within the virtual space and a timing (second predetermined time) when the object (PO, EO) is returned to the monitor 28 within the virtual space. For example, when a time elapsed from the appearance of the object (PO, EO) on the monitor 28 reaches a first predetermined time, "YES" is determined in the step S37, and the process proceeds to a step S39. Here, while the first predetermined time elapses from the appearance of the object, loop processing of the steps S31 to S37 and S43 is executed.

In the step S39, the CPU 40 transmits a first control signal toward the game apparatus 100 via the wireless module 50. The first control signal includes position information indicating a position of the object (PO, EO) within the monitor 28 which tries to go out of the monitor 28 (in other words, the position of the object with respect to the marker M) in a next step S41.

In the successive step S41, the CPU 40 instructs the GPU 42b to erase all or a part of the object from the monitor 28. In response thereto, the GPU 42b erases the player object PO from the monitor 28 as shown in FIG. 24(A), for example. Here, in accordance therewith, on the side of the hand-held type game apparatus, the player object POa within the monitor 28a disappears as shown in FIG. 24(B) while the player object POb equivalent thereto is displayed so as to be superimposed on the imaged image. The position where the player object POb is superimposed is decided at the outside of the monitor 28a on the basis of the position information included in the first control signal. This make is possible to look as if the object PO is popped out of the monitor 28 within the virtual space.

Then, the process returns to the step S33 to repeat the similar processing for each frame. Through the loop processing of the steps S33 to S41, the display of the monitor 28 gradually changes from FIG. 23(A) then FIG. 24(A) to FIG. 25(A). Here, during this time, on the side of the hand-held type game apparatus, the display of the LCD 112 changes from FIG. 23(B) then FIG. 24(B) to FIG. 25(B).

When the object (PO, EO) thus goes away from the monitor 28, the determination in the step S37 changes from "YES" to "NO", and the process shifts to a step S43. In the step S43, the CPU 40 determines whether or not the object (PO, EO) is to be returned to the monitor 28 on the basis of the time data 76. When the time elapsed from when the object (PO, EO) goes away from the monitor 28 reaches a second predetermined time, "YES" is determined in the step S43, and the process proceeds to a step S45. Here, while the second predetermined time elapses from the disappearance of the objects, the loop processing from steps S31 to S37 and S43 is executed.

In the step S45, the CPU 40 transmits a second control signal toward the game apparatus 100 via the wireless module 50. Thereafter, the process returns to the step S31 to repeat the similar processing for each frame. Through the loop processing from the steps S31 to S37, S43 and S45, the display of the monitor 28 gradually changes from FIG. 25(A), then FIG. 24(A) to FIG. 23(A). Here, during this time, on the side of the hand-held type game apparatus, the display of the LCD 112 gradually changes from FIG. 25(B), then FIG. 24(B) to FIG. 23(B). This makes it possible to look as if the player object PO pops out of the monitor 28 within the virtual space returns to the monitor 28.

When the object (PO, EO) thus appears again within the monitor 28, the determination in the step S43 changes from "YES" to "NO", and the processing returns to the loop of the steps S31 to S37 and S43.

Here, the determination in the steps S37 and S43 may be performed based on a command from the game apparatus 100 in place of the time data 76. For example, when a predetermined operation is performed via the operating portion 124 in the game apparatus 100, a command corresponding to the operation is transmitted from the wireless module 156. On the other hand, when the command is received by the wireless module 50 in the game apparatus 12, the determinations in the steps S37 and S43 are performed on the basis of the command. Thus, the player can arbitrarily decide the timing when the object is made to go out and returned.

Next, in relation to the hand-held-type game apparatus side, with reference to FIG. 18, the CPU 142 executes imaging processing via the camera 118 in a step S51, and repetitively writes the acquired imaged image to the imaged image area 176. Next, the CPU 142 instructs the LCD 112 to display the imaged image in a step S53, and in response thereto, the LCD 112 reads the imaged image stored in the imaged image area 176 in order and displays the same. Accordingly, on the LCD 112, the imaged image as shown in FIG. 22(B) is displayed. The imaged image includes the monitor image 28a. The monitor image 28a is the imaged image of the monitor 28 as shown in FIG. 22(A), and specifically includes the marker image Ma in which a white rectangle depicted with the pattern Pa and the gray background (the colored illustration is omitted here as) are included as shown in FIG. 20(B).

Next, the CPU 142 performs marker recognizing processing on the imaged image stored in the imaged image area 176 in a step S55. Here, at least one marker out of the four markers M displayed at the four corners of the monitor 28 may be recognized. That is, by spacedly displaying the plurality of markers M, the recognizable range is more expanded than when a single marker is provided.

Figure 19:
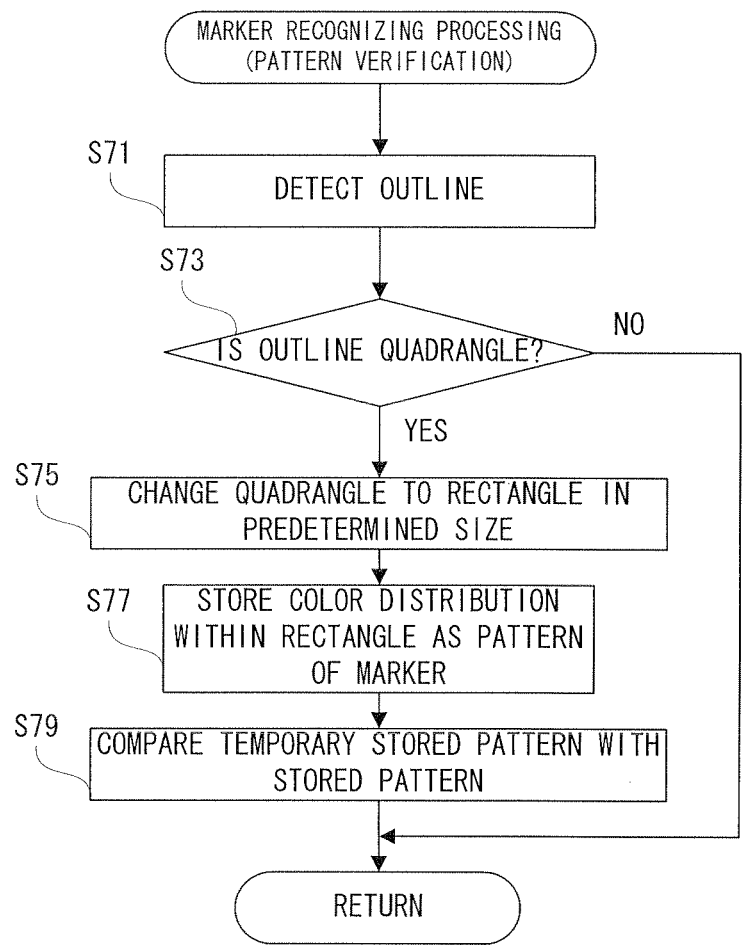
FIG. 19 is a flowchart showing a still another part of the operation by the CPU of the hand-held type game apparatus.

The marker recognizing processing in the step S55 includes processing similar to the marker detecting processing (step S15-S21) at a time of storing the pattern, and is executed according to a subroutine in FIG. 19. The CPU 142 first performs outline detection based on the luminance difference in a step S71, and then determines whether or not the detected outline is a quadrangle in a step S73. If "NO" in the step S73, the process is restored to the main routine (FIG. 18). On the other hand, if "YES" in the step S73, the process proceeds to a step S75 to change the quadrangle to the rectangle of A×B in a manner shown in FIG. 21. In a step S77, a color distribution within the rectangle (RGB (x, y) of each pixel, for example: see FIG. 21) is temporarily stored in the pattern temporary storing area 178 as a pattern of the marker. Then, the CPU 142 compares the pattern temporarily stored in the pattern temporary storing area 178 with the pattern stored in pattern storing area 180 in a step S79, and then, the process is restored to the main routine (FIG. 18).

Next, the CPU 142 determines whether or not a marker is recognized on the basis of the comparison result in the step S79 in a step S57. If the temporarily-stored pattern does not match the stored pattern, "NO" is determined in the step S57, and the process returns to the step S51 to repeat the similar processing for each frame. If the temporarily-stored pattern matches the stored pattern, "YES" is determined in the step S57, and the process proceeds to a step S59. Here the determination in the step S57 is not necessarily repeated, and one determination may be appropriate. That is, successive recognitions and one recognition may be appropriate.

In the step S59, the CPU 142 transmits a marker recognizing signal to the game apparatus 12 via the wireless communication module 50. Next, the CPU 142 determines whether or not a first control signal is received by the wireless communication module 156 in a step S61, and if "NO" here, the process shifts to a step S67 to further determine whether or not a second control signal is received by the wireless communication module 156. If "NO" in the step S67 as well, the process returns to the step S51 to repeat the similar processing for each frame. Accordingly, while no control signal is transmitted from the game apparatus 12, through the loop processing of the steps S51 to S61 and S67, the display of the LCD 112 changes from FIG. 22(B) to FIG. 23(B) as the display of the monitor 28 changes from FIG. 22(A) to FIG. 23 (A).

If "YES" in the step S61, the CPU 142 proceeds to a step S63 to correct the size and/or angle of the object to be displayed in a superimposed manner in a following step S65 in correspondence with the size and/or shape of the marker recognized in the step S55. The correction processing is processing of changing the size and/or shape of the object popping out of the monitor 28 in correspondence with the positional relationship between the monitor 28 and the game apparatus 100 (see FIG. 26: described later).

Next, the CPU 142 instructs the LCD 112 to display all or a part of the object such that they are superimposed on the imaged image in a step S65. In response thereto, the LCD 112 displays the player object POb such that it is superimposed on the imaged image as shown in FIG. 24(B), for example. The position where the player object POb is superimposed is decided outside the monitor 28a on the basis of the position information included in the first control signal.

When the player object POb is thus displayed to be superimposed, on the side of the console-type game apparatus, the aforementioned step S41 is executed to thereby make the player object PO within the monitor 28 disappear as shown in FIG. 24(A). In accordance therewith, on the LCD 112 as well, the player object POa within the monitor 28a disappears, so that it is possible to look as if the player object PO pops out of the monitor 28 within the virtual space.

Then, the process returns to the step S51 to repeat the similar processing for each frame. Accordingly, while the first control signal is transmitted from the game apparatus 12 through the loop processing of the steps S51 to S65, the display of the LCD 112 changes from FIG. 23(B), FIG. 24(B) to FIG. 25(B) as the display of the monitor 28 changes from FIG. 23(A), FIG. 24(A) to FIG. 25(A).

Here, in FIG. 25(A), a part of the enemy object EO, that is, the head and the arms, here, is erased from the monitor 28, and in FIG. 25(B), the erased part, that is, the head and the arms of the enemy object EOb are displayed so as to be superimposed on the imaged image.

Furthermore, FIG. 25(B) is the display of the LCD 112 in a case that the game apparatus 100 is at the left front of the monitor 28, and if the game apparatus 100 is at the right front of the monitor 28 as shown in FIG. 26(A), the display of the LCD 112 is as shown in FIG. 26(B). In FIG. 25(B), the heart which is invisible under the enemy object EOb appears in FIG. 26(B), and therefore, a play such as shooting an arrow to the heart of the enemy object EOb by the player object POb is made possible.

If "YES" in the step S67, the CPU 142 advances the process to a step S69 to instruct the LCD 112 to erase all or a part of the object. In response thereto, the LCD 112 erases all or a part of the object displayed in a superimposed manner on the imaged image. Thereafter, the process returns to the step S51 to repeat the similar processing for each frame. Accordingly, while the second control signal is transmitted from the game apparatus 12, through the loop processing of the steps S51-S61, S67 and S69, the display of the LCD 112 changes from FIG. 25(B), FIG. 24(B) to FIG. 23(B) as the display of the monitor 28 changes from FIG. 25(A), FIG. 24(A) to FIG. 23(A). This makes it possible to show as if the player object PO popping out of the monitor 28 returns to the monitor 28 within the virtual space.

In addition, if "YES" is determined in the step S57, the pattern stored in the pattern storing area 180 may be updated to the latest pattern acquired from the recognition processing in the step S55 as required. For example, between the steps S59 and the step S61, a step S60 of performing a pattern update is inserted. Thus, even if the brightness of the surrounding environment and the image quality of the monitor 28 change, accuracy of the marker recognition can be maintained at a high level.

Although the detailed explanation is omitted in the above description, for marker recognition and a control of the display position in relation to FIG. 21 and FIG. 26, AR (Augmented Reality) processing described in "augmented reality system based on a trace of a marker and its calibration" (Journal of the Virtual Reality Society of Japan Vol. 4, No. 4, 1999) can be used. The basic flow of the AR processing is as follows. First, marker recognition is performed on the imaged image. If there is a marker, a position and an orientation of a virtual camera in a marker coordinate system are calculated on the basis of the position and the orientation of the marker on the imaged image. Next, a transformation matrix from the marker coordinate system to a camera coordinate system is calculated. More specifically, as to the marker recognition, coordinate values of four vertexes of the marker (four vertexes of the marker image Ma shown in FIG. 21 in this embodiment) are evaluated, and on the basis of the coordinate values and information in relation to the size of the marker, the transformation matrix (transformation matrix from the marker image Ma to the marker image Mb shown in FIG. 21 in this embodiment) from the marker coordinate system to the camera coordinate system is calculated. Then, the transformation matrix is set to a view matrix of the virtual camera. By the virtual camera, a virtual space is imaged to generate a CG image with which the imaged image is combined.

In this embodiment, an image (composite image) obtained by superimposing the virtual image on the imaged image can be generated according to following processing, for example. That is, the CPU 142 of the game apparatus 100 executes (image) recognition processing of a marker included in the imaged image in the step S55. Here, as a processing result of the recognition processing, information indicating the position and the orientation of the marker is calculated. If a marker is recognized (S57:YES), a positional relationship between the game apparatus 100 itself (camera) and the marker is calculated from the shape and the orientation of the recognized marker. Here, if the recognition processing fails, the CPU 142 uses the position and the orientation of the virtual camera calculated when the recognition processing succeeds last without calculating the position and the orientation of the virtual camera. In addition, the CPU 142 calculates the position and the orientation of the virtual camera in the virtual space on the basis of the positional relationship. The position and orientation of the virtual camera are calculated such that the positional relationship between the virtual camera and the virtual object in the virtual space matches the positional relationship between the game apparatus 100 itself and the marker in the real space. When the position of the virtual camera is decided, the CPU 142 generates a virtual image when the virtual object is viewed from the position of the virtual camera, and superimposes the virtual image on the imaged image. By the processing described above, the game apparatus 100 can generate and display a composite image. Here, processing of calculating the position of the virtual camera from the aforementioned positional relationship may be similar to that in the conventional AR processing.

As understood from the above description, the game system 10 of this embodiment includes the game apparatus 12 connected with the monitor 28 and the game apparatus 100 including the camera 118 and the LCD 112. Here, the monitor 28 may be integrally provided with the game apparatus 12, and the camera 118 and/or the LCD 112 may be provided separately from the game apparatus 100.

The CPU 40 of the game apparatus 12 displays the markers M on the monitor 28 (S33), and the CPU 142 of the game apparatus 100 images an image with the camera 118 (S51), displays the imaged image on the LCD 112 (S53), determines whether or not any marker M is included in the imaged image (S55, S57), performs a display control such that at least a part of a second object (POb, EOb) corresponding to the marker M is superimposed on the imaged image displayed on the LCD 112 on the basis of the determination result (S65), and transmits a marker recognizing signal to the game apparatus 12 on the basis of the determination result (S59).

The game apparatus 12 further receives the marker recognizing signal transmitted as described above (S35), and performs a display control of at least a first object image (PO, EO) corresponding to the markers M on the monitor 28 on the basis of the received marker recognizing signal (S41).

That is, the game apparatus 12 displays the markers M on the monitor 28, and the monitor 28 displayed with the markers M is imaged by the camera 118. The game apparatus 100 displays the imaged image by the camera 118 on the LCD 112, and determines whether or not the markers M are included in the imaged image. If the markers M are included in the imaged image on the basis of the determination result, the game apparatus 100 performs a display control of superimposing (display in a superimposed manner in this embodiment) at least a part of the second object on the imaged image displayed on the LCD 112, and transmits a marker recognizing signal to the game apparatus 12. The game apparatus 12 receives the marker recognizing signal to perform a display control of at least a part of the first object.

Thus, the game apparatus 12 displays the markers M on the monitor 28 to thereby make the game apparatus 100 perform a display control on the second object of the imaged image on the LCD 112 while the game apparatus 100 transmits a marker recognizing signal to the game apparatus 12 when the display control is performed based on the markers M to make the game apparatus 12 perform a display control on the first object of the monitor 28, and therefore, the game apparatus 12 and the game apparatus 100 are associated with each other through the markers M and the marker recognizing signal to thereby operatively connect the first object and the second object on the monitor 28 and the imaged image of the LCD 112.

Specifically, in this embodiment, the first object and the second object are a common object (that is, the common object is the first object on the monitor 28 and is the second object on the LCD 112), and therefore, it is possible to look as if the common object moves between the monitor 28 and the LCD 112 (display control).

More specifically, the game apparatus 12 displays at least a part of the first object together with the marker M (S31), and erases at least the part of the first object on the basis of the marker recognizing signal (S41). Thus, the player object PO and the enemy object EO pops out of the monitor 28 to the imaged image on the LCD 112, or is returned to the monitor 28 therefrom.

Here, the first object and the second object may be a part of the common object (head and arms, for example) and other parts (body, for example) or may be objects independent of each other.

It should be noted that in the above-described embodiment, the object is in and out between the monitor 28 and the imaged image of the LCD 112 in a state that the marker is always displayed, but the marker is displayed as required to make the object appear in the monitor 28 and the LCD 112 at the same time, and disappear from the monitor 28 and the LCD 112 at the same time. The display control in this case is explained as a first modified example below.

Figure 27:
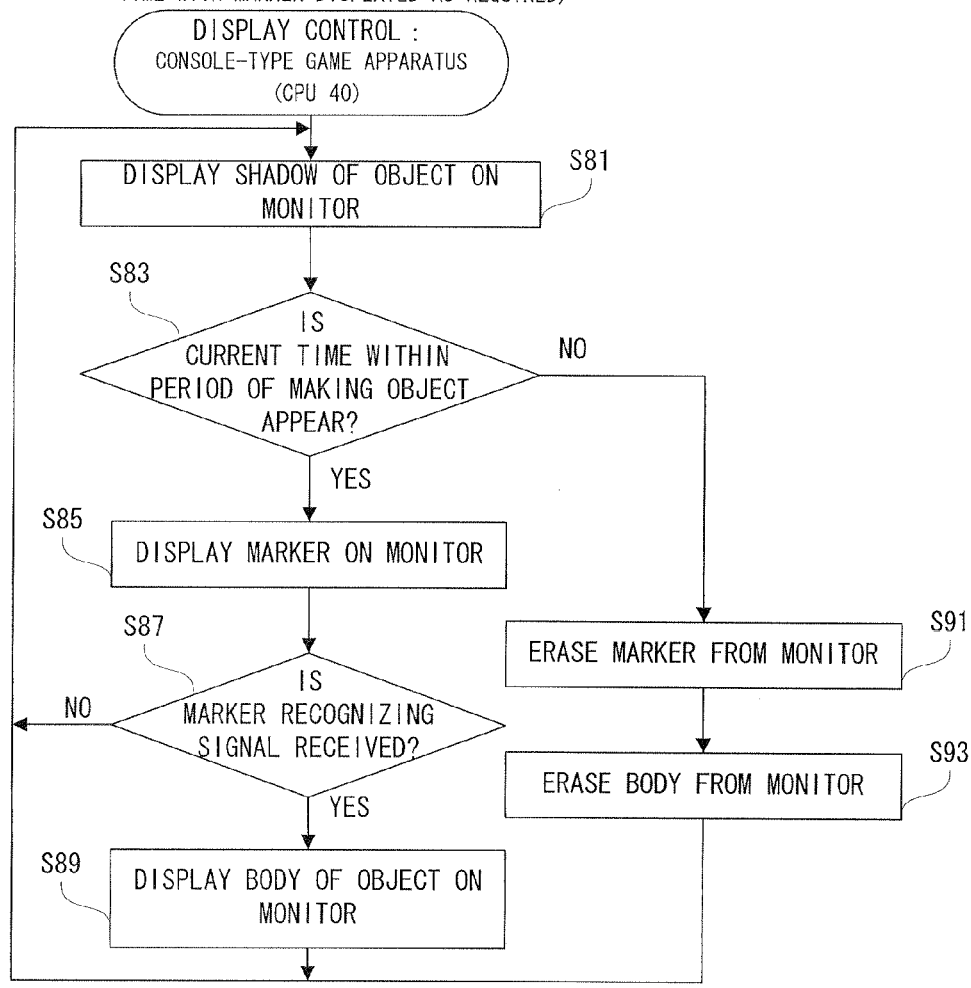
FIG. 27 is a flowchart showing a part of an operation by the CPU of the console-type game apparatus in a first modified example.
Figure 28:
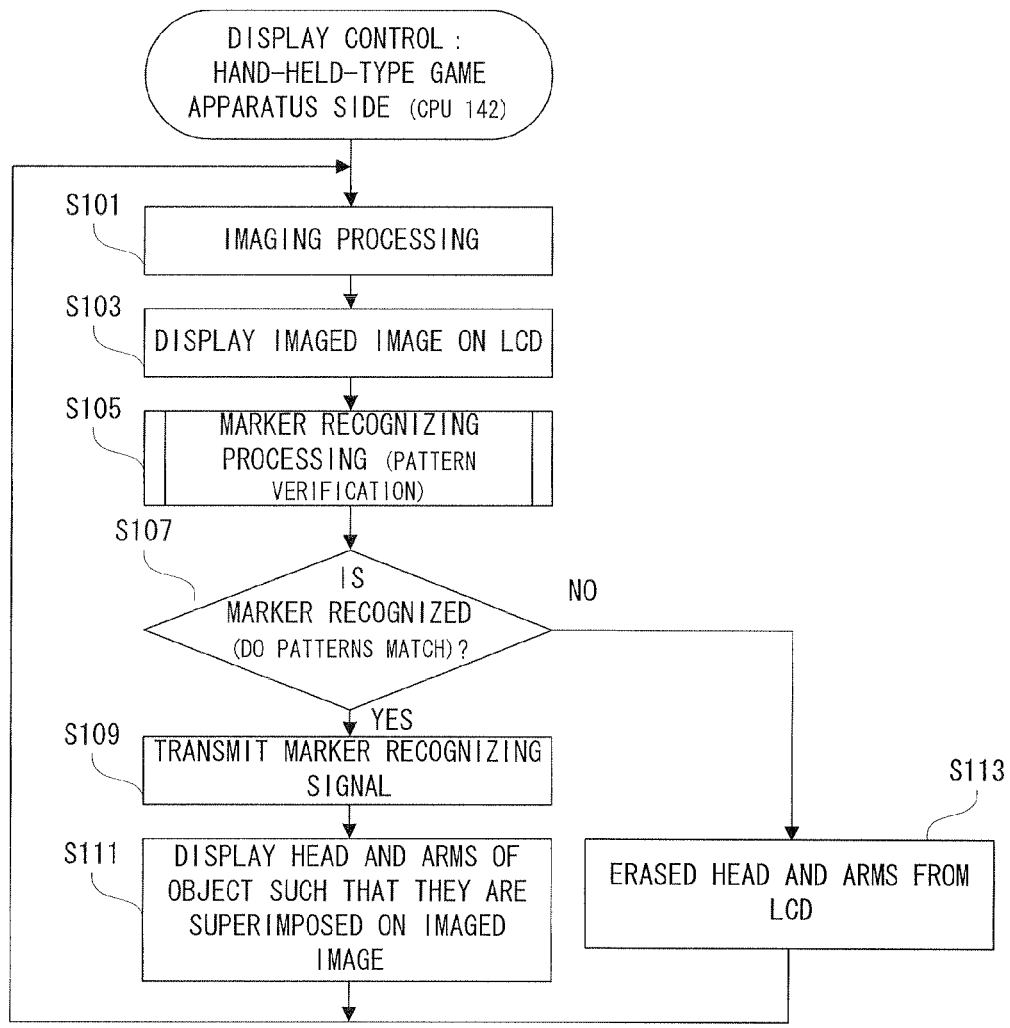
FIG. 28 is a flowchart showing a part of an operation by the CPU of the hand-held type game apparatus in the first modified example.

In the first modified example, the CPU 40 of the game apparatus 12 (console-type game apparatus side) and the CPU 142 of the game apparatus 100 (hand-held-type side) respectively execute display control processing as shown in FIG. 27 and FIG. 28. First, in relation to the console-type game apparatus side, with reference to FIG. 27, the CPU 40 instructs the GPU 42*b* to display a shadow of the object on the monitor 28 in a step S81. In response thereto, the GPU 42*b* displays a shadow SH of the object O on the monitor 28 as shown in FIG. 29(A). Here, at this time, on the side of the hand-held type game apparatus, an imaged image as shown in FIG. 29(B) is displayed on the LCD 112 (described later).

Next, the CPU 40 determines whether or not the current time is within a period for making the object appear on the basis of the time data 76 in a step S83, and if "YES" here, the process proceeds to a step S85 to instruct the GPU 42b to display the marker on the monitor 28. In response thereto, the GPU 42b displays the markers M at the four corners of the monitor 28.

Then, the CPU 40 determines whether or not a marker recognizing signal is received by the wireless communication module 50 in a step S87. If "NO" here, the process returns to the step S81 to repeat the similar processing for each frame. If "YES" in the step S87, the CPU 40 instructs the GPU 42b to display the body of the object O on the monitor 28, and in response thereto, the GPU 42b displays the body on the monitor 28 as shown in FIG. 30(A). Here, at this time, on the side of the hand-held type game apparatus, an imaged image as shown in FIG. 30(B) is displayed on the LCD 112 (described later). Thereafter, the process returns to the step S81 to repeat the similar processing for each frame.

If "NO" in the step S83, the CPU 40 shifts to a step S91 to instruct the GPU 42b to erase the marker, and further instructs the GPU 42b to erase the body in a following step S93. In response thereto, the GPU 42b erases the marker M and further the body from the monitor 28. Thereafter, the process returns to the step S81 to repeat the similar processing for each frame.

Next, in relation to the hand-held-type game apparatus side, with reference to FIG. 28, the CPU 142 executes imaging processing via the camera 118 in a step S101, and repetitively writes the acquired imaged image in the imaged image area 176. Next, the CPU 142 instructs the LCD 112 to display the imaged image in a step S103, and in response thereto, the LCD 112 reads the imaged image stored in the imaged image area 176 in order, and displays the same. Accordingly, on the LCD 112, an imaged image as shown in FIG. 29(B) is displayed. The imaged image includes the monitor image 28a. The monitor image 28a is an imaged image of the monitor 28 shown in FIG. 32(A), and includes a shadow image SHa.

Next, the CPU 142 performs marker recognizing processing on the imaged image stored in the imaged image area 176 in a step S105. The marker recognizing processing is also executed according to the subroutine in FIG. 19. In a next step S107, it is determined whether or not a marker is recognized on the basis of the comparison result in the step S79 (see FIG. 19). If "YES" here, the process shifts to a step S109 to transmit a marker recognizing signal to the game apparatus 12 via the wireless communication module 156. Then, in a step S111, the LCD 112 is instructed to display the head and arms of the object Ob such that they are superimposed on the imaged image. In response thereto, the LCD 112 displays the head and arms of the object Ob such that they are superimposed on the imaged image as shown in FIG. 30(B). Thereafter, the process returns to the step S101 to repeat the similar processing for each frame.

If "NO" in the step S107, the CPU 142 shifts to a step S113 to instruct the LCD 112 to erase the head and arms of the object Ob, and in response thereto, the LCD 112 erases the head and arms that are displayed in a superimposed manner of the object Ob. Thereafter, the process returns to the step S101 to repeat the similar processing for each frame. Thus, the display of the LCD 112 changes from FIG. 30(B) to FIG. 29(B).

As described above, in the first modified example, the CPU 40 of the game apparatus 12 displays the marker M on the monitor 28 (S85), and the CPU 142 of the game apparatus 100 performs imaging with the camera 118 (S101), displays the imaged imaged image on the LCD 112 (S103), determines whether or not the marker M is included in the imaged image (S105, S107), performs a display control of at least the second object Ob corresponding to the marker M displayed on the imaged image of the LCD 112 on the basis of the determination result (S111), and transmits a marker recognizing signal to the game apparatus 12 on the basis of the determination result (S109).

The game apparatus 12 receives the marker recognizing signal transmitted as described above (S87), and displays at least a part of the first object image O corresponding to the marker M on the monitor 28 on the basis of the received marker recognizing signal (S89). This makes it possible to make an expression as if the objects appear/disappear at the same time between the monitor 28 and the imaged image of the LCD 112.

It should be noted that in the aforementioned embodiment and first modified example, various signals are transmitted and received via the wireless communication module when a display control is performed, but it may be possible to perform a display control without using any signal. A display control in this case is explained as a second modified example below.

In the second modified example, the CPU 40 of the game apparatus 12 (console-type game apparatus side) and the CPU 142 of the game apparatus 100 (hand-held-type game apparatus side) respectively execute display control processing as shown in FIG. 31(A) and FIG. 31(B). First, in relation to the console-type game apparatus side, with reference to FIG. 31(A), the CPU 40 instructs the GPU 42b to display an object O on the monitor 28 in a step S121. In response thereto, the GPU 42b displays the object O on the monitor 28 as shown in FIG. 32(A). Here, at this time, on the side of the hand-held type game apparatus, an imaged image as shown in FIG. 32(B) is displayed on the LCD 112 (described later).

Next, the CPU 40 determines whether or not the current time is within the period for making the object O go out of the monitor 28 on the basis of the time data 76 in a step S123. If "YES" here, the process shifts to a step S125 to instruct the GPU 42b to erase the object O from the monitor 28, and instructs the GPU 42b to display the marker M on the monitor 28 in a step S127. In response thereto, the GPU 42b erases the object O from the monitor 28, and displays the marker M at a predetermined position (erasing position of the object O, here) of the monitor 28. Thereafter, the process returns to the step S123 to repeat the similar processing for each frame.

If "NO" in the step S123, the CPU 40 instructs the GPU 42b to erase the marker M from the monitor 28 in a step S129. In response thereto, the GPU 42b erases the marker M from the monitor 28. Then, the process returns to the step S121 to repeat the similar processing for each frame.

Accordingly, if the determination result in the step S123 changes from "NO" to "YES", the display of the monitor 28 changes from FIG. 32(A) to FIG. 33(A). Here, at this time, the display of the LCD 112 changes from FIG. 32(B) to FIG. 33(B) (described later). On the other hand, if the determination result in the step S123 changes from "YES" to "NO", the display of the monitor 28 changes from FIG. 33(A) to FIG. 32(A). Here, at this time, the display of the LCD 112 changes from FIG. 33(B) to FIG. 32(B) (described later).

Next, in relation to the hand-held-type game apparatus side, with reference to FIG. 31(B), the CPU 142 performs imaging processing via the camera 118 in a step S131, and repetitively writes to acquired imaged image to the imaged image area 176. Then, the CPU 142 instructs the LCD 112 to display the imaged imaged image in a step S133, and in response thereto, the LCD 112 reads and displays the imaged image stored in the imaged image area 176 in order. Accordingly, on the LCD 112, the imaged image as shown in FIG. 32(B) is displayed. The imaged image includes the monitor image 28a. The monitor image 28a is the imaged image of the monitor 28 shown in FIG. 29(A), and includes an object image Oa.

Next, the CPU 142 performs marker recognizing processing on the imaged image stored in the imaged image area 176 in a step S135. The marker recognizing processing is also executed according to the subroutine in FIG. 19. In a next step S137, it is determined whether or not a marker is recognized on the basis of the comparison result in the step S79 (see FIG. 19). If "YES" here, the LCD 112 is instructed to display the object image Ob such that it is displayed on the imaged image in a step S139. In response thereto, the LCD 112 displays the object image Ob such that it is superimposed on the imaged image as shown in FIG. 33(B). Thereafter, the process returns to the step S131 to repeat the similar processing for each frame.

If "NO" in the step S137, the CPU 142 shifts to step S141 to instruct the LCD 112 to erase the object image Ob, and in response thereto, the LCD 112 erases the object image Ob which is displayed in a superimposed manner. Then, the process returns to the step S131 to repeat the similar processing for each frame.

Accordingly, when the determination result in the step S137 changes from "NO" to "YES", the display of the LCD 112 changes from FIG. 32(B) to FIG. 33(B). Here, at this time, the display of the monitor 28 changes from FIG. 32(A) to FIG. 33(A). On the other hand, when the determination result in the step S137 changes from "YES" to "NO", the display of the LCD 112 changes from FIG. 33(B) to FIG. 32(B). Here, at this time, the display of the monitor 28 changes from FIG. 33(A) to FIG. 32(A).

It should be noted that in the aforementioned embodiment and the modified example, the markers are displayed on the monitor 28 before recognition, the markers displayed on the monitor 28 are imaged and stored, and at a time of recognition, the markers thus imaged and stored are compared with a marker newly imaged. However, by storing the markers in advance, such saving processing is omitted, and when recognition is performed, the markers stored in advance and the markers newly imaged may be compare with each other. Here, if saving processing is performed like this embodiment, it is possible to respond to the property of the monitor 28 and the change of the environment, and therefore, it is possible to expect improvement in recognition accuracy.

Furthermore, in the aforementioned embodiment and modified example, the marker is static but may be changed dynamically. For example, depending on the size of the marker, the size of the appearing object may be changed. Alternatively, depending on the shape of the marker, the display direction of the appearing object may be changed.

In addition, in the embodiments of FIG. 17 to FIG. 19, the hand-held type game apparatus transmits a signal, and the hand-held-type game apparatus may execute a display control at this time, and the console-type game apparatus may perform a display control at a time when receiving the signal.

Additionally, in this embodiment, the connection between the hand-held-type game apparatus and the console-type game apparatus is made in a wireless manner but may be connected by a wire.

Furthermore, in this embodiment, the direction of the hand-held-type game apparatus with respect to the display of the console-type game apparatus is calculated on the basis of the positions of the markers included in the imaged image of the hand-held-type game apparatus. However, a sensor (acceleration sensor, gyro sensor, etc.) for detecting a motion is attached to the hand-held-type game apparatus, and on the basis of the sensor value, the position is calculated and on the basis of the calculated position, and the direction of the hand-held-type game apparatus with respect to the display of the console-type game apparatus may be calculated.

In this embodiment and the modified example, it is difficult to view the display of the console-type game apparatus and the screen of the hand-held-type game apparatus at the same time (without changing the gazing). However, if a head mount display allowing for optical see-through (translucent display) is used as the screen of the hand-held-type game apparatus, viewing without changing the gazing is made possible. More specifically, a camera is attached to the head mount display (here, the camera may be separately provided). With the camera, the display of the console-type game apparatus is imaged, and when a marker is detected from the imaged image, an object is displayed on the head mount display. On the head mount display, the imaged image by the camera is not displayed. Thus, behind the translucent object displayed on the head mount display, an image (object) displayed on the display of the console-type game apparatus can be viewed, capable of enhancing visual continuity between the console-type game apparatus and the hand-held-type game apparatus.

In the above description, the game system 10 is explained, but the present invention can be applied to an image processing system including a first image processing apparatus utilizing a first displayer (console-type game apparatus connected to a monitor, PC, etc.: the monitor may be provided externally or internally), an imager and a second image processing apparatus (hand-held type game apparatus containing an LCD and a camera, a portable communication terminal, a PDA, etc.: the LCD and the camera may be provided externally) utilizing an imager and a second displayer.

It should be noted that if the LCD and the cameras are a 3D compatible type, popping out of the object, etc. can be represented more real as shown in FIG. 25.

Although the technology presented herein has been described and illustrated in detail, it is clearly understood that the same is by way of illustration and example only and is not to be taken by way of limitation, the scope of the present technology being limited only by the terms of the appended claims.

Furthermore, it should be understood that overall the embodiment of the present technology, a representation of a singular form also includes a concept of the plural form unless otherwise stated. Accordingly, an article or an adjective in the singular (for example, "a", "an", "the", etc. for English) also includes a concept of the plural form unless otherwise stated.

What is claimed is:

1. An image processing system including a first image processing apparatus utilizing a first displayer and a second image processing apparatus utilizing an imager and a second displayer capable of viewing a real space on a screen, wherein said first image processing apparatus comprises:
    a first display processor which displays a predetermined marker image on said first displayer; and
    a first object display controller which performs on said first displayer a display control of at least a part of a first object image being a predetermined CG object; and said second image processing apparatus comprises:
    an imaging processor which performs imaging by said imager; and
    a second object display controller which performs a composition control of at least a part of a second object image being a predetermined CG object on a real space capable of being viewed on said second displayer at a position with reference to said marker image within said imaged image by recognizing said marker image within said imaged image, wherein said at least part of a second image is controlled within the imaged image in accordance with the state of said at least a part of a first object on the first displayer, and wherein said first object display controller, if the first object is made to be out of said first displayer, it erases the first object from said first displayer, and said second object display controller, correspondingly to the erase of the first object from said first displayer, it displays the second object in said second displayer so that it is superimposed on the imaged image, and the position where the second object is superimposed is decided at the outside of the imaged image of said first displayer.

2. The image processing system according to claim 1, wherein said first image processor and said second image processor are able to communicate with each other, said first object display controller performs a display control of said first object image by being operatively connected through the communication, and said second object display controller performs a composition control of said second object image by being operatively connected through the communication.

3. The image processing system according to claim 2, wherein said second object display controller combines at least a part of said second object image with said imaged image when said marker image is recognized within said imaged image, and said first object display controller performs a control on said first displayer such that said first object image disappears when said marker image is recognized within said imaged image in said second object display controller.

4. The image processing system according to claim 2, wherein said second object display controller combines at least a part of said second object image with said imaged image when said marker image is recognized within said imaged image, and said first object display controller performs a control such that said first object image is displayed on said first displayer when said marker image is recognized within said imaged image in said second object display controller.

5. The image processing system according to claim 1, wherein said marker image includes identification information; and said first object image and said second object image are images corresponding to identification information included in said marker image.

6. The image processing system according to claim 1, wherein said first display processor displays a plurality of marker images on said first displayer.

7. The image processing system according to claim 6, wherein said first display processor displays four marker images at four corners of said first displayer.

8. The image processing system according to claim 6, wherein said first object display controller performs a control such that said first object image is displayed at a predetermined position surrounded by said plurality of marker images, and by recognizing at least one of said plurality of marker images within said imaged image, said second object display controller performs a control of a composition of said second object image on a position surrounded by said plurality of marker images recognized within said imaged image.

9. The image processing system according to claim 1, wherein said second object display controller which performs a composition control of said second object at a position and an orientation corresponding to a position and an orientation of said marker image within said imaged image by performing an AR recognition on said marker image within said imaged image.

10. The image processing system according to claim 9, wherein said second object display controller includes:

a position and orientation calculator which calculates a correlative relation of a position and an orientation between said marker image on said first displayer and said imager by recognizing said marker image within said imaged image;

a virtual camera setter which arranges said second object in said virtual space and decides a position and an orientation of said virtual camera such that a correlative relation of a position and an orientation between said second object and said virtual camera match the position and the orientation that are calculated by said position and orientation calculator; and a virtual space imager which images said virtual space including said second object by said virtual camera, wherein a composition control is performed between said imaged image and the virtual space imaged by said virtual space imager.

11. The image processing system according to claim 1, wherein said second image processing apparatus further comprises a second display processor which displays the imaged image imaged by said imaging processor on said second displayer, and said second object display controller performs a composition control of said second object on said imaged image displayed by said second displayer.

12. The image processing system according to claim 1, wherein said second image processing apparatus further comprises:

a first signal transmitter which transmits a first signal to said first image processing apparatus on the basis of a recognition result of said marker image, and said first image processing apparatus further comprises:

a first signal receiver which receives the first signal transmitted by said first signal transmitter, wherein said first object display controller controls a display of said first object on the basis of the first signal received by said first signal receiver.

13. The image processing system according to claim 12, wherein
said first image processing apparatus further comprises:
a second signal transmitter which transmits a second signal to said second image processing apparatus in a case that said first signal is received by said first signal receiver, and
said second image processing apparatus further comprises:
a second signal receiver which receives said second signal, wherein
said second object display controller performs a display control on the basis of the second signal received by said second signal receiver.

14. The image processing system according to claim 13, wherein
said second signal transmitter transmits the second signal to said second image processing apparatus after a lapse of a first predetermined time since the first signal is received by said first signal receiver.

15. The image processing system according to claim 13, wherein
said first object display controller performs a display control after the second signal is transmitted by said second signal transmitter.

16. The image processing system according to claim 14, wherein
said first image processing apparatus further comprises a third signal transmitter which transmits a third signal to said second image processing apparatus after a lapse of a second predetermined time since said first object display controller performs a display control,
said second image processing apparatus further comprises a third signal receiver which receives the third signal, and
said second object display controller erases said second object from said imaged image after said third signal is received by said third signal receiver.

17. The image processing system according to claim 16, wherein
said first object display controller returns to a state before said display control is performed after said third signal transmitter transmits the third signal.

18. The image processing system according to claim 12, wherein
said first display processor displays at least a part of said first object together with predetermined identification information, and
said first object display controller erases at least a part of said first object on the basis of said first signal.

19. The image processing system according to claim 12, wherein
said first object display controller displays at least a part of said first object on the basis of said first signal.

20. The image processing system according to claim 1, wherein
said first object display controller includes a first object size changer which changes a size of said first object on the basis of a size of said marker image, and
said second object display controller includes a second object size changer which changes a size of said second object on the basis of the size of said marker image.

21. The image processing system according to claim 1, wherein
said first object display controller includes a first object direction changer which changes a display direction of said first object on the basis of a shape of said marker image, and said second object display controller includes a second object direction changer which changes a display direction of said second object on the basis of the shape of said marker image.

22. The image processing system according to claim 12, wherein
said first signal includes coordinate information, and
said first object display controller performs a display control of at least a part of said first object on the basis of the coordinate information included in said first signal.

23. The image processing system according to claim 11, wherein
said second display processor includes a frame displayer which displays a frame the same in shape as said marker image on said second displayer, and
said second object display controller performs recognition in a state that said marker image is displayed along the frame displayed by said frame displayer.

24. The image processing system according to claim 1, wherein
said at least part of a second image moves within the imaged image in accordance with the movement of said at least a part of a first object on the first displayer.

25. The image processing system according to claim 1, wherein
said at least part of a second image is positioned within the imaged image in accordance with the position of said at least a part of a first object on the first displayer.

26. A non-transitory storage medium storing an image processing program performing image processing between a first image processing apparatus utilizing a first displayer and a second image processing apparatus utilizing an imager and a second displayer capable of viewing a real space on a screen, wherein
said image processing program causes a computer to function as:
a first display processor which displays a predetermined marker image on said first displayer; and
a first object display controller which performs on said first displayer a display control of at least a part of a first object image being a predetermined CG object,
said image processing program causes said second image processing apparatus to function as:
an imaging processor which performs imaging by said imager; and
a second object display controller which performs a composition control of at least a part of a second object image being a predetermined CG object on a real space capable of being viewed on said second displayer at a position with reference to said marker image within said imaged image by recognizing said marker image within said imaged image, wherein
said at least part of a second image is controlled within the imaged image in accordance with the state of said at least a part of a first object on the first displayer, and wherein
said first object display controller, if the first object is made to be out of said first displayer, it erases the first object from said first displayer, and
said second object display controller, correspondingly to the erase of the first object from said first displayer, it displays the second object in said second displayer so that it is superimposed on the imaged image, and the position where the second object is superimposed is decided at the outside of the imaged image of said first displayer.

27. A first image processing apparatus being brought into association with a second image processing apparatus that utilizes an imager and a second displayer capable of viewing a real space on a screen by using a first displayer, comprising:
- a first display processor which displays a predetermined marker image on said first displayer; and
- a first object display controller which performs on said first displayer a display control of at least a part of a first object image being a predetermined CG object, wherein said second image processing apparatus comprises:
- an imaging processor which performs imaging by said imager; and
- a second object display controller which performs a composition control of at least a part of a second object image being a predetermined CG object on a real space capable of being viewed on said second displayer at a position with reference to said marker image within said imaged image by recognizing said marker image within said imaged image, wherein said at least part of a second image is controlled within the imaged image in accordance with the state of said at least a part of a first object on the first displayer, and wherein said first object display controller, if the first object is made to be out of said first displayer, it erases the first object from said first displayer, and said second object display controller, correspondingly to the erase of the first object from said first displayer, it displays the second object in said second displayer so that it is superimposed on the imaged image, and the position where the second object is superimposed is decided at the outside of the imaged image of said first displayer.

28. A second image processing apparatus utilizing an imager and a second displayer capable of viewing a real space on a screen in associating with a first image processing apparatus utilizing a first displayer, wherein said first image processing apparatus comprises:
- a first display processor which displays a predetermined marker image on said first displayer; and
- a first object display controller which performs on said first displayer a display control of at least a part of a first object image being a predetermined CG object, comprising:
- an imaging processor which performs imaging by said imager; and
- a second object display controller which performs a composition control of at least a part of a second object image being a predetermined CG object on a real space capable of being viewed on said second displayer at a position with reference to said marker image within said imaged image by recognizing said marker image within said imaged image, wherein said at least part of a second image is controlled within the imaged image in accordance with the state of said at least a part of a first object on the first displayer, and wherein said first object display controller, if the first object is made to be out of said first displayer, it erases the first object from said first displayer, and said second object display controller, correspondingly to the erase of the first object from said first displayer, it displays the second object in said second displayer so that it is superimposed on the imaged image, and the position where the second object is superimposed is decided at the outside of the imaged image of said first displayer.

29. An image processing method performed by a first image processing apparatus utilizing a first displayer and a second image processing apparatus utilizing an imager and a second displayer capable of viewing a real space on a screen, including the following steps to be executed by a computer of said first image processing apparatus of:
- a first display processing step for displaying a predetermined marker image on said first displayer; and
- a first object display controlling step for performing on said first displayer a display control of at least a part of a first object image being a predetermined CG object, and including the following steps to be executed by a computer of said second image processing apparatus of:
- an imaging processing step for performing imaging by said imager; and
- a second object display controlling step for performing a composition control of at least a part of a second object image being a predetermined CG object on a real space capable of being viewed on said second displayer at a position with reference to said marker image within said imaged image by recognizing said marker image within said imaged image, wherein said at least part of a second image is controlled within the imaged image in accordance with the state of said at least a part of a first object on the first displayer, and wherein said first object display controlling step, if the first object is made to be out of said first displayer, it erases the first object from said first displayer, and said second object display controlling step, correspondingly to the erase of the first object from said first displayer, it displays the second object in said second displayer so that it is superimposed on the imaged image, and the position where the second object is superimposed is decided at the outside of the imaged image of said first displayer.

* * * * *